United States Patent
Anderson et al.

(10) Patent No.: US 11,438,225 B2
(45) Date of Patent: Sep. 6, 2022

(54) COMMISSIONING AND CONTROLLING LOAD CONTROL DEVICES

(71) Applicant: Lutron Technology Company LLC, Coopersburg, PA (US)

(72) Inventors: Todd G. Anderson, Bethlehem, PA (US); Maxwell Anselm, Bethlehem, PA (US); Vidur Garg, Allentown, PA (US); Ashok Karmani, Lansdale, PA (US); Sanjeev Kumar, Harleysville, PA (US); Sandeep Mudabail Raghuram, Breinigsville, PA (US); Somesh Rahul, Breinigsville, PA (US); Ananthanag Nemmani, Austin, TX (US); Jaykrishna A. Shukla, Mays Landing, NJ (US); Alcides J. Dias, Bee Cave, TX (US); Surjith Bhagavath Singh, Austin, TX (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 16/812,167

(22) Filed: Mar. 6, 2020

(65) Prior Publication Data
US 2020/0288558 A1    Sep. 10, 2020

Related U.S. Application Data

(60) Provisional application No. 62/815,692, filed on Mar. 8, 2019, provisional application No. 62/817,481, filed
(Continued)

(51) Int. Cl.
*H05B 47/155* (2020.01)
*H05B 45/22* (2020.01)
(Continued)

(52) U.S. Cl.
CPC ...... *H04L 41/0806* (2013.01); *G06K 7/10722* (2013.01); *G06K 7/1413* (2013.01);
(Continued)

(58) Field of Classification Search
CPC ... H04L 41/0806; H04L 67/12; H04L 27/125; H04L 12/2823; H04L 2/2823;
(Continued)

(56) References Cited

U.S. PATENT DOCUMENTS 7,277,930 B2    10/2007    Hillis et al.
7,880,639 B2    2/2011    Courtney et al.
(Continued)

*Primary Examiner* — Alexander H Taningco
*Assistant Examiner* — Amy X Yang
(74) *Attorney, Agent, or Firm* — Flaster Greenberg, P.C.

(57) ABSTRACT

A load control system may be commissioned using beacons. The load control system may include control devices that each include a beacon transmitting circuit configured to transmit a beacon that comprises an identifier associated with the control device. A network device, such as a mobile device, may discover a control device based on the beacon received from the control device. In response to discovery of the control device, the control device may be added to a temporary group of control devices for being collectively configured and/or controlled. Control devices may be discovered based on the signal strength at which the beacons are received. The control devices may provide feedback to a user in response to confirmation messages to indicate to a user that the lighting control device has been added to the temporary group. The control devices may stop providing the feedback after they are removed from the temporary group.

29 Claims, 30 Drawing Sheets

Related U.S. Application Data on Mar. 12, 2019, provisional application No. 62/896,268, filed on Sep. 5, 2019, provisional application No. 62/898,500, filed on Sep. 10, 2019, provisional application No. 62/879,227, filed on Jul. 26, 2019.

(51) Int. Cl.

| | |
|---|---|
| *H05B 45/14* | (2020.01) |
| *H05B 47/19* | (2020.01) |
| *H04L 41/0806* | (2022.01) |
| *G06K 7/10* | (2006.01) |
| *G06K 7/14* | (2006.01) |
| *H04L 67/12* | (2022.01) |
| *H04W 12/06* | (2021.01) |

(52) U.S. Cl.
CPC ............ *G06K 7/1417* (2013.01); *H04L 67/12* (2013.01); *H04W 12/06* (2013.01); *H05B 45/14* (2020.01); *H05B 45/22* (2020.01); *H05B 47/155* (2020.01); *H05B 47/19* (2020.01)

(58) Field of Classification Search
CPC ...... H05B 45/14; H05B 47/155; H05B 45/22; H05B 47/19; G06K 7/10722; G06K 7/1413; G06K 7/1417; H04W 12/06; H04W 4/50; H04W 4/33; H04W 8/005; H05L 12/2816
USPC ......................................... 315/312, 297, 291
See application file for complete search history.

(56) References Cited

U.S. PATENT DOCUMENTS

| | | |
|---|---|---|
| 8,009,042 B2 | 8/2011 | Steiner et al. |
| 8,179,787 B2 | 5/2012 | Knapp |
| 8,199,010 B2 | 6/2012 | Sloan et al. |
| 8,228,184 B2 | 7/2012 | Blakeley et al. |
| 8,456,092 B2 | 6/2013 | Knapp |
| 8,471,496 B2 | 6/2013 | Knapp |
| 8,521,035 B2 | 8/2013 | Knapp et al. |
| 8,674,913 B2 | 3/2014 | Knapp |
| 8,749,172 B2 | 6/2014 | Knapp |
| 8,773,336 B2 | 7/2014 | Knapp |
| 8,886,047 B2 | 11/2014 | Knapp |
| 9,232,610 B2 | 1/2016 | Gritti |
| 9,276,766 B2 | 3/2016 | Knapp |
| 9,295,112 B2 | 3/2016 | Knapp |
| 9,386,668 B2 | 7/2016 | Knapp et al. |
| 9,509,525 B2 | 11/2016 | Knapp |
| 9,553,451 B2 | 1/2017 | Zacharchuk et al. |
| 9,848,482 B2 | 12/2017 | Knapp |
| 10,027,127 B2 | 7/2018 | Crafts et al. |
| 10,210,750 B2 | 2/2019 | Knapp et al. |
| 10,379,505 B2 | 8/2019 | Barco et al. |
| 2013/0026947 A1 | 1/2013 | Economy et al. |
| 2013/0030589 A1 | 1/2013 | Pessina et al. |
| 2014/0175875 A1 | 6/2014 | Newman et al. |
| 2014/0177469 A1 | 6/2014 | Neyhart et al. |
| 2014/0180487 A1 | 6/2014 | Bull et al. |
| 2015/0179058 A1 | 6/2015 | Crafts et al. |
| 2016/0286624 A1 | 9/2016 | Patel et al. |
| 2017/0041886 A1* | 2/2017 | Baker ................... H04W 4/029 |
| 2017/0090499 A1 | 3/2017 | Dolan |
| 2017/0245351 A1 | 8/2017 | Leinen et al. |
| 2018/0114434 A1* | 4/2018 | Newman, Jr .......... H05B 47/11 |
| 2019/0132934 A1* | 5/2019 | Leinen ................... H05B 45/12 |

* cited by examiner

COMMISSIONING AND CONTROLLING LOAD CONTROL DEVICES

CROSS-REFERENCE TO RELATED APPLICATIONS

This application claims the benefit of Provisional U.S. Provisional Patent Application No. 62/815,692, filed Mar. 8, 2019, U.S. Provisional Patent Application No. 62/817,481, filed Mar. 12, 2019, U.S. Provisional Patent Application No. 62/896,268, filed Sep. 5, 2019, U.S. Provisional Patent Application No. 62/898,500, filed Sep. 10, 2019, and U.S. Provisional Patent Application No. 62/879,227, filed Jul. 26, 2019, the disclosures of which are incorporated herein by reference in their entireties

BACKGROUND

Load control systems may include electrical loads (e.g., lighting loads, etc.) and load control devices (e.g., ballasts, light emitting diode (LED) drivers, etc.) for controlling electrical power to the lighting loads. The load control devices may be controlled by messages from remote control devices or sensors (e.g., occupancy sensors, etc.) capable of sending instructions via messages to the load control devices for controlling the electrical loads. The load control devices may receive communications for performing load control from a system controller, which may be programmed with configuration information for controlling the load control devices in the system. After the devices are installed in the load control systems, the load control systems may be commissioned to enable the proper configuration and communication of devices to control the electrical loads.

Typically, after the load control system is installed in a location, such as a residence, an office, or the like, the system controller may assign link addresses to lighting control devices that the system controller controls. The link addresses may be used for sending instructions to the load control devices for controlling the electrical loads. This assignment may be done at random. For example, a system controller may be capable of controlling a plurality of lighting control devices, such as lighting ballasts or LED drivers, and may randomly assign a different link address to each lighting control device.

It is difficult to determine what link address was assigned to a load control device at a specific location after installation to enable control of the electrical loads at a location from other devices, such as the remote-control devices, occupancy sensors, or the system controller. For example, a floor plan may identify a load control device and its corresponding location in a room or building, while the system controller may have a list of the assigned link addresses stored thereon with the location of the load control device that is assigned a link address being unknown.

In order to control the load control devices at a desired location, during the commissioning procedure users may have to identify a lighting load that is controlled by a lighting control device having an assigned link address and associate a link address with the identified location in the building. As a building may include many lighting control devices (e.g., in different rooms, floors, etc.) with unknown link addresses, users may have to provide power to a lighting load using a known link address and search for the location of the lighting load that is being controlled (e.g., on, flashing, etc.) in the building in order to associate the physical location of the lighting control device with the assigned link address of the lighting control device. The lights that are being controlled may be in different rooms than the user configuring the system is currently occupying, which may cause the user to have to move around the building to different rooms to commission the system.

Similar time-consuming processes may be implemented for configuring other devices in the load control system. The process of identifying the location of the control devices in the system and associating the devices during commissioning of the system to enable appropriate load control can be time consuming and costly.

SUMMARY

A load control system may be commissioned as described herein for controlling one or more electrical loads. During commissioning of a load control system, one or more control devices may be discovered and/or selected for collective configuration and/or control. The selected control devices may be included in a temporary group of control-target devices for configuration and/or control. For example, a load control system may include lighting control devices capable of being selected and/or grouped for collective control in a location or zone. Control devices may be added to and/or removed from the temporary group for collective configuration and/or control. The temporary group may also include at least one control-source device, such as an occupancy sensor or a remote-control device, for enabling control of the temporary group of control devices based on messages received from the control-source device.

The load control system may be commissioned using beacons. For example, the load control system may include lighting control devices that each include a beacon (e.g., a control device beacon) transmitting circuit configured to transmit a respective beacon that comprises an identifier associated with the lighting control device. A network device may discover a lighting control device based on the beacon received from the lighting control device. In response to discovery of the lighting control device, the lighting control device may be added to a temporary group of lighting control devices for being collectively configured and/or controlled.

The beacon may be transmitted periodically and/or in response to a triggering event. For example, the beacon may be transmitted in response to a message, an actuation of a button on the control device, or in response to an occupancy condition detected by an occupancy sensor. A lighting control device in the load control system may be in direct communication with an occupancy sensor (e.g., installed in the same fixture) and the lighting control device may transmit beacons (e.g., each beacon or begin periodic transmission of beacons) in response to the occupancy condition detected by the occupancy sensor.

A lighting control device may transmit a control device beacon upon reception of a mobile device beacon transmitted by a mobile device (e.g., a network device). The mobile device beacon may include a received signal strength discovery threshold. The lighting control device may receive the mobile device beacon and may determine a received signal strength indicator (RSSI) at which the mobile device beacon was received. The lighting control device may transmit the control device beacon if the received signal strength indicator at which the mobile device beacon was received is greater than or equal to the received signal strength discovery threshold. The lighting device may stop transmitting the control device beacon if the received signal strength indicator at which mobile device beacon is received is less than the received signal strength discovery threshold (e.g., the mobile device is out of the discovery range of the lighting control device).

Control devices may be discovered based on the signal strength at which the respective beacons are received. For example, a lighting control device may be discovered when the signal strength at which the respective beacon of the lighting control device is received is above a discovery threshold. The discovery threshold maybe adjusted to discover other control devices within a broader or more limited range.

The load control system may be commissioned using an optical signal. For example, the load control system may include lighting control devices that each include a visible light sensor that can detect optical signals at one or more visible wavelengths (e.g., between approximately 400 nm and 700 nm). The lighting control devices may receive an optical signal from the mobile device (e.g., from an optical transmitter attached or connected to the mobile device). The lighting control devices may measure the signal strength of the optical signal and may transmit the signal strength (e.g., as an absolute or relative value) to the mobile device and/or a system controller (e.g., via a load controller). The mobile device, the system controller, and/or the load controller may compare the respective signal strengths received from the lighting control devices, and may determine which lighting control device is receiving the optical signal at the highest normalized signal strength. The lighting control device that is receiving the optical signal at the highest normalized signal strength may be claimed and/or associated.

A confirmation message may be sent to the control devices that indicates that the control devices have been added to the temporary group selected for collective configuration and/or control. The control devices may provide feedback to the user to indicate that they have been added to the temporary group in response to the confirmation message. For example, the lighting control devices may provide feedback via the respective lighting load in response to the confirmation messages to indicate to a user that the lighting control device has been added to the temporary group. The lighting control device may provide the feedback by flashing the respective lighting load on and off, increasing and decreasing an intensity level of the respective lighting load, or increasing and decreasing a color (e.g., a color temperature) of the respective lighting load.

The network device may display discovered devices in the temporary group of lighting control devices for being collectively configured or controlled. The network device may receive an indication of at least one of the discovered devices in the temporary group to be removed from the temporary group. For example, the user may select one or more devices for being removed from the temporary group. The network device may remove the indicated devices from the group and may send a message to the removed devices. The message may cause the removed devices to stop providing the feedback via the respective lighting loads.

Occupancy sensors in the load control system may transmit beacons to lighting control devices to provide feedback to a user of an occupancy/vacancy transmission range of the occupancy sensors. The lighting control devices may receive the beacons from the occupancy sensor and compare a signal strength at which the beacon was received from the occupancy sensor with a wireless threshold that corresponds to the occupancy/vacancy transmission range of the occupancy sensor. The lighting control devices may provide feedback by changing a state of the respective lighting load in response to the signal strength of the beacon from the occupancy sensor being above the wireless threshold. The lighting control devices that provide feedback may indicate the occupancy/vacancy transmission range of the occupancy sensor from the occupancy sensor's current location to help configure the placement of the occupancy sensor in the space.

DETAILED DESCRIPTION

Figure 1:
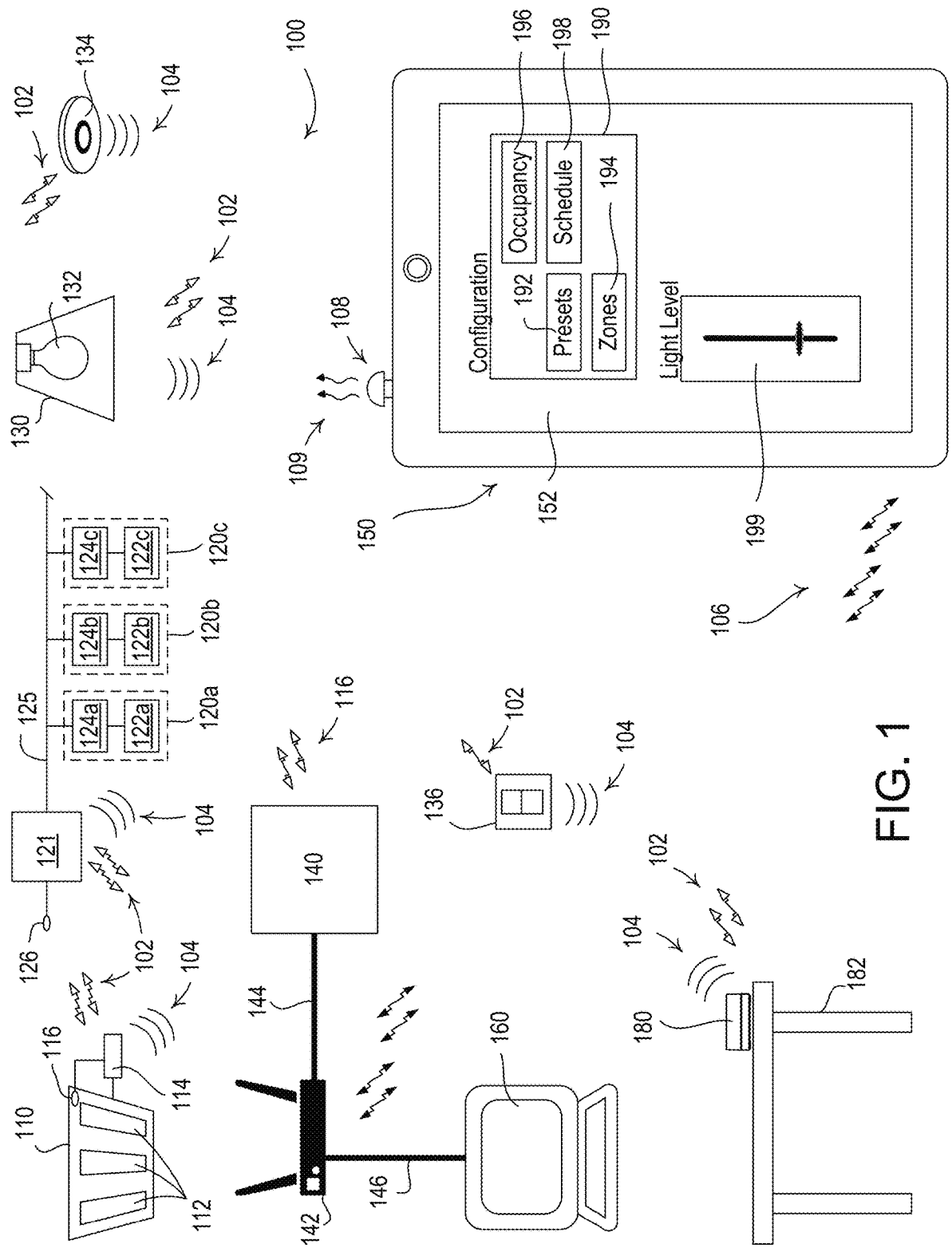
FIG. 1 illustrates a representative load control system for configuring and/or controlling one or more control devices using beacons.

To commission a load control system, one or more control devices may be identified and/or selected for collective configuration and/or control for enabling load control. The control devices may include at least one control-target device (e.g., load control device) and at least one control-source device. The control-target devices may control an electrical load based on messages received from associated control-source devices. A single control device of the load control system may be both a control-target and a control-source device. For example, a load control device may operate as a control-target device to receive messages for controlling an electrical load, and may operate as a control-source device to transmit messages to another load control device for controlling an electrical load.

Commissioning of a load control system may include identification and/or association of control-source devices and/or control-target devices for individual and/or collective control. Devices may be associated with one another by storing identifiers of the devices together in memory. The control devices may be associated in a temporary group to allow for control of the devices in the group. Devices may be associated with a temporary group by storing the identifiers of the devices in memory with a temporary group identifier. The associations may be stored at the control devices or other devices in the load control system and referenced to respond appropriately to enable load control between associated devices in the system.

Control devices may be identified and/or selected for collective configuration and/or control using beacons (e.g., control device beacons). The selected control devices may be temporarily grouped for enabling configuration and/or control. The control device beacons may include unique identifying information that may be used to identify and/or select control devices for collective configuration and/or control in a load control environment. The control device beacons may indicate or be used to indicate the proximity or location of a device and/or the current state of the device. The control device beacons may include a major identifier and a minor identifier for a control device (e.g., a load control device). The major identifier may include the unique identifier of the corresponding control device and the minor identifier may include the unique identifier for the control device type, or vice versa. The major and minor identifiers may be used in combination to identify the unique identifier of the control device.

A network device (e.g., a mobile device) may also transmit a beacon (e.g., a mobile device beacon). The mobile device beacon may include unique identifying information that may be used to identify the network device and/or a received signal strength discovery threshold. In addition, a beacon transmitting device may transmit a beacon (e.g., a location beacon). The location beacon may include unique identifying information that may be used to identify a location of the beacon transmitting device and/or a received signal strength discovery threshold. The beacon transmitting device may be a control device, or the beacon transmitting device may be a device that is independent from a control device.

The beacons (e.g., the control device beacons, a location beacon, and/or the mobile device beacon) may be transmitted as radio frequency (RF) communication signals or other types of signals that may be received by another control device, a network device, and/or a beacon transmitting device within close proximity to the device that transmitted the beacon. The beacons may be transmitted as short-range RF communication signals. For example, the beacons may be RF signals that are communicated using the BLUETOOTH® communication protocol or the BLUETOOTH® low energy (BLE) communication protocol. When the beacon is transmitted using an RF communication signal, the beacon may be identified by a device to indicate that the device is within the proximity or location of the device that transmitted the beacon. The proximity of the device to a beacon transmitting device may be determined by the signal strength at which the RF communication signal of the beacon is received. Though beacons may be described herein as being communicated using the BLUETOOTH® communication protocol, other RF communication protocols may be implemented. For example, beacons may be transmitted using the near field communication (NFC) protocol, Thread® protocol, WI-FI communication protocol, and/or other RF communication protocols.

A load control system may be commissioned by setting up or configuring control devices for performing load control using beacons. The control devices may be associated with one another and/or a location using beacons, as described herein. Control devices associated with a location may be implemented for performing load control at the location.

FIG. 1 illustrates a representative load control system 100 for configuring and/or controlling one or more control devices using beacons. The load control system 100 may include a lighting fixture 110 (e.g., a panel fixture) having one or more lighting loads 112 (e.g., light-emitting diode (LED) light sources 208). The lighting fixture 110 may also include a lighting control device 114 (e.g., an LED driver) for controlling an amount of power provided to the lighting loads 112 of the lighting fixture 110. The lighting control device 114 may be installed inside of the lighting fixture 110, to an outside surface of the lighting fixture 110, and/or adjacent to (e.g., external to) the lighting fixture 110. The lighting control device 114 of the lighting fixture 110 may operate as a control-target device for controlling the amount of power provided to the lighting loads 112 to control an intensity level of the lighting fixture 110 in response to the received messages from control-source devices.

The load control system 100 may include lighting fixtures 120a-120c controlled by a load controller 121. Each of the lighting fixtures 120a-120c may have a respective lighting load(s) 122a-122c (e.g., LED light sources) and a respective lighting control device 124a-124c (e.g., an LED driver) for controlling an amount of power provided to the respective lighting load(s) of the lighting fixture. The load controller 121 may be coupled to the lighting control devices 124a-124c via a communication link 125 (e.g., a wired digital communication link). The load controller 121 may be configured to individually control the lighting control devices 124a-124c to thus individually control the lighting loads 122a-122c. The load controller 121 may operate as a control-target device for controlling the lighting control devices 124a-124c to control the power provided to the lighting loads 122a-122c to control intensity levels of the lighting fixtures 120a-120c in response to the received messages from control-source devices. In addition, the load control system 100 may include a lighting fixture having multiple controllable light sources that may be controlled by a single load controller, such as the load controller 121.

The load control system 100 may also include a lighting fixture 130 (e.g., a downlight fixture) having a controllable light source 132 (e.g., a controllable LED lamp). The controllable light source 132 may include an integral lighting control device (e.g., an LED driver) for controlling an amount of power provided to an internal lighting load of the controllable light source 132. For example, the controllable light source 132 may be screwed into a standard Edison socket of the lighting fixture 130. The controllable light source 132 of the lighting fixture 130 may operate as a control-target device for controlling an intensity level of the lighting load of the controllable light source 132 in response to the received messages from control-source devices. Though the lighting control device 114, the lighting control devices 124a-124c, and the controllable light source 132 may be provided as example control-target devices, the load control system 100 may include other control-target devices, such as a motorized window treatment, a temperature control device, and/or a plug-in load control device, for example.

The lighting level of the lighting fixture 110, the lighting control devices 124a-124c, and/or the controllable light source 132 may be controlled according to lighting control instructions received from a control-source device. A control-source device may be capable of communicating messages to a control-target device (e.g., a load control device such as, a lighting control device) via wired and/or wireless signals for controlling an electrical load (e.g., lighting load). Example control-source devices in the load control system 100 may include an occupancy sensor 134, a remote control device 136, and/or another control-source device capable of communicating messages to the lighting control device 114, the lighting control devices 124a-124c, and/or the controllable light source 122 for performing control. The load control system 100 may also comprise a system controller 140 and a network device, such as a mobile device 150, which may also operate as a control-source device. For example, the mobile device 150 may comprise a smart phone and/or a tablet.

The amount of power delivered to the lighting loads 112 of the lighting fixture 110, the lighting loads 122a-122c of the lighting control devices 124a-124c, and/or the controllable light source 132 may be controlled in response to lighting control instructions received from a control-source device (e.g., the occupancy sensor 134, the remote control device 136, the system controller 140, the mobile device 150, and/or another control-source device). The lighting level may be controlled according to lighting control configuration information, such as preset configuration, zone configurations, occupancy configuration, and/or timing schedule configuration information that may be stored at the lighting control device 114, the lighting control devices 124a-124c, the controllable light source 132, and/or at the system controller 140 or the mobile device 150. The lighting control instructions may be transmitted on a wireless communication network (e.g., a Thread network) via radio-frequency (RF) signals 102).

The occupancy sensor 134 may be a control-source device configured to detect occupancy and/or vacancy conditions in the space in which the load control system 100 is installed. The occupancy sensor 134 may transmit messages via the RF communication signals 102 in response to detecting the occupancy or vacancy conditions. The RF signals 102 may communicate messages via one or more protocols (e.g., standard communication protocols, such as a WI-FI®; WI-MAX®; BLUETOOTH®; NFC; ZIGBEE®, Thread; and/or proprietary communication protocols, such as CLEAR CONNECT™, Z-WAVE). Though FIG. 1 shows the occupancy sensor 134 communicating messages via the RF communication signals 102, the occupancy sensor 134 may communicate via a wired communication.

The system controller 140 may be configured to turn the lighting loads of one or more lighting fixtures (e.g., the lighting loads 112, 122a-122c and/or the controllable light source 122) on and off in response to receiving an occupied signal and a vacant signal, respectively. The occupancy sensor 134 may operate as a vacancy sensor, such that the lighting loads may be manually turned on by a user and/or automatically turned off in response to detecting a vacancy signal from the sensor (e.g., the lighting load is not turned on in response to detecting an occupancy condition). Examples of load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

Though the occupancy sensor 134 may be shown as being external to the lighting fixture 110, a sensor 116 may be incorporated in the lighting fixture 110 and/or in direct communication (e.g., wired or wireless) with the lighting control device 114 of the lighting fixture 110 for controlling the lighting loads 112. In addition, the load controller 121 may be connected to a sensor 126. The sensors 116, 126 may be used for controlling the lighting fixture 110 and/or the lighting control devices 124a-124c, respectively. The sensors 116, 126 may be occupancy sensors, visible light sensors (e.g., cameras), daylight sensors, optical sensors, and/or any other type of sensor. The sensors 116, 126 may be occupancy sensors capable of detecting occupancy/vacancy conditions (e.g., using infrared signals). The sensors 116, 126 may be visible light sensors (e.g., camera) capable of detecting changes within the visible space of the sensors 116, 126.

The sensors 116, 126 may be configured to operate similarly to the occupancy sensor 134, but may be in direct communication with the lighting control device 114 of the lighting fixture 110 and the load controller 121, respectively. For example, the lighting control device 114 of the lighting fixture 110 may turn on and off the lighting loads 112 in response to receiving an occupied signal and a vacant signal, respectively, from the sensor 116. Similarly, the load controller 121 may turn on and off the lighting loads 122a-122c in response to receiving an occupied signal and a vacant signal, respectively, from the sensor 126.

The remote-control device 136 may be a control-source device configured to transmit messages to the system controller 140 and/or directly to the lighting control device 114, the load controller 121, and/or the controllable light source 122 via the RF communication signals 102 in response to an actuation of one or more buttons of the remote-control device 136. Though FIG. 1 shows the remote-control device 136 communicating messages via the RF communication signals 102, the remote-control device 136 may communicate via a wired communication. The remote-control device 136 may be a wall switch, a dimmer switch, or another remote-control device for controlling an electrical load. The system controller 140 may also originate one or more messages.

The system controller 140 may be configured to transmit one or more messages to the lighting control device 114 of the lighting fixture 110, the load controller 121, and/or the controllable light source 132 in response to the messages received from associated control-source devices, such as the occupancy sensor 134, the remote-control device 136, the mobile device 150, and/or another control-source device. The system controller 140 may communicate with the lighting control device 114 in the lighting fixture 110, the load controller 121, and/or the controllable light source 132 via a wired and/or wireless communication. For example, the system controller 140 may communicate with the lighting control device 114 of the lighting fixture 110, the load controller 121, and/or the controllable light source 132 via RF communication signals 102. The system controller 140 may communicate with other lighting control devices of lighting fixtures (e.g., a group of lighting control devices, etc.) in the load control system 100.

The system controller 140 may communicate with the mobile device 150 directly via wired and/or wireless communications. The system controller 140 may communicate with the mobile device 140 via a network communication device 142. The network communication device 142 may be a wireless access point, such as a wireless router and/or a modem for example. The network communication device 142 may communicate with the mobile device 150 via network communication signals 106 (e.g., network communication signals using the WI-FI® protocol, WI-MAX® protocol, etc.) to allow the mobile device 150 to communicate with other computing devices and/or networks (e.g., via the Internet). The system controller 140 may communicate with the network communication device 142 via a communication link 144, which may be a wired and/or wireless communication link. For example, the wireless communication link may allow the system controller 140 to communicate with the network communication device 106 wirelessly using WI-FI®, cellular, WI-MAX®, BLUETOOTH®, near field communication (NFC), etc. Though the system controller 140 and the network communication device 142 are shown as separate devices in FIG. 1, the network communication device 142 may be included in the system controller 140. The network communication device 142 may also be configured to communicate with a network device, such as, a processing device 160 (e.g., a personal computer and/or laptop), via a communication link 146, which may be a wired and/or wireless communication link.

The mobile device 150 may be implemented to configure the load control system 100. For example, the mobile device 150 may be used to discover and/or associate load control devices (e.g., control-source devices and/or control-target devices) for performing load control. The mobile device 150 may be a cellular phone (e.g., smart phone), a tablet, a personal digital assistant, a personal computer, a laptop computer, a wearable computing device (e.g., glasses, a watch, a wristband, etc.), or other mobile computing device.

The mobile device 150 may transmit a beacon (e.g., a mobile device beacon). The mobile device beacon may include, for example, a beacon identifier. For example, the beacon identifier may be unique identifier that identifies the mobile device 150 (e.g., or an application executed on the mobile device 150) and/or a non-unique identifier, such as an identifier of a group, area, building, load control system, and/or manufacturer of the mobile device and/or the control devices of the load control system 100. The mobile device beacon may also include a received signal strength discovery threshold. The control devices may receive the mobile device beacon and may compare a received signal strength indicator (RSSI) at which the mobile device beacon was received to the received signal strength discovery threshold. A control device may enter a configuration mode if the signal strength at which the mobile device beacon was received is greater than or equal to the received signal strength discovery threshold (e.g., the control device is within discovery range of the mobile device 150). The control device may transmit a control device beacon upon entering the configuration mode.

The mobile device 150 may discover control devices (e.g., control-source devices and/or control-target devices) upon receipt of control device beacons transmitted from the control devices. The control device beacons may be beacons transmitted from the control devices and include a unique identifier that identifies the corresponding control devices (e.g., control-source devices and/or control-target devices). For example, a control device beacon may include a serial number or another unique identifier that corresponds to a respective load control device. The unique identifier may be a BLUETOOTH® beacon identifier. The beacon may include an address (e.g., a network address), a joiner identifier (e.g., a joiner ID), and/or any other kind of device identification data. The control device beacons may also, or alternatively, include a unique identifier of the device type for the corresponding control device. For example, the control device beacons may include an identifier for lighting control devices, sensors (e.g., occupancy sensors, etc.), remote control devices, and/or other types of control devices.

The control device beacons may be transmitted via RF communication signals 104 from control devices in the load control system 100. For example, the control device beacons may be transmitted from the lighting control device 114 of the lighting fixture 110, the load controller 121, the controllable light source 132, the occupancy sensor 134, the remote-control device 136, and/or another type of control device. In addition, the control device beacons may be transmitted via RF signals 102. The RF communication signals 102 and the RF communication signals 104 may be wireless communication signals that communicate via a wireless communication protocol (e.g., via a standard protocol, such as WI-FI®, BLUETOOTH®, near field communication (NFC); and/or via a proprietary protocol, such as Clear Connect®). The RF communication signals 102 and the RF communication signals 104 may be of a different signal type (e.g., protocol, bandwidth, etc.). For example, the RF communication signals 104 may be communicated via BLUETOOTH® low energy (BLE) or another short-range wireless communication protocol, while the RF communication signals 102 may include a standard protocol (e.g., Thread, Zigbee, or other standard communication protocol) and/or a proprietary protocol (e.g., Clear Connect®, or other proprietary communication protocol) that may be used for communications between control devices (e.g., control-target devices and control-source devices). One of the RF communication signals (e.g., RF communication signals 102) may be used for controlling electrical loads during operation of the load control system 100, and one of the RF communication signals (e.g., RF communication signals 104) may be used for discovering control devices and commissioning the load control system 100.

The RF communication signals 102, 104 may be communicated via a communication circuit (e.g., transceiver) in the respective control devices, or via a separate beacon transmitting device. The beacon transmitting devices for a control device may be included in, or nearby, the control device for indicating a relative location of the corresponding control device by transmitting control device beacons. The RF communication signals 102 may be communicated via the same communication circuit as the RF communication signal 104, or a different communication circuit.

The network device 150 may transmit optical signals 109 via an optical transmitter 108. The optical transmitter 108 may be, for example, a laser pointer, and may be detachable from the network device 150. For example, the optical transmitter may be capable of being inserted into a port (e.g., headphone jack, USB port, etc.) on the network device 150. The load control devices of the lighting fixtures (e.g., the load control device 114 of the lighting fixture 110, the load control devices 124a-124c of the lighting fixtures 120a-120c, and/or the internal load control device of the controllable light source 132 of the lighting fixture 130) may receive the optical signals 109 from the optical transmitter 108 (e.g., which may be attached to the network device 150 or another device). For example, the lighting loads may each comprise one or more internal detectors configured to perform optical feedback on the light emitted from the respective lighting load, and the load control devices may be configured to receive the optical signals 109 via the one or more internal detectors of the respective lighting loads. In addition, the load control devices of the lighting fixtures (e.g., the load control device 114 of the lighting fixture 110) may be configured to receive the optical signal 109 via respective sensors (e.g., the sensor 116). For example, the sensors 116 may be capable of detecting different types of optical signals in the space. The load control devices of the lighting fixtures may record a baseline ambient light level in an area in which the lighting fixtures are located. The load control devices of the lighting fixtures may be capable of detecting a strength at which an optical signal 109 is received from the network device 150, or another device capable of transmitting the optical signal 109.

The load control devices of the lighting fixtures may receive the optical signals 109 from the optical transmitter 108 (e.g., which may be attached to the network device 150 or another device). The load control devices of the lighting fixtures may determine a signal strength at which an optical signal 109 was received, and may transmit an indication of the signal strength to the network device 150 (e.g., via the system controller 114 and the load controller 121, respectively). The optical signals 109 may be used as part of configuration and/or control of the lighting fixture 110, the lighting fixtures 120a-120c, and/or the lighting fixture 130. The network device 150 may select a lighting fixture for configuration and/or control based on the indications of the signal strengths. For example, the network device 150 may select lighting fixture 110 for configuration and/or control based on a determination that the optical signal 109 was received at the internal detectors of the lighting loads 112 and/or the sensor 116 with the highest signal strength (e.g., highest normalized signal strength). The internal detectors of the lighting loads and/or the sensors 116 may be used to record baseline ambient light levels in the areas in which lighting fixture 110 and lighting fixtures 120a-120c are located, respectively. The signal strengths may be indicated as normalized signal strengths (e.g., relative to the respective baseline ambient light levels).

The load control system 100 may include one or more beacon transmitting devices that may be location beacon transmitting devices, such as a beacon transmitting device 180. The beacon transmitting device 180 (e.g., the location beacon transmitting device) may be located at a work station 182. The location beacon transmitting device may communicate a beacon (e.g., a location beacon) via RF communication signals 102 and/or 104. The beacon transmitted by the location beacon transmitting device may include a beacon that communicates a unique identifier. The beacon may be associated with a location at which the location beacon transmitting device resides, such as the work station 182, an office, a conference room, a portion of an office or conference room, or another location.

The beacon transmitted by the location beacon transmitting device may include a unique identifier that the mobile device 150 and/or the system controller 140 may associate with a physical location at which the location beacon transmitting device resides. If multiple location beacons are discovered, the user may associate the unique identifier of the beacon with the greatest signal strength to the closest physical location. The physical location may also, or alternatively, be determined from the geolocation of the mobile device 150.

The mobile device 150 may discover the beacon transmitted by the location beacon transmitting device for configuring and/or controlling one or more control devices in the load control system. For example, the mobile device 150 may discover the beacon transmitted by the location beacon transmitting device and may associate the unique identifier of the beacon with the unique identifier discovered from one or more control device beacons (e.g., beacons transmitted by control devices). The control devices that are associated with the unique identifier of the beacon transmitted by the location beacon transmitting device may be collectively controlled when the location beacon transmitting device is discovered by mobile devices.

The beacons may be transmitted from the control devices and/or the location beacon transmitting device periodically, or in response to a triggering event. The triggering event may be receipt of a message. The triggering event may be sent in a message from the mobile device 150 or another device (e.g., the occupancy sensor 134, the remote control device 136, or another control-source device). The system controller 140 may automatically control the communication of the beacons by communicating a message based on a periodic triggering event (e.g., expiration of a timer). In response to a message, the control devices and/or the location beacon transmitting device may enter a configuration mode and begin transmitting beacons. The message may trigger a transmission of a beacon or periodic transmission of beacons for a period of time.

The transmission of the beacons may be triggered by a message transmitted on the same or different RF communication signals and/or protocol and/or channels. For example, the transmission of the beacons may be triggered by an optical signal. For devices capable of performing two-way communications on the RF communication signals 104, the mobile device 150 may send a message to the devices on the RF communication signals 104 that cause the devices to communicate beacons on the RF communication signals 102. As the transmission of the beacons may be performed as a one-way communication from a control device, the transmission of the beacons may be triggered by a message sent on another communication protocol and/or using another communication signal. For example, control devices may receive a message via the RF communication signals 102 that triggers the transmission of the beacons from the control devices in the load control system on the RF communication signals 104.

The message that triggers the transmission of the beacons may be communicated to the control devices and/or the location beacon transmitting device directly or indirectly via another device. For example, the mobile device 150 may send a message to the system controller 140 to trigger the transmission of the beacons from the control devices in the load control system. Another message may be sent from the system controller 140 using RF communication signals 102 to trigger the transmission of the beacons from the control devices and/or the location beacon transmitting device. The control devices configured to receive the RF communication signals 102 may begin transmitting the beacons using RF communication signals 104.

The triggering event may be an actuation of a button on a device. One-way communication devices and/or two-way communication devices may transmit beacons in response to actuation of a button on the device.

The device identifier (e.g., device identification data) that is received in the beacons from a device may be used to determine the device identifier for communicating with the device on another network or network protocol. For example, the mobile device 150 may receive the beacon from the lighting fixture 110 via RF communication signals 102 and the unique identifier in the beacon may correspond to the unique identifier for communicating with the lighting fixture on another network using the RF communication signals 104. The unique identifier on each network or network protocol may have a different format, but may include a portion of the identifier (e.g., primary identifier) that is repurposed on each network for enabling ease of communication.

The mobile device 150 may interpret the information received in the beacons and perform commissioning and/or control of the load control system 100, or the mobile device 150 may send the information to another device for enabling commissioning and/or control. For example, the mobile device 150 may send the information received in the beacons and/or user input received on the mobile device 150 to the system controller 140 for configuring and/or controlling the load control system 100.

When commissioning the load control system 100, the mobile device 150 and/or the system controller 140 may sort the received beacons into a list. The mobile device 150 and/or the system controller 140 may order the list based on a ranging method. For example, the mobile device 150 and/or the system controller 140 may order the list based on the received signal strength indicator (RSSI) of each beacon. The control device that transmitted the beacon having the strongest RSSI may be listed first on the list.

The mobile device 150 may discover the beacons and determine the beacon identifiers. The mobile device 150 and/or the system controller 140 may select the beacon identifiers for being configured and/or controlled. Each of the discovered beacons may be selected for configuration and/or control, or the beacons that are discovered above a received signal strength discovery threshold may be selected for configuration and/or control. The received signal strength discovery threshold may define a discovery range (e.g., an area around the mobile device 150 and/or system controller 140 in which control devices may be discovered). The mobile device 150 and/or the system controller 140 may group control devices identified via the beacons and associate the devices for enabling load control in the load control system 100. The mobile device 150 and/or the system controller 140 may automatically add the identifiers of the selected beacons to a group of control devices to be associated for enabling load control.

One or more lighting fixtures may be configured and/or controlled using optical signals (e.g., the optical signals 109). The lighting fixtures (e.g., the lighting fixture 110, the lighting fixtures 120a-120c, and/or the lighting fixture 130) may receive the optical signals 109 from the optical transmitter 108 (e.g., which may be attached to the network device 150 or another device). For example, the lighting fixtures may be configured to receive the optical signal via the internal detectors of the lighting loads of the lighting fixtures and/or respective sensors (e.g., the sensors 116). A lighting fixture may provide feedback to indicate that the lighting fixture received the optical signals 109. For example, the lighting fixture may cause a respective lighting load to light in a first color. The lighting fixtures may measure respective signal strengths at which the optical signals 109 are received, and may transmit respective indications of the signal strengths (e.g., as part of a beacon). For example, the signal strengths may be indicated as normalized signal strengths (e.g., relative to respective baseline ambient light levels).

The network device 150 (e.g., or the system controller 140) may select one or more of the lighting fixtures for configuration and/or control based on the indications of the signal strengths. For example, the network device 150 may select a lighting fixture that received the optical signal 109 at the highest signal strength for configuration and/or control. The selected lighting fixture may provide feedback to indicate that the lighting fixture been selected for configuration and/or control. For example, the lighting fixture may cause a respective lighting load to light in a second color. Once configuration and/or control of the selected lighting fixture has been completed, the network device 150 may select another lighting fixture (e.g., that received the optical signal 109 at the second highest signal strength) for configuration and/or control. A lighting fixture for which configuration and/or control has been completed may provide feedback to indicate that the lighting fixture has been configured and/or controlled. For example, the lighting fixtures may cause a respective lighting load to light in a third color.

The control settings for the group of control devices may be configured at the mobile device 150 and/or the system controller 140 based on input received from the user via a user interface 152 of the mobile device 150. The mobile device 150 may display lighting control configuration 190 on the user interface 152. For example, lighting control configurations 190 may include preset configurations 192, zone configurations 194, occupancy configurations 196, and/or timing schedule configurations 198 that may be configured for the group of control devices. The mobile device 150 may display dimmer 199 on the user interface 152. For example, the dimmer 199 may be used to control one or more lighting fixtures in real time and/or to set lighting levels for one or more of the preset configurations 192, zone configurations 194, occupancy configurations 196, and/or timing schedule configurations 198. For example, the dimmer may be used to decrease a lighting level for one or more lighting fixtures at a certain time of day.

The preset configurations 192 may be configured by adjusting the intensity level of one or more lighting fixtures using a virtual slider 199 (e.g., a virtual dimmer) and storing the settings. A user may select the preset configurations 192 on the user interface 152 to set an intensity level of one or more lighting fixtures to be controlled according to the preset. Different presets may be configured to set different lighting fixtures to different lighting levels for different occasions, such as a bedtime preset for when a user is going to bed, a movie preset for when a user is watching television or a movie, an away preset for when a user is away from the building, a home preset for when the user is in the building, or any other preset a user may define for an occasion.

A user may select the zone configurations 194 on the user interface 152 to define one or more zones of lighting fixtures for being controlled. The control devices that are discovered and added to a group as described herein may each be included in a zone, such that the group identifier (e.g., the temporary group identifier) is also a zone identifier, or the zone identifier may indicate a subset of the devices that have been discovered and added to a group of devices for configuration and/or control. Different zones may be separately controlled by sending lighting control instructions to a zone to set the zones to different lighting levels. The associated device identifiers of the identified lighting fixtures in a zone may be stored at the mobile device 150 and/or the system controller 140 as a defined zone configuration 194 for controlling the lighting fixtures in the defined zone. The zone configurations 194 may be sent in messages to the system controller 140 and/or the lighting fixtures in the defined zone for being stored for controlling the lighting fixtures according to the zone configurations 194.

A user may select the occupancy configurations 196 on the user interface 152 to define one or more lighting fixtures for being controlled according to the occupancy or vacancy of a space. Different lighting fixtures may be controlled to different lighting levels in response to occupancy commands and/or vacancy commands received from an occupancy sensor, such as the occupancy sensor 134.

A user may select the timing schedule configurations 198 on the user interface 152 to define a timing schedule for one or more lighting fixtures. Different lighting fixtures may be controlled to different lighting levels (e.g., on/off, a predefined intensity level, etc.) in accordance with a timing schedule that may be monitored by the system controller 140.

Figure 2A:
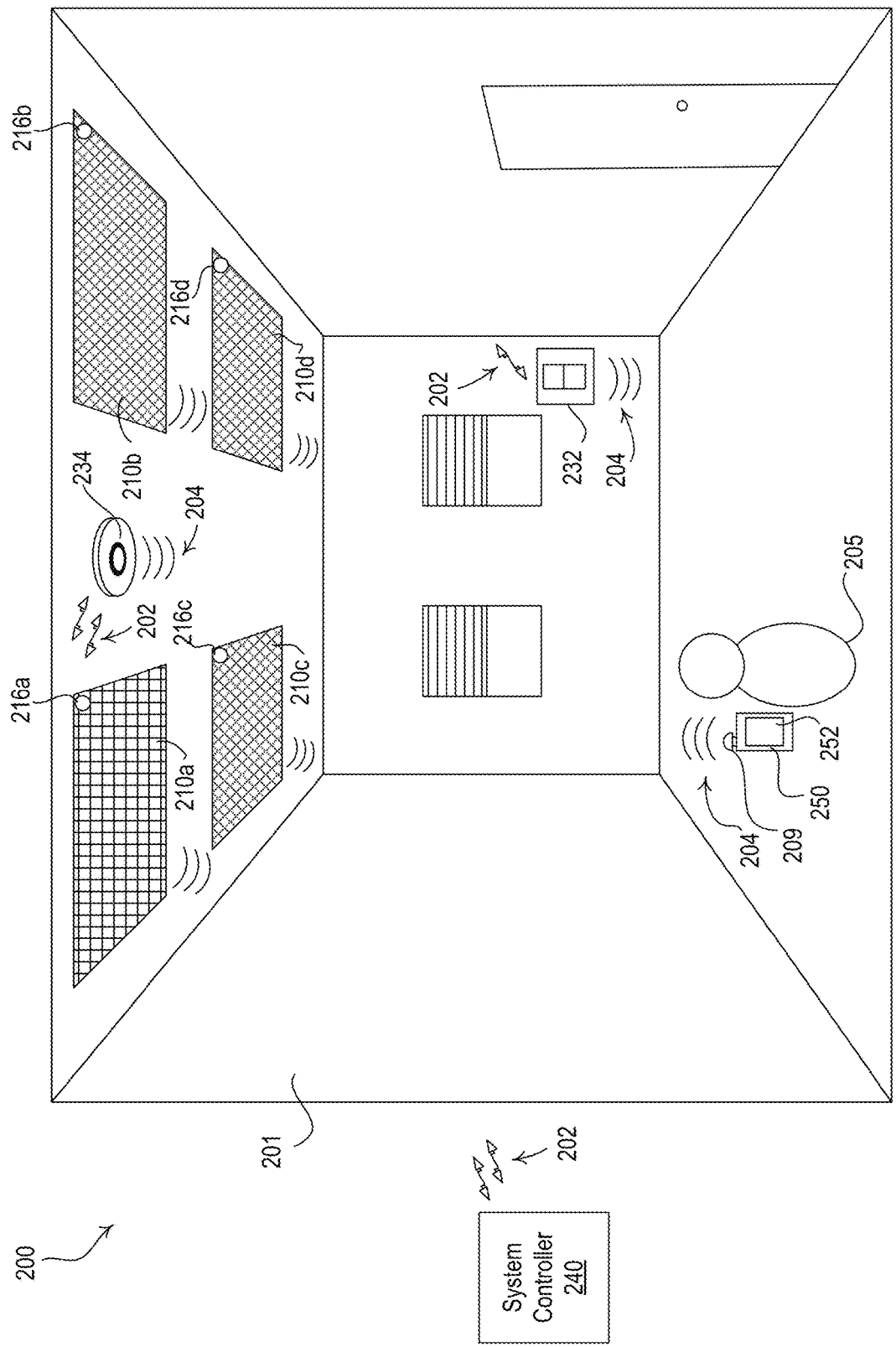
FIGS. 2A, 2B, 2C, and 2D illustrate a representative load control environment in which the load control system shown in FIG. 1 may be implemented for configuring and/or controlling one or more control devices using beacons.

FIG. 2A illustrates a representative load control environment 202 in which a load control system 200 (e.g., the load control system 100 shown in FIG. 1) may be implemented for configuring and/or controlling one or more control devices using beacons and/or an optical signal. The load control system 200 may include a plurality of lighting fixtures 210a-210d (e.g., the lighting fixture 110 and/or the lighting fixture 130). Each of the lighting fixtures 210a-210d may comprise one or more lighting loads (e.g., the lighting loads 112) and a lighting control device (e.g., the lighting control device 114) for controlling the intensity and/or color of the lighting loads of the respective lighting fixture. The lighting fixtures 210a-210d may also each comprise a controllable light source, such as the controllable light source 132 shown in FIG. 1. The lighting control devices of the lighting fixtures 210a-210d may operate as control-target devices for controlling the respective lighting loads in response to the received messages from control-source devices. The control-source devices of the load control system 200 may comprise an occupancy sensor 234 (e.g., the occupancy sensor 134), a remote control device 236 (e.g., the remote control device 136), and sensors 216a-216d mounted to the respective lighting fixtures 210a-210d (e.g., the sensor 116). The sensors 216a-216d may be occupancy sensors, visible light sensors (e.g., cameras), daylight sensors, optical sensors, and/or any other type of sensor. For example, one or more of the occupancy sensor 234 and/or the sensors 216a-216d may be visible light sensors (e.g., cameras). The load control system 100 may also comprise a system controller 240 (e.g., the system controller 140) and a network device, such as a mobile device 250 (e.g., the mobile device 150), which may also operate as a control-source device. For example, the mobile device 250 may comprise a smart phone and/or a tablet.

As shown in FIG. 2A, control devices (e.g., the lighting control device of the lighting fixture 210a) may be selected for being configured and/or controlled and may provide feedback to a user 205 (e.g., an installer) to identify the devices that have been selected for configuration and/or control. The control devices may be claimed and/or associated with configuration identifiers (e.g., zone or group identifiers for being joined to a network) of configuration data for enabling load control in the load control environment 201. The configuration identifier may be a fixture, group, zone, area, and/or location that may be defined by the configuration data (e.g., the lighting control configuration information) generated by the design software. For example, the feedback may be provided by a control device to indicate that the control device is ready to be claimed, has been selected for claiming, and/or has been claimed. A control device may be claimed by selecting a configuration identifier with which to associate the control device. The control device that is being claimed may transmit a unique identifier (e.g., a serial number) to the mobile device 250. The control device may be associated with the configuration identifier by creating an association between the configuration identifier and the unique identifier of the control device. The mobile device may store the unique identifier as well as information about the association between the configuration identifier and the control device in the configuration data. After a control device is claimed, it may be joined to a network, and/or may be configured and/or controlled by the user 205. For example, the user 205 may send one or more commands to a control device via the mobile device.

During the process of claiming the control devices and/or associating the control devices with the configuration identifiers of the configuration data, the control devices may be configured to communicate with the mobile device 250 via a first wireless communication medium (e.g., via RF communication signals 204 using Bluetooth technology). During normal operation of the load control system 200, the control devices may be configured to communicate with each other via a second wireless communication medium (e.g., via RF communication signals 202 transmitted on a wireless communication network, such as a Thread® or Zigbee network). After being claimed, the control devices may be configured to join the wireless communication network. For example, the control devices may be joined to the wireless communication network by transmitting the association between the control device and the configuration identifier to a remote device. After the control devices are joined to the wireless communication network, the control devices may communicate with each other via the wireless communication network during normal operation.

The configuration data may define the operation and/or functionality of the load control system 200. The configuration data may include representations of the control devices (e.g., the lighting fixtures 210a-210d, the occupancy sensor 234, the remote control devices 236, the sensors 216a-216d, etc.) in the load control system 200, as well as configuration identifiers (e.g., fixtures, groups, zones, areas, and/or locations) of the control devices. For example, the configuration data may define the functionality of the control devices, for example, how the lighting fixtures 210a-210d respond to the occupancy sensor 234, and/or the remote-control device 236. The configuration data may be configured using a design software executed by a processing device (e.g., the processing device 160), for example, prior to claiming and/or associating the control devices with the corresponding configuration identifier of the control device in the configuration data. In addition, the configuration data may be configured, for example, by the mobile device 250 while the mobile device is claiming and/or associating the control devices with the configuration identifier of the control device in the configuration data. The configuration data may be transmitted to the control devices via the wireless communication network after the control devices have joined the wireless communication network.

The mobile device 250 may be configured to claim control devices (e.g., the lighting control devices of the lighting fixtures 210a-210d, the occupancy sensor 234, and/or the remote-control device 236) and/or associate the control devices with a configuration identifier of the control device in the configuration data. The sensors 234a-234d may be used in claiming and/or associating the control devices for configuration and/or control. The user 205 may cause the mobile device 250 to enter a configuration mode (e.g., a claiming mode and/or an association mode). For example, the user 205 may press a button on the mobile device 250 to cause the mobile device to enter the configuration mode. In the configuration mode, the mobile device 250 may discover the beacons of control devices in the load control environment 201. As described herein, a control device may be claimed by associating a unique identifier of the control device with a configuration identifier.

The mobile device 250 may transmit (e.g., periodically transmit) a beacon (e.g., a mobile device beacon) after entering the configuration mode. The mobile device 250 may transmit the mobile device beacons via the first wireless communication medium 204 (e.g., via a short-range wireless communication link using BLUETOOTH® low energy (BLE) technology). The mobile device beacon may include, for example, a beacon identifier. For example, the beacon identifier may be unique identifier that identifies the mobile device 250 (e.g., or an application executed on the mobile device 250) and/or a non-unique identifier, such as an identifier of a group, area, building, load control system, and/or manufacturer of the mobile device and/or the control devices of the load control system 200. The mobile device beacon may also include a received signal strength discovery threshold. The control devices may receive the mobile device beacon and may compare a received signal strength indicator (RSSI) of the received mobile device beacon to the received signal strength discovery threshold. For example, the received signal strength indicator may be a signal strength at which the mobile device beacon was received. Each of the control devices may enter the configuration mode when the beacon identifier of the mobile device matches a particular beacon identifier and/or the received signal strength indicator is greater than or equal to the received signal strength discovery threshold (e.g., the control device is within a discovery range of the mobile device 250). For example, the particular beacon identifier may be predetermined and/or stored in memory of the control devices. The mobile device 250 may adjust the received signal strength discovery threshold that is included in the mobile device beacon to adjust the discovery range of the mobile device.

After entering the configuration mode, the control devices (e.g., lighting control devices of the lighting fixtures 210a-210d) may each transmit (e.g., periodically transmit) a control device beacon. The control devices may transmit the control device beacons via the first wireless communication medium 204 (e.g., using BLE technology). Each control device beacon may include the unique identifier of the control device that transmitted the respective beacon. In addition, the control devices may become ready to be claimed by the mobile device 250 after entering the configuration mode. After entering the configuration mode (e.g., in response to receiving the mobile device beacon), the control devices (e.g., the lighting fixtures 210a-210d) may provide feedback to the user 205 to indicate that the control devices are ready to be claimed. The feedback may be provided by changing a state of the lighting load in the lighting fixture 210a. For example, the lighting fixture 210a may turn a first color (e.g., orange) after entering the configuration mode (e.g., in response to receiving the mobile device beacon) to indicate to the user that the control device is within the discovery range of the mobile device 250 and is ready to be claimed. In addition, the feedback may be provided by flashing the lighting load on and off, increasing and/or decreasing the intensity level of the lighting load, increasing and/or decreasing the color temperature of the lighting load, and/or providing other visual feedback to the user 205. The feedback type may be indicated in the mobile device beacon transmitted by the mobile device 250, and/or may be preprogrammed and stored at the control device (e.g., the lighting fixtures 210a-210d).

As the user 205 moves around the load control environment 201 with the mobile device 250, the control devices that are within the discovery range of the mobile device may change. When control devices (e.g., the lighting control devices of the lighting fixtures 210a-210d) begin to receive the mobile device beacon as the user moves around, those control devices may enter configuration mode (e.g., become ready to be claimed), begin transmitting their control device beacon, and provide feedback (e.g., turn the first color). In addition, when the control devices fall outside of the discovery range of the mobile device 250 and/or fall outside of the wireless range of the mobile device 250 (e.g., stop receiving the mobile device beacon) as the user moves around, those control devices may exit the configuration mode after a timeout period (e.g., one minute). As a result, those control devices may stop transmitting their control device beacon and stop providing feedback (e.g., turn off).

The mobile device 250 may receive the control device beacons from one or more of the control devices. For example, the mobile device 250 may receive the control device beacon from the lighting control device of the lighting fixture 210a and select that lighting control device for being claimed (e.g., for joining the network). The mobile device 250 may rank the received control device beacons based on the received signal strength indicators of the respective control device beacon. For example, the mobile device 250 may select the lighting control device of the lighting fixture 210a for being claimed if the received signal strength indicator of the control device beacon from that lighting control device is a maximum received signal strength indicator of the received control device beacons.

The mobile device 250 may send a connection message to the control device having a received control device beacon with the maximum received signal strength. For example, the mobile device 250 and the control device may be configured to establish a connection (e.g., a two-way communication connection) in response to the control device receiving the connection message from the mobile device 250. In addition, the connection message may indicate to the control device that the control device has been discovered and selected for claiming. For example, the connection message may be sent via the RF communication signals 204

(e.g., directly from the mobile device 250). For example, the mobile device 250 may connect to a single control device at a time (e.g., to select a single control device at a time to be claimed).

In response to receiving the connection message, the control device (e.g., the lighting fixture 210a) may provide feedback to the user 205 to indicate that the lighting fixture 210a has been selected for claiming. The feedback may be provided by changing a state of the lighting load in the lighting fixture 210a. For example, the lighting fixture 210a may turn a second color (e.g., blue) after entering the configuration mode (e.g., in response to receiving the mobile device beacon) to indicate to the user than the control device is selected to be claimed. As shown in FIG. 2A, the lighting fixture 210a may be illuminated to the second color, while the other lighting fixtures 210b-210d may be illuminated to the first color. In addition, the feedback may be provided by flashing the lighting load on and off, increasing and/or decreasing the intensity level of the lighting load, increasing and/or decreasing the color temperature of the lighting load, and/or providing other visual feedback to the user 205. The feedback type may be indicated in the connection message from the mobile device 250, and/or may be preprogrammed and stored at the control device (e.g., the lighting fixtures 210a-210d).

As the user 205 moves around the load control environment 102 with the mobile device 250, the received signal strength indicators of the received control device beacons received by the mobile device may change. As a result, the control device beacon having the maximum received signal strength indicator of the received control device beacons provides the feedback (e.g., by turning the second color). The mobile device 250 may be configured to break the connection with the previous control device (e.g., by sending a message to the previous control device), which may stop providing the feedback (e.g., change from the second color to the first color, since the control device may still be within discovery range of the mobile device). In addition, the mobile device 250 may transmit a connection message to the new control device having a received control device beacon with the maximum received signal strength. Thus, that control device may be selected for claiming and start providing feedback (e.g., turn the second color).

The mobile device 250 may transmit (e.g., periodically transmit) optical signals (e.g., the optical signals 109) after entering the configuration mode. The mobile device 250 may transmit the optical signal via an attached optical transmitter (not shown). The control devices may receive the optical signal via internal detectors of the lighting loads of the lighting fixtures 210a-210b and/or sensors (e.g., sensors 216a-216d), and may measure a signal strength of the received optical signal. Each of the control devices may enter the configuration mode when the control device receives the optical signal, or the control devices may enter the configuration mode prior to receiving the optical signal.

After entering the configuration mode, the control devices (e.g., the lighting fixtures 210a-210d) may provide feedback to the user 205 to indicate that the control devices are ready to be claimed. The feedback may be provided by changing a state of the lighting load in the lighting fixture 210a. For example, the lighting fixture 210a may turn a first color (e.g., orange) after entering the configuration mode (e.g., in response to receiving the optical signals) to indicate to the user that the control device has received the optical signals and is ready to be claimed. In addition, the feedback may be provided by flashing the lighting load on and off, increasing and/or decreasing the intensity level of the lighting load, increasing and/or decreasing the color temperature of the lighting load, and/or providing other visual feedback to the user 205. The feedback type may be may be preprogrammed and stored at the control device (e.g., the lighting fixtures 210a-210d).

After entering the configuration mode, the control devices (e.g., lighting control devices of the lighting fixtures 210a-210d) may each transmit (e.g., periodically transmit) an indication of the signal strength at which one or more of the optical signals was received. The control devices may transmit the indications via the first wireless communication medium 204 (e.g., using BLE technology). Each indication may include the unique identifier of the control device that transmitted the optical signals. In addition, the control devices may become ready to be claimed by the mobile device 250 after entering the configuration mode.

As the user 205 moves around the load control environment 201 with the mobile device 250, the control devices that are receiving the optical signals may change. One or more control devices that are not receiving the optical signals may be in the configuration mode. When control devices (e.g., the lighting control devices of the lighting fixtures 210a-210d) that are in the configuration mode begin to receive the optical signals as the user moves around, those control devices may begin transmitting their signal strength indication, and provide feedback (e.g., turn the first color). In addition, when the control devices stop receiving the optical signal as the user moves around, those control devices may stop transmitting their signal strength indications and stop providing feedback (e.g., turn off) after a timeout period (e.g., one minute).

The mobile device 250 may receive the signal strength indications from one or more of the control devices. For example, the mobile device 250 may receive the signal strength indications from the lighting control device of the lighting fixture 210a and select that lighting control device for being claimed (e.g., for joining the network). The mobile device 250 (e.g., and/or the system controller 240) may select a lighting control device for being claimed based on the signal strength indications. For example, the mobile device 250 may select the lighting control device of the lighting fixture 210a for being claimed if the lighting fixture 210a received the optical signal at the highest signal strength.

The mobile device 250 may send a connection message to the selected control device. For example, the mobile device 250 and the control device may be configured to establish a connection (e.g., a two-way communication connection) in response to the control device receiving the connection message from the mobile device 250. In addition, the connection message may indicate to the control device that the control device has been discovered and selected for claiming. For example, the connection message may be sent via the RF communication signals 204 (e.g., directly from the mobile device 250). For example, the mobile device 250 may connect to a single control device at a time (e.g., to select a single control device at a time to be claimed).

In response to receiving the connection message, the control device (e.g., the lighting fixture 210a) may provide feedback to the user 205 to indicate that the lighting fixture 210a has been selected for claiming. The feedback may be provided by changing a state of the lighting load in the lighting fixture 210a. For example, the lighting fixture 210a may turn a second color (e.g., blue) after entering the configuration mode (e.g., in response to receiving the connection message) to indicate to the user than the control device is selected to be claimed. As shown in FIG. 2A, the lighting fixture 210a may be illuminated to the second color, while the other lighting fixtures 210b-210d may be illuminated to the first color. In addition, the feedback may be provided by flashing the lighting load on and off, increasing and/or decreasing the intensity level of the lighting load, increasing and/or decreasing the color temperature of the lighting load, and/or providing other visual feedback to the user 205. The feedback type may be indicated in the connection message from the mobile device 250, and/or may be preprogrammed and stored at the control device (e.g., the lighting fixtures 210a-210d). A lighting fixture for which configuration and/or control has been completed may provide feedback to indicate that the lighting fixture has been configured and/or controlled. For example, the lighting fixtures may cause a respective lighting load to light in a third color.

When the desired control device (e.g., the lighting control device of the lighting fixture 210a) is selected for claiming (e.g., the mobile device 250 is connected to the lighting control device and the lighting fixture is the second color), the user 205 may actuate a button (e.g., a soft or virtual button displayed on a user interface 252 of the mobile device 250) on the mobile device 250 to claim (e.g., and/or associate) the selected lighting control device. For example, the user 205 may select a zone or group (e.g., that is displayed on the mobile device 250) to associate with the selected lighting control device to claim that lighting control device. Thus, claiming and association may occur at the same time. The mobile device 250 may transmit a claiming message to the selected lighting control device in response to the selection of the zone or group on the mobile device to indicate that that the control device has been claimed and/or associated. In addition, the selected lighting control device may transmit a confirmation message (e.g., a claim confirmation message) to the mobile device 250 in response to receiving the claiming message. The claim confirmation message may include a unique identifier (e.g., a serial number) of the selected lighting control device.

In response to being claimed (e.g., in response to receiving the claiming message), the control device (e.g., the lighting fixture 210a) may provide feedback to the user 205 to indicate that the lighting fixture 210a has been claimed (e.g., for joining the network). The feedback may be provided by changing a state of the lighting load in the lighting fixture 210a. For example, the lighting fixture 210a may turn a third color (e.g., green) after being claimed. In addition, the feedback may be provided by flashing the lighting load on and off, increasing and/or decreasing the intensity level of the lighting load, increasing and/or decreasing the color temperature of the lighting load, and/or providing other visual feedback to the user 205. The feedback type may be indicated in the claiming message from the mobile device 250, or may be preprogrammed and stored at the control device (e.g., the lighting fixtures 210a-210d).

In response to being claimed, the control device may exit the configuration mode and enter a joining mode. In the joining mode, the control device may stop transmitting (e.g., periodically transmitting) the control device beacon continuously on the first wireless communication medium 204. For example, the control device may periodically switch between the first wireless communication medium 204 (e.g., using BLE technology) and the second wireless communication medium 204 (e.g., the wireless communication network). The control device may listen on the wireless communication network 202 to determine if a request to join the wireless communication network is being transmitted on the wireless communication network. The control device may continue to periodically transmit the control device beacon via the first wireless communication medium (e.g., at a slower rate than in the configuration mode) in case the mobile device 250 needs to reconnect to the control device while the mobile device is in the configuration mode. After the control devices have joined the wireless communication network 202, the configuration data may be transmitted to the control devices via the wireless communication network.

Figure 2B:
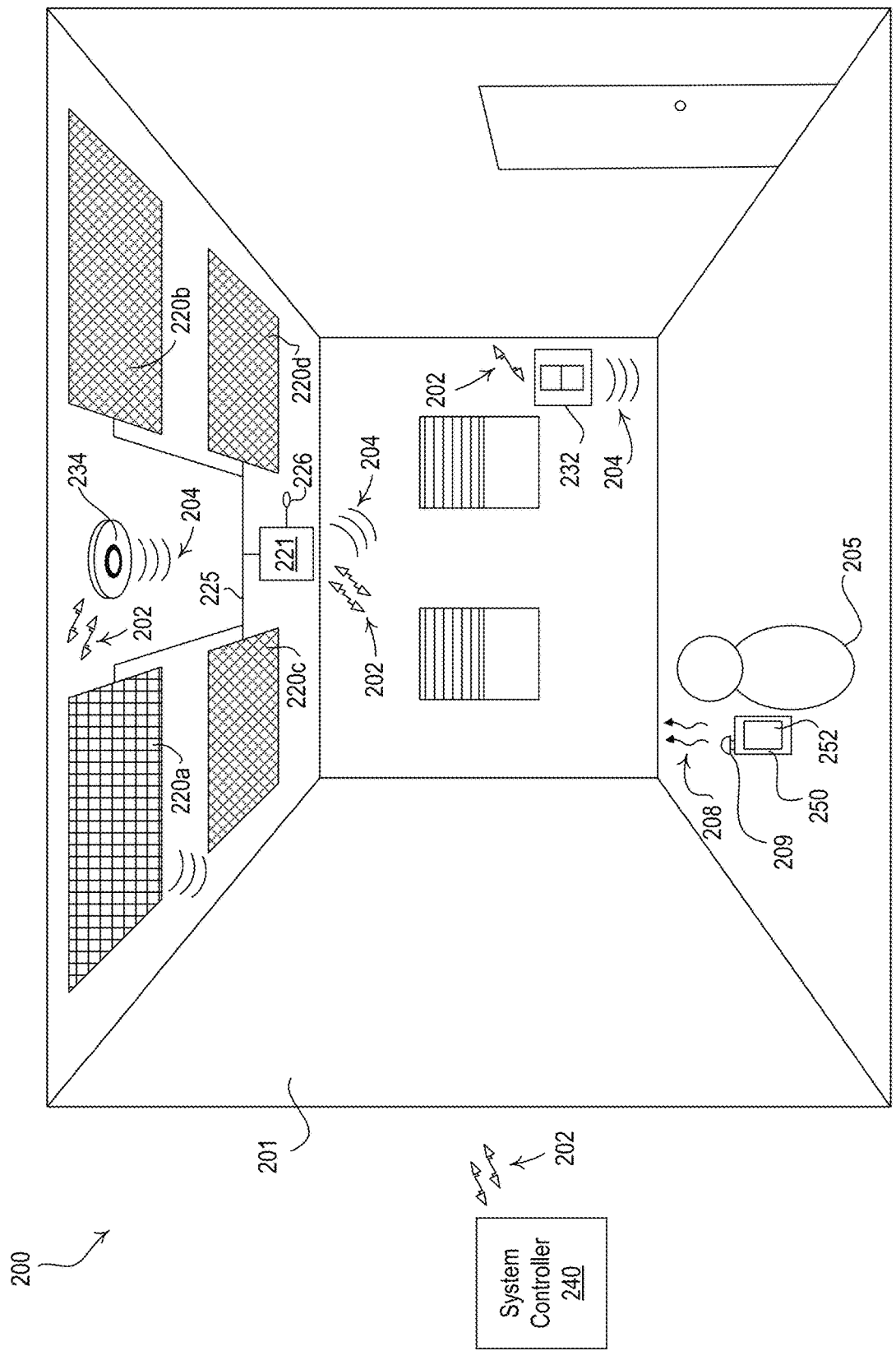

FIG. 2B illustrates another example for configuring and/or controlling control devices in the representative load control environment 201 (e.g., the load control system 100 shown in FIG. 1). The example shown in FIG. 2B may be implemented for configuring and/or controlling one or more control devices (e.g., using beacons). The load control system 200 may include a plurality of lighting fixtures 220a-220d (e.g., the lighting fixtures 120a-120c) that may be controlled by a load controller 221 (e.g., the load controller 121). Each of the lighting fixtures 220a-220d may comprise one or more lighting loads (e.g., the lighting loads 122a-122c) and a lighting control device (e.g., the lighting control devices 124a-124c) for controlling the intensity and/or color of the lighting loads of the respective lighting fixture. The load controller 221 may be coupled to the lighting control devices in the lighting fixtures 220a-220d via a communication link 225 (e.g., a wired digital communication link). The load controller 221 may be configured to individually control the lighting fixtures 220a-220d. The load controller 221 may operate as a control-target device for controlling the lighting fixtures 220a-220d in response to received messages from control-source devices.

The load controller 221 may be connected to a sensor 226 (e.g., the sensor 126). The sensor 226 may be used for controlling lighting fixtures 220a-220d. The sensor 226 may be an occupancy sensor capable of detecting occupancy/vacancy conditions (e.g., using infrared signals). The sensor 226 may be a sensor (e.g., camera) capable of detecting changes within the visible space of the sensor 226. The sensor 226 may be an occupancy sensor, a visible light sensor (e.g., a camera), a daylight sensor, an optical sensor, and/or any other type of sensor. The sensor 226 may be in direct communication with the load controller 221.

For example, the load control devices of the lighting fixtures 220a-220d may be capable of detecting different types of optical signals in the space. For example, the lighting loads of the lighting fixtures 220a-220d may each comprise one or more internal detectors configured to perform optical feedback on the light emitted from the respective lighting load, and the load control devices may be configured to receive the optical signals 109 via the one or more internal detectors of the respective lighting loads. The load control devices of the lighting fixtures 220a-220d may each record a baseline ambient light level in an area in which the lighting fixtures located. The load control devices of the lighting fixtures 220a-220d may each be capable of detecting a strength at which one or more of the optical signals are received. For example, the load control devices of the lighting fixtures 220a-220d may be capable of detecting a strength at which an optical signal is received from the network device 250, or another device capable of transmitting an optical signal. The network device 250 may transmit the optical signals via an optical transmitter 209. In addition, the optical transmitter 209 may be, for example, a laser pointer, and may be detachable from the network device 250.

The load controller 221 may be discovered and/or selected for configuration and/or control of the group of lighting fixtures 220a-220d. For example, the lighting fixtures 220a-220d may not be able to directly communicate with the mobile device 250. The lighting fixtures 220a-220d may communicate with the load controller 221 via, for example, wire-line communication and/or direct communication. The lighting fixtures 220a-220d may have sub-addresses used by the lighting controller 221 to communicate directly with the lighting fixtures 220a-220d for creating presets or other lighting configurations in response to commands on the network. The load controller 221 may provide the sub-addresses of the lighting fixtures 220a-220d to the mobile device 250 for enabling configuration of the individual lighting fixtures. A preset or other lighting configuration may be uploaded to the load controller 221 for independent control. The load controller 221 may be claimed and/or joined to the network, such that the load controller 221 receives communications on the network for controlling the lighting fixtures 220a-220d.

The control devices (e.g., the lighting fixtures 210a-210d) may enter a configuration mode. For example, the control devices may enter the configuration mode after receiving a configuration mode message from the mobile device 250 (e.g., a mobile device beacon). The load controller 221 may receive the configuration mode message from the mobile device 250, and may cause the control devices to enter the configuration mode via the communication link 225. After entering the configuration mode, the control devices (e.g., the lighting fixtures 210a-210d) may provide feedback to the user 205 to indicate that the control devices are ready to be claimed. The feedback may be provided by changing a state of the lighting load in the lighting fixture 210a. For example, the lighting fixture 210a may turn a first color (e.g., orange) after entering the configuration mode (e.g., in response to receiving the optical signals) to indicate to the user that the control device is ready to be claimed. In addition, the feedback may be provided by flashing the lighting load on and off, increasing and/or decreasing the intensity level of the lighting load, increasing and/or decreasing the color temperature of the lighting load, and/or providing other visual feedback to the user 205. The feedback type may be may be preprogrammed and stored at the control device (e.g., the lighting fixtures 210a-210d).

One or more of the control devices may begin transmitting (e.g., periodically transmitting) respective control device beacons after entering the configuration mode. For example, the control devices that are receiving the optical signal may transmit the control device beacons. Alternatively, the control devices may begin transmitting the control device beacons after receiving the mobile device beacon from the mobile device 250. Each control device beacon may include, for example, an identifier of the control device that transmitted the control device beacon.

As the user 205 moves around the load control environment 201 with the mobile device 250, the control devices that are receiving the optical signals and/or the mobile device beacon may change. When control devices (e.g., the lighting control devices of the lighting fixtures 210a-210d) begin to receive the optical signals and/or the mobile device beacon as the user moves around, those control devices may begin transmitting their control device beacon, and provide feedback (e.g., turn the first color). In addition, when the control devices stop receiving the optical signals and/or the mobile device beacon as the user moves around, those control devices may stop transmitting their control device beacons to the load controller 221 and stop providing feedback (e.g., turn off) after a timeout period (e.g., one minute).

The mobile device 250 may receive the control device beacons and may select a lighting fixture for claiming. For example, the mobile device 250 may select lighting fixture 210a for being claimed (e.g., for joining the network). The mobile device 250 (e.g., and/or the system controller 240) may select a lighting control device for being claimed based on the signal strengths (e.g., RSSIs) of the control device beacons. For example, the mobile device 250 may select the lighting control device of the lighting fixture 210a for being claimed if the control device beacon sent by lighting fixture 210a was received at the mobile device 250 with the highest RSSI.

The mobile device 250 may send a selection message to the selected lighting fixture via the load controller 221. The selection message may indicate to the load controller 221 and/or the selected lighting fixture that the lighting fixture is selected for configuration and/or control. The load controller 221 may forward the selection message to the selected lighting control device, or the load controller 221 may send a separate selection message to the selected lighting fixture.

In response to receiving the selection message, the control device (e.g., the lighting fixture 210a) may provide feedback to the user 205 to indicate that the lighting fixture 210a has been selected for claiming. The feedback may be provided by changing a state of the lighting load in the lighting fixture 210a. For example, the lighting fixture 210a may turn a second color (e.g., blue) in response to receiving the selection message to indicate to the user than the control device is selected to be claimed. As shown in FIG. 2B, the lighting fixture 210a may be illuminated to the second color, while the other lighting fixtures 210b-210d may be illuminated to the first color. In addition, the feedback may be provided by flashing the lighting load on and off, increasing and/or decreasing the intensity level of the lighting load, increasing and/or decreasing the color temperature of the lighting load, and/or providing other visual feedback to the user 205. The feedback type may be indicated in the selection message from the mobile device 250, and/or may be preprogrammed and stored at the control device (e.g., the lighting fixtures 210a-210d). A lighting fixture for which configuration and/or control has been completed may provide feedback to indicate that the lighting fixture has been configured and/or controlled. For example, the lighting fixtures may cause a respective lighting load to light in a third color.

When the desired control device (e.g., the lighting control device of the lighting fixture 210a) is selected for claiming (e.g., the mobile device 250 is connected to the lighting control device and the lighting fixture is the second color), the user 205 may actuate a button (e.g., a soft or virtual button displayed on a user interface 252 of the mobile device 250) on the mobile device 250 to claim (e.g., and/or associate) the selected lighting control device. For example, the user 205 may select a zone or group (e.g., that is displayed on the mobile device 250) to associate with the selected lighting control device to claim that lighting control device. Thus, claiming and association may occur at the same time. The mobile device 250 may transmit a configuration message (e.g., a claiming message) to the selected lighting control device via the load controller 221 in response to the selection of the zone or group on the mobile device to indicate that that the control device has been claimed and/or associated. For example, the mobile device 250 may transmit the configuration message to the load controller 221 via wireless communications, and the load controller 221 may forward the configuration message to the selected control device via the communication link 225. The configuration message may include, for example, a configuration identifier for the control device. In addition, the selected lighting control device may transmit a confirmation message (e.g., a claim confirmation message) to the mobile device 250 via the load controller 221 in response to receiving the configuration message.

In response to being claimed (e.g., in response to receiving the configuration message), the control device (e.g., the lighting fixture 210a) may provide feedback to the user 205 to indicate that the lighting fixture 210a has been claimed (e.g., for joining the network). The feedback may be provided by changing a state of the lighting load in the lighting fixture 210a. For example, the lighting fixture 210a may turn a third color (e.g., green) after being claimed. In addition, the feedback may be provided by flashing the lighting load on and off, increasing and/or decreasing the intensity level of the lighting load, increasing and/or decreasing the color temperature of the lighting load, and/or providing other visual feedback to the user 205. The feedback type may be indicated in the claiming message from the mobile device 250, or may be preprogrammed and stored at the control device (e.g., the lighting fixtures 210a-210d).

In response to being claimed, the control device may exit the configuration mode and enter a joining mode. In the joining mode, the control device may stop transmitting (e.g., periodically transmitting) the control device beacon continuously on the first wireless communication medium 204. For example, the control device may periodically switch between the first wireless communication medium 204 (e.g., using BLE technology) and the second wireless communication medium 204 (e.g., the wireless communication network). The control device may listen on the wireless communication network 202 to determine if a request to join the wireless communication network is being transmitted on the wireless communication network. The control device may continue to periodically transmit the control device beacon via the first wireless communication medium (e.g., at a slower rate than in the configuration mode) in case the mobile device 250 needs to reconnect to the control device while the mobile device is in the configuration mode. After the control devices have joined the wireless communication network 202, the configuration data may be transmitted to the control devices via the wireless communication network.

Figure 2C:
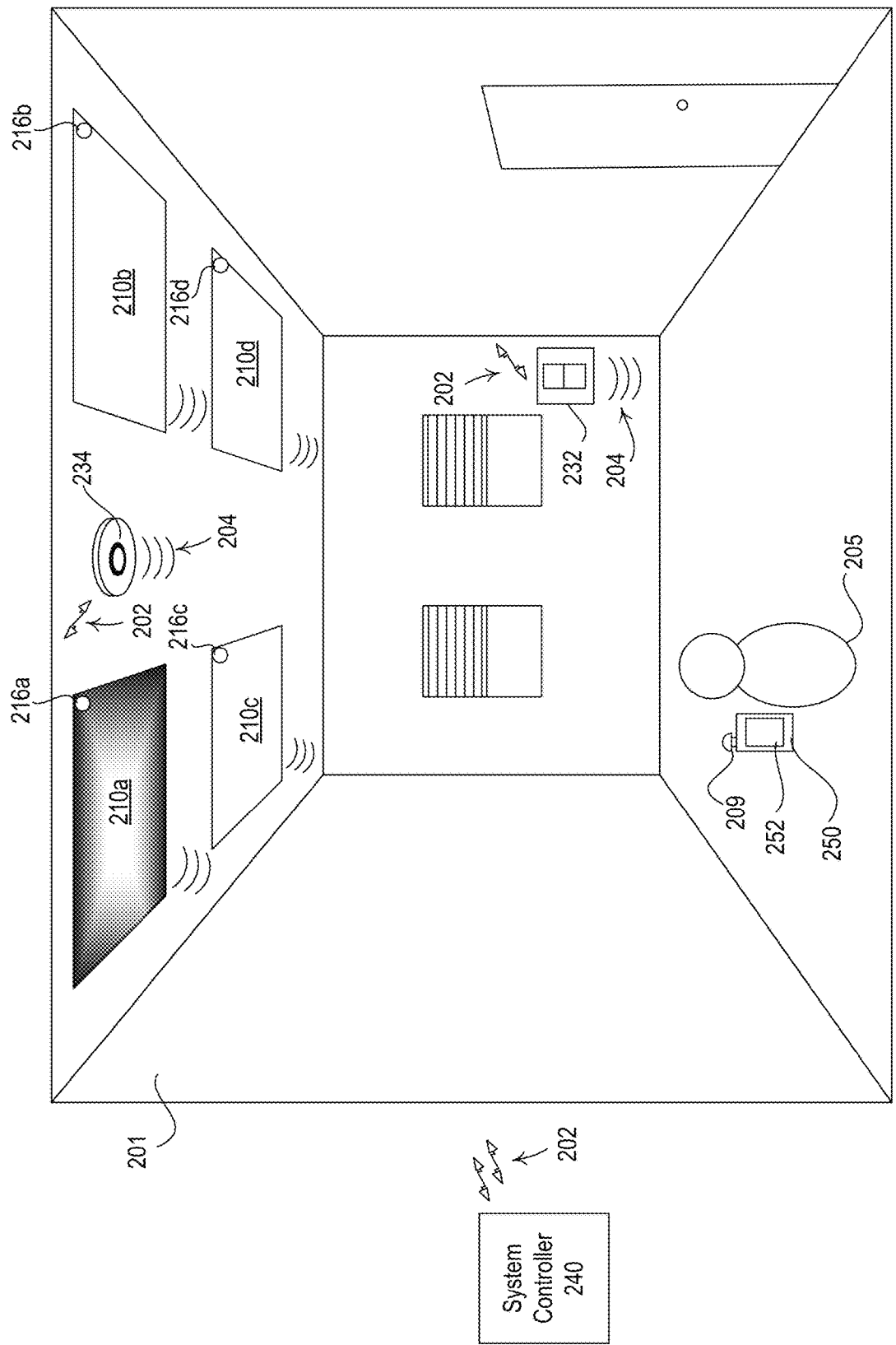

FIG. 2C illustrates another example for configuring and/or controlling control devices using beacons and/or an optical signal in the representative load control environment 201. As shown in FIG. 2B, control devices (e.g., the lighting control device of the lighting fixture 210a) may be selected for being configured and/or controlled and may provide feedback to a user 205 to identify the devices that have been selected for configuration and/or control. For example, the feedback may be provided by a control device to indicate that the control device has been selected for claiming and/or association with other control devices for enabling load control in the load control environment 201. The mobile device 250 may be configured to claim control devices (e.g., the lighting control devices of the lighting fixtures 210a-210d, the occupancy sensor 234, the remote-control device 236, and/or the sensors 216a-216d) and/or associate the control devices with a configuration identifier of the configuration data of the load control system 200. The user 205 may cause the mobile device 250 and/or the system controller 240 to enter a configuration mode (e.g., a claiming mode and/or an association mode). For example, the user 205 may press a button on the mobile device 250 to add and/or edit a group of control devices in the load control environment 201 (e.g., a room or other portion of a building). In the configuration mode, the mobile device 250 may discover the messages (e.g., control device beacons) transmitted by the control devices in the load control environment 201. The messages may be communicated periodically or in response to messages communicated from the mobile device 250 via the RF communication signals 202, 204 (e.g., directly or via the system controller 240) and/or via optical signals.

The lighting control devices of the lighting fixtures 210a-210d may each transmit control device beacons that include their unique identifiers. The mobile device 250 may receive a control device beacon from the lighting control device of the lighting fixture 210a and select the lighting fixture 210a for being configured and/or controlled (e.g., based on the signal strength of their beacon identifiers). Each of the discovered control devices may be selected for configuration and/or control, or the control devices that transmitted beacons that are discovered above a received signal strength discovery threshold may be selected for configuration and/or control (e.g., for being claimed and/or associated with a configuration identifier of configuration information of the load control system 200). The control device beacons may also include a signal strength of one or more optical signals received by the lighting control devices of the lighting fixture 210a-210d, and control devices that received the optical signals having a signal strength above a signal strength discovery threshold may be selected for configuration and/or control (e.g., for being claimed and/or associated with a configuration identifier of configuration information of the load control system 200). The mobile device 250 may automatically add the selected unique identifier to a group (e.g., a temporary group) of control devices for performing configuration and/or control.

The mobile device 250 may send a confirmation message to the lighting control device of the lighting fixture 210a that indicates that the lighting control device has been discovered and selected for configuration and/or control. The confirmation message may be sent via the RF communication signals 202, 204 (e.g., directly from the mobile device 250 and/or via the system controller 240).

The confirmation message may include a temporary group identifier that may be stored at the lighting fixture 210a for identifying subsequent messages that include configuration information and/or control information. Temporary group identifiers may be used during commissioning or configuration (e.g., claiming, diagnostics, association, etc.) and/or control of the load control system when the mobile device 250 is in the configuration mode to communicate to control devices for commissioning or configuration. The temporary group identifiers may be removed from control devices or otherwise go unused after commissioning or other configuration of the load control system. In another example, the temporary group identifiers may be used as a group identifier for groups of control devices (e.g., zones or other groups of control devices) during operation of the load control system.

In response to the confirmation message, the lighting fixture 210a may provide feedback to the user 205 to indicate that the lighting fixture 210a has been selected for configuration and/or control. The feedback may be provided by changing a state of the lighting load in the lighting fixture 210a. For example, the feedback may be provided by flashing the lighting load on and off, increasing and/or decreasing the intensity level of the lighting load, increasing and/or decreasing the color (e.g., the color temperature) of the lighting load, and/or providing other visual feedback to the user 205. The feedback type may be indicated in the confirmation message from the mobile device 250, or may be preprogrammed and stored at the lighting fixtures 210a-210d.

As the user 205 moves around the load control environment 201 with the mobile device 250, the mobile device 250 may discover the control device beacons of additional lighting fixtures 210b-210d and automatically select the unique identifiers in the beacons for being configured and/or controlled in the load control environment 210. Each of the lighting fixtures 210b-210d that are selected may receive a confirmation message from the mobile device 250 and provide similar feedback to the user 205 to indicate that the lighting fixtures have been selected for configuration and/or control.

As the lighting fixtures 210b-210d are selected, the lighting fixtures may be automatically added to a group of control devices (e.g., a temporary group, zone, or other group of control devices) for collective configuration and/or control. As the user 205 moves around the load control environment 201 with the mobile device 250, the received signal strength indicators of the received control device beacons (e.g., the signal strength at which different control device beacons are received at the mobile device 250) may vary. After the control devices have been selected for configuration and/or control, the control devices may remain selected and may provide feedback indicating that they have been selected until they are deselected or the configuration (e.g., claiming, diagnostics, association, etc.) and/or control of the devices (e.g., the configuration procedure) has completed. For example, the lighting fixture 210a may continue providing feedback indicating that the lighting fixture 210a has been selected for being configured and/or controlled until the lighting fixture 210a receives a message indicating that the lighting fixture 210a is deselected or a message indicating that the configuration procedure for configuring the load control system has completed. The messages may be sent from the mobile device 250 or the system controller 240. For example, the mobile device 250 may transmit a message to deselect a control device in response to a user selection on the mobile device 250 to deselect the control device. The mobile device 250 may also, or alternatively, transmit the message to deselect the control device in response to the received signal strength indicator of the control device beacon falling below a received signal strength discovery threshold (e.g., when the control device beacon is undetected or drops below another threshold for a period of time).

The control devices transmitting beacons that have a received signal strength indicator (e.g., RSSI) that meets or exceeds a received signal strength discovery threshold may be selected for configuration and/or control. The mobile device 250 may filter out the unique identifiers of the control device beacons that have received signal strength indicators below a received signal strength discovery threshold. The received signal strength discovery threshold may be predefined and/or dynamically set at the mobile device 250. For example, the received signal strength discovery threshold may be received from another device and stored at the mobile device 250. The mobile device 250 may also, or alternatively, set the received signal strength discovery threshold in response to a user selection.

The mobile device 250 may receive the control device beacons via the RF communication signals 202, 204 and compare the received signal strength indicators of the RF communication signals 202, 204 to the received signal strength discovery threshold. The control devices that transmitted control device beacons that are received by the mobile device 250 with a received signal strength indicator below the received signal strength discovery threshold may not be selected for being configured and/or controlled in the load control environment 201. The discovery process being based on the received signal strength indicators of the RF communication signals 202, 204 may enable a more finely tuned discovery process. For example, the mobile device 250 filtering the control device beacons that are received below the received signal strength discovery threshold may enable physical boundaries (e.g., walls, ceiling, floor, dividers, etc.) within the load control environment 201 to begin to help define groups of control devices for being associated for collective load control. The physical boundaries within the load control environment 201 may produce interference of RF communication signals 202, 204 and may prevent the RF communication signals 202, 204 from being received above the received signal strength discovery threshold from devices that are outside of the physical boundaries (e.g., other rooms, other cubicles, etc.).

The lighting fixtures 210a-210d that transmit a control device beacon that is received by the mobile device 250 with a received signal strength indicator that is at or above the received signal strength discovery threshold may be automatically added to a group of control devices (e.g., a temporary group, zone, or other group of control devices) for collective configuration and/or control in the load control environment 201. For example, the control device beacons of the lighting fixtures 210a-210d that are received at the mobile device 250 with a received signal indicator strength greater than −5 dBm may be discovered and the unique identifiers may be associated with configuration identifiers in storage for being collectively controlled in the load control environment 201.

If the mobile device 250 identifies that the received signal strength indicator of a control device beacon received from one of the lighting fixtures 210a-210d is above the discovery threshold, the mobile device 250 may send a confirmation message to the lighting fixture (e.g., directly and/or via the system controller 240) and the lighting fixture may provide feedback to the user 205. For example, the mobile device 250 may identify that the signal strength of the RF communication signals 202, 204 received in the control device beacon from the lighting fixture 210a are above the received signal strength discovery threshold and a confirmation message may be sent to the lighting fixture 210a that indicates that the lighting fixture 210a has selected for being configured and/or controlled in the load control environment 201. The lighting fixture 210a may provide feedback to the user 205 to indicate that the lighting fixture 210a has been selected for being configured and/or controlled in the load control environment 201. The feedback may be provided by changing a state of the lighting load in the lighting fixture 210a. For example, the feedback may be provided by flashing (e.g., blinking) the lighting load on and off, increasing and/or decreasing (e.g., strobing) the intensity level of the lighting load, adjusting the color of the lighting load, increasing and/or decreasing the color temperature of the lighting load, and/or providing other visual feedback to the user 205. The feedback type may be indicated in the confirmation message from the mobile device 250, or may be preprogrammed and stored at the lighting fixtures 210a-210d. The intensity level, color, or color temperature may change based on the received signal strength indicators of the RF communication signals 202, 204 that are currently being received at the mobile device 250. For example, the intensity level and/or color temperature level may be increased and/or decreased for each dBm at which the RF communication signals 202, 204 are received at the mobile device 250. The intensity level and/or color temperature level may be limited to a high-end threshold for the strongest received signal strength indicator of the RF communication signals 202, 204 that are received at the mobile device 250. The intensity level and/or color temperature levels may have a low-end threshold for the weakest received signal strength indicator of the RF communication signals 202, 204 that are received at the mobile device 250.

When the control device beacons are received and/or when the received signal strength indicators of the beacons are below a received signal strength discovery threshold, the mobile device 250 and/or the system controller 240 may automatically deselect the control device that transmitted the control device beacon from being configurable and/or controllable. Alternatively, the control device may be manually deselected (e.g., by user 205) via the application running on the mobile device 250. For example, the user 205 may select devices to be removed from the list of selected control devices to be configured and/or controlled in the load control environment 201. The control device (e.g., as identified by its unique identifier) may be removed from a group of control devices (e.g., a temporary group, a zone, or other group of control devices) for being configured and/or controlled. The received signal strength discovery threshold for deselecting the control devices may be the same as, or different from, the received signal strength discovery threshold for selecting the control devices for being configured and/or controlled. After the control devices have been deselected and/or removed from a group, the control devices may provide feedback indicating that they have been deselected and/or removed from the group. For example, the lighting fixture 210a may flash, change in color, or stop providing feedback similar to the devices that have been selected and/or added to the group for collective configuration and/or control.

The received signal strength discovery threshold may be changed to configure and/or control different control devices. For example, the user 205 may adjust the received signal strength discovery threshold using the application running on the mobile device 250. The received signal strength discovery threshold may be increased to select other lighting control devices for configuration and/or control, such as the lighting control devices in the lighting fixtures 210b-210d. The received signal strength discovery threshold may be decreased to limit the lighting control devices being selected for configuration and/or control. For example, the received signal strength discovery threshold may be limited such that a single lighting fixture, such as the lighting fixture 210a, may be selected for configuration and/or control at a time as the mobile device 250 moves around the load control environment 201. As the received signal strength discovery range is increased and decreased, the control devices may be automatically added to and/or removed from a group (e.g., a temporary group, a zone, or other group of control devices) for being configured and/or controlled, respectively. When the control devices are deselected and/or removed from the group, a message may be sent to the lighting control devices that have been deselected and/or removed to cause the lighting control devices to stop providing feedback to the user 205 in response to the message.

In another example, a message may be sent to the devices to cause the devices to provide feedback indicating the control devices are within the discovery range, but a subsequent button may be selected to configure and/or control different control devices. For example, the received signal strength discovery threshold may be set at a level such that each of the lighting control devices in the lighting fixtures 210a-210d may be discovered and/or selected for configuration and/or control. The mobile device 250 may send a message to each of the lighting fixtures 210a-210d and to instruct the lighting fixtures 210a-210d to provide feedback to the user 205 that the lighting fixtures 210a-210d have been discovered and/or selected for configuration and/or control. Though the lighting fixtures 210a-210d may be providing feedback, the received signal strength discovery threshold may be adjusted to adjust the lighting control devices in the lighting fixtures 210a-210d being selected for being configured and/or controlled in the load control environment 201. The lighting control devices may be automatically selected and/or deselected for configuration and/or control as the received signal strength discovery threshold is adjusted, or the received signal strength discovery threshold may be adjusted prior to the lighting control devices being selected for configuration and/or control (e.g., in response to confirmation from the user). The user 205 may reduce the received signal strength discovery threshold to a range that includes the messages from the lighting control device of the lighting fixture 210a, but not the messages from the lighting control devices of the lighting fixtures 210b-210c. Another message may be sent to the lighting control devices of the lighting fixtures 210b-210d to cause the lighting fixtures 210b-210d to stop providing feedback. The user 205 may select a button on the mobile device 250 to select the currently discovered lighting control device of the lighting fixture 210a for being configured and/or controlled in the load control environment 210.

The user 205 may lock in the received signal strength discovery threshold (e.g., after adjustment) and the mobile device 250 may continue to select control devices for configuration and/or control as the user 205 walks around the load control environment 201 with the mobile device 250. After the user locks in the received signal strength discovery threshold, the control devices within the defined discovery range may be automatically selected for being configured and/or controlled in the load control environment 201. The user 205 may then move around the load control environment 201 to continue to automatically select control devices for configuration and/or control. The lighting control devices 210a-210d that are within the discovery range as the user 205 walks around with the mobile device 250 may provide feedback. For example, the lighting control devices 210a-210d that are within the discovery range as the user 205 walks around with the mobile device 250 may turn a predefined color to indicate to the user 205 the lighting control devices 210a-210d that are configurable and/or controllable.

As the user 205 moves around the load control environment 201 with the mobile device 250, the control devices that have already been selected for configuration and/or control, such as the lighting fixture 210a, may become undiscoverable. For example, the mobile device 250 may move outside of the wireless range of the RF communication signals 202, 204 through which the control device beacon may be communicated. After the control devices have already been selected for configuration and/or control, the control devices be configurable and/or controllable, and may provide feedback indicating that they are still configurable and/or controllable, until the devices are deselected or the configuration (e.g., claiming, diagnostics, association, etc.) and/or control of the devices (e.g., the configuration procedure) has ended. For example, the lighting control device of the lighting fixture 210a may be configurable and/or controllable until the lighting control device is deselected, even though the lighting control device of the lighting fixture 210a may become outside of the discovery range determined from the received signal strength discovery threshold.

The control devices that are transmitting control device beacons in the load control environment 201 may produce interference for other control devices communicating on the same network and/or protocol. The interference may prevent the discovery of control devices that are transmitting the control device beacons and may be otherwise discoverable without the interferences. To reduce such interference, the control devices may stop transmitting the control device beacons after receiving the confirmation message that indicates that the control device has been discovered and/or selected for configuration and/or control. The control device may continue providing feedback to the user 205 to indicate that the device is selected for configuration and/or control, but may stop transmitting the control device beacons to avoid interference and/or preserve battery in battery powered devices.

Occupancy sensing techniques may be implemented to select control devices for being configured and/or controlled in the load control environment 201. The sensors 216a-216d in the respective lighting fixtures 210a-210d may be used to select lighting fixtures 210a-210d for configuration and/or control. The sensors 216a-216d may be occupancy sensors, visible light sensors (e.g., cameras), daylight sensors, optical sensor, and/or any other type of sensor. The sensors 216a-216d may be visible light sensors (e.g., cameras). The sensors 216a-216d may function as occupancy sensors. For example, when an occupancy condition is detected by the sensor 216a, a signal may be sent from the sensor 216a to the lighting control device of the lighting fixture 210a. The lighting control device of the lighting fixture 210a may transmit a control device beacon that is communicated to the mobile device 250. The mobile device 250 may select the lighting fixture 210a to for being configured and/or controlled. The lighting fixture 210a may provide feedback in response to the occupancy condition and/or receiving a message (e.g., a confirmation message) from the mobile device 250 after the lighting fixture 210a has been selected for being configured and/or controlled in the load control environment 201.

The sensors 216a-216d may identify different levels of activity. For example, the sensors 216a-216d may identify major motion events (e.g., above a predefined high-end level of motion) and minor motion events (e.g., above a predefined low-end level of motion) within the visible area of the sensor. The sensors 216a-216d may send an occupancy condition upon identifying the defined occupancy state or the defined level of activity. The user 205 may walk under lighting fixture 210a and perform a major motion event (e.g., fast hand waving or other movement above a predefined threshold) to trigger an occupancy condition that may be identified by the sensor 216a. The user 205 may walk under a group of lighting fixtures 210a-210d to be detected by the corresponding sensors 216a-216d and select the lighting fixtures in the walking path for being configured and/or controlled (e.g., as a temporary group).

Other control devices may be selected for being configured and/or controlled in the load control environment 201. For example, the occupancy sensor 234 and/or the remote-control device 236 may be discovered via a configuration procedure (e.g., a claiming procedure and/or an association procedure) for being selected for being configured and/or controlled in the load control environment 201. The configuration procedure may be activated by actuation of a button on the occupancy sensor 234 or the remote-control device 236. The occupancy sensor 234 and/or the remote-control device 236 may be one-way communication devices that may be incapable of receiving RF communication signals 202, 204. The actuation of the button may cause the device to beacon its unique identifier. The mobile device 250 may discover the control devices that are transmitting the control device beacons and automatically select the discovered devices for configuration and/or control.

The message for discovery of the occupancy sensor 234 may be triggered upon detection of an occupancy condition when the occupancy sensor 234 is in a configuration mode (e.g., a claiming mode and/or an association mode). The occupancy sensor 234 may identify different levels of activity. For example, the occupancy sensor 234 may identify major motion events (e.g., above a predefined high-end level of motion) and minor motion events (e.g., above a predefined low-end level of motion) within the visible area of the occupancy sensor 234. The major motion events or minor motion events may be used to discover the occupancy sensor 234. After detection of a major motion event and/or a minor motion event, a message may be transmitted by the occupancy sensor 234 that may be received by the mobile device 250. The occupancy sensor 234 may be automatically selected for configuration and/or control or the received signal strength indicator of the message may be compared to the received signal strength discovery threshold for selecting the occupancy sensor 234 for being configured and/or controlled in the load control environment 201.

A control device (e.g., the lighting fixture 210a) may be selected for configuration and/or control using an optical signal. The mobile device 250 may transmit (e.g., periodically transmit) optical signals (e.g., via the optical transmitter 209). The control devices may receive the optical signal via internal detectors of the lighting loads of the lighting fixtures 210a-210d and/or sensors (e.g., sensors 216a-216d) and may measure a signal strength of one or more of the received optical signals. The mobile device 250 may transmit a configuration mode message to the load control devices of the lighting fixtures 210a-210d (e.g., directly and/or via the system controller 240) before transmitting the optical signal, and each of the control devices may enter the configuration mode when the control device receives the configuration mode message. Alternatively, each of the control devices may enter the configuration mode when the control device receives the optical signals. One or more control devices may be independently selected for being associated with a group for being configured and/or controlled.

A lighting fixture that receives the optical signal may provide feedback to the user 205 to indicate that the lighting fixture has received the optical signal. The feedback may be provided by changing a state of the lighting load in the lighting fixture. For example, the feedback may be provided by flashing (e.g., blinking) the lighting load on and off, increasing and/or decreasing (e.g., strobing) the intensity level of the lighting load, adjusting the color of the lighting load, increasing and/or decreasing the color temperature of the lighting load, and/or providing other visual feedback to the user 205.

After entering the configuration mode, the control devices (e.g., lighting control devices of the lighting fixtures 210a-210d) may each transmit (e.g., periodically transmit) an indication of the signal strength at which the optical signal was received. The mobile device 250 may receive the signal strength indications from one or more of the control devices. The mobile device 250 may select a lighting control device for being claimed based on the signal strength indications.

The mobile device 250 may send a connection message (e.g., a claiming message and/or a confirmation message) to the selected control device.

As the user 205 moves around the load control environment 201 with the mobile device 250, additional lighting fixtures 210b-210d may receive the optical signal. Each lighting fixture that receives the optical signal may provide feedback to the user 205 indicating that the lighting fixture is receiving the optical signal. The mobile device may automatically select one or more of the lighting fixtures for being configured and/or controlled in the load control environment 210. Each of the lighting fixtures 210b-210d that are selected may receive a confirmation message from the mobile device 250 and provide similar feedback to the user 205 to indicate that the lighting fixtures have been selected for configuration and/or control.

After control devices have been selected for configuration and/or control, the control devices may be displayed to the user 205 on the user interface 252 of the mobile device 250. The user 205 may select devices to be removed from the list of selected control devices to be configured and/or controlled in the load control environment 201. The lighting control devices 210a-210d that have been selected for configuration and/or control may provide a visual feedback to the user 205. For example, the lighting control devices 210a-210d that have been selected for configuration and/or control may turn on or off, blink, adjust to a predefined intensity, and/or turn a predefined color (e.g., green).

One or more of the devices selected for configuration and/or control may be identified for configuration and/or control at a given time. For example, the user 205 and/or the mobile device 250 may identify a lighting control device 210a-210d for being configured. The lighting control device may be identified by user selection on the mobile device 250. In another example, the lighting control device may be automatically identified as the device from which the strongest control device beacon is received at the mobile device 250. The lighting control device 210a-210d that is identified for configuration and/or control may provide a different feedback type than other control devices selected for configuration and/or control. For example, the identified lighting control device may turn a different color (e.g., blue). This may allow the user 205 to visually identify the device being configured.

When a device is deselected for configuration and/or control, a message may be sent to the control device (e.g., lighting control devices in the lighting fixtures 210a-210d) to indicate that the control device has been deselected. The message may cause the control device to stop providing feedback that the device selected for configuration and/or control. For example, the lighting fixture 210a may stop providing feedback to the user 205 after receiving an indication that the lighting fixture 210a has been deselected. Any configuration information (e.g., claiming information and/or association information) stored thereon that relates to other control devices selected for configuration and/or control (e.g., a unique identifier of a temporary group including the devices selected for configuration and/or control or control devices in the temporary group) may be deleted at the control device that has been deselected.

After the list of control devices includes the control devices to be configured and/or controlled in the load control environment, the user may select a button on the mobile device 250 (e.g., via the user interface 252) to trigger the association of the selected devices. If the configuration information that relates to a temporary group of control devices selected for configuration and/or control (e.g., unique identifier of the temporary group or control devices in the temporary group) has yet to be communicated to the control devices in the temporary group, the configuration information may be communicated to the devices. For example, a temporary group identifier may be communicated to the lighting fixtures 210a-210d for enabling control upon receipt of a message that includes the temporary group identifier from the occupancy sensor 234, the remote-control device 236, the system controller 240, and/or the mobile device 250. The control devices may be configured (e.g., claimed and/or associated) by transmitting the identifiers of the control devices selected for configuration and/or control to other devices selected for configuration and/or control for storage thereon.

The temporary group of control devices may be associated with a unique identifier of a location. For example, the temporary group identifier for enabling control of devices in the temporary group may be a location beacon. The location beacon may be discovered and communicated to the temporary group of devices for performing control at the location.

Figure 2D:
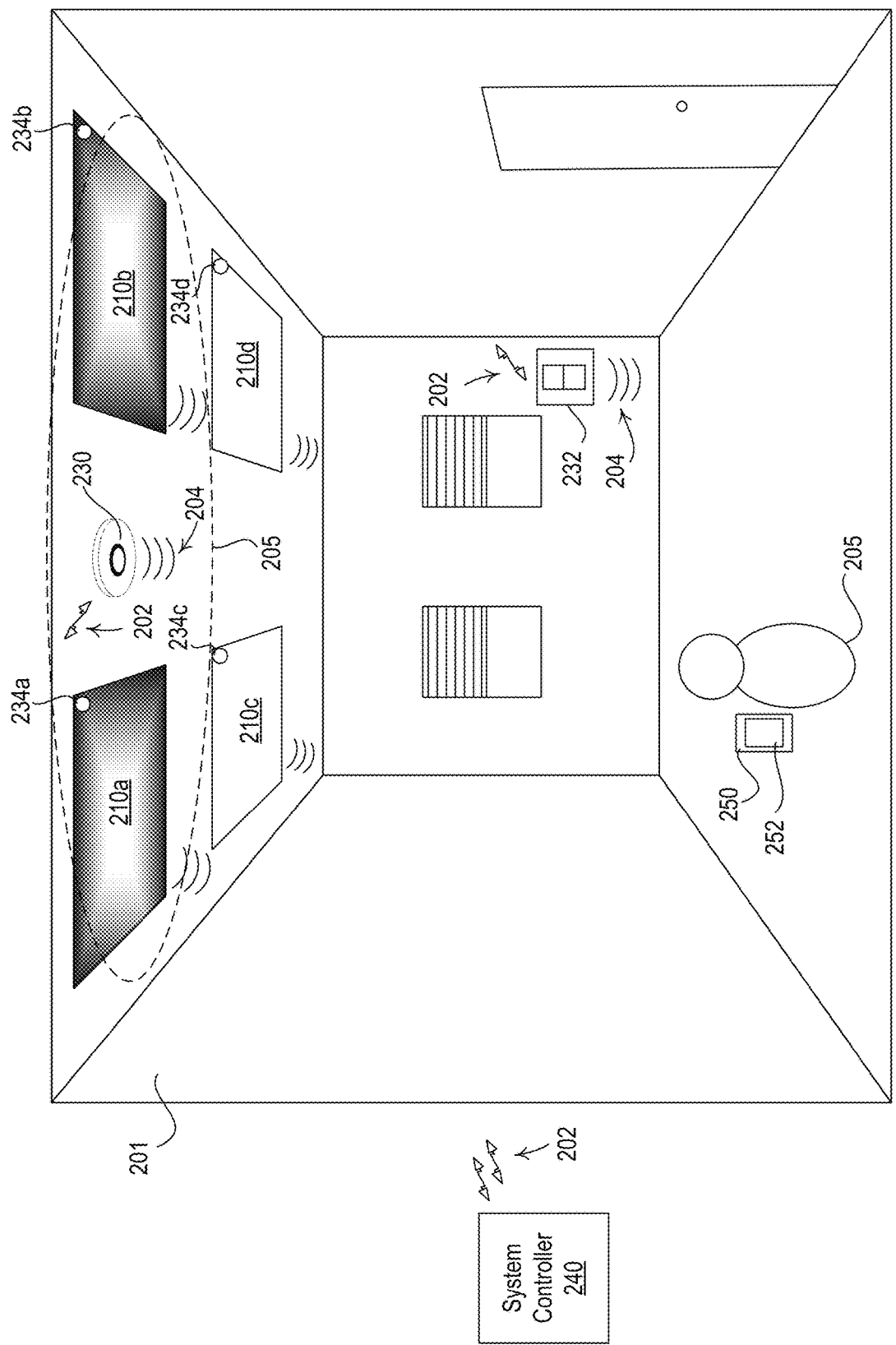

FIG. 2D illustrates another example for configuring and/or controlling control devices using beacons in the representative load control environment 201. As shown in FIG. 2D, the lighting fixtures 210a, 210b may be used to provide feedback that indicates an occupancy/vacancy transmission range 205 of the occupancy sensor 230. Communication errors may be caused by messages failing to be appropriately communicated to other devices in the system from occupancy/vacancy sensors. The occupancy sensor 234 may be configured to transmit a beacon (e.g., a ranging beacon) that may be received at the lighting fixtures 210a, 210b to provide feedback to the user 205 of the transmission range 205 associated with the occupancy sensor 234. After the occupancy sensor 234 is in a ranging mode, the occupancy sensor 234 may transmit the ranging beacon to the lighting control devices of the lighting fixtures 210a-210d to indicate the lighting fixtures 210a-210d that receive the ranging beacon, or receive the ranging beacon at or above a predefined ranging threshold, to provide feedback. The feedback may indicate the transmission range 205 of the occupancy sensor 234 and/or the lighting control devices that may be responsive to occupancy and/or vacancy conditions detected by the occupancy sensor 234.

The occupancy sensor 234 may transmit the ranging beacon via the RF communication signals 204. The ranging beacon may include the ranging threshold that may indicate an adequate received signal strength indicator that corresponds to the transmission range 205 of the occupancy sensor 234. The ranging threshold may also, or alternatively, be predefined at the lighting control devices of the lighting fixtures 210a-210d. The lighting control devices of the lighting fixtures 210a, 210b that receive the message from the occupancy sensor 234 with a received signal strength indicator at or above the ranging threshold may provide feedback to the user 205 to indicate the transmission range 205 of the occupancy sensor 234. The feedback may be provided for a period of time after receiving the ranging beacon. If another ranging beacon is not received, or is received with a received signal strength indicator that is below the ranging threshold, during the predefined period of time, the lighting control devices of the lighting fixtures 210a, 210b may stop providing feedback at the end of the predefined period of time. The lighting fixtures 210c, 210d that may receive the ranging beacon from the occupancy sensor 234 with a received signal strength indicator below the wireless threshold, and/or fail to receive the ranging beacon from the occupancy sensor, may fail to provide feedback to the user 205. The feedback may assist the user 205 in the placement of the occupancy sensor 234 with in the load control environment 201. The feedback may indicate when messages are being appropriately communicated to the control devices in the system, and/or when the transmission range of the occupancy sensor 234 overlaps with another occupancy sensor in the same area.

Figure 2E:
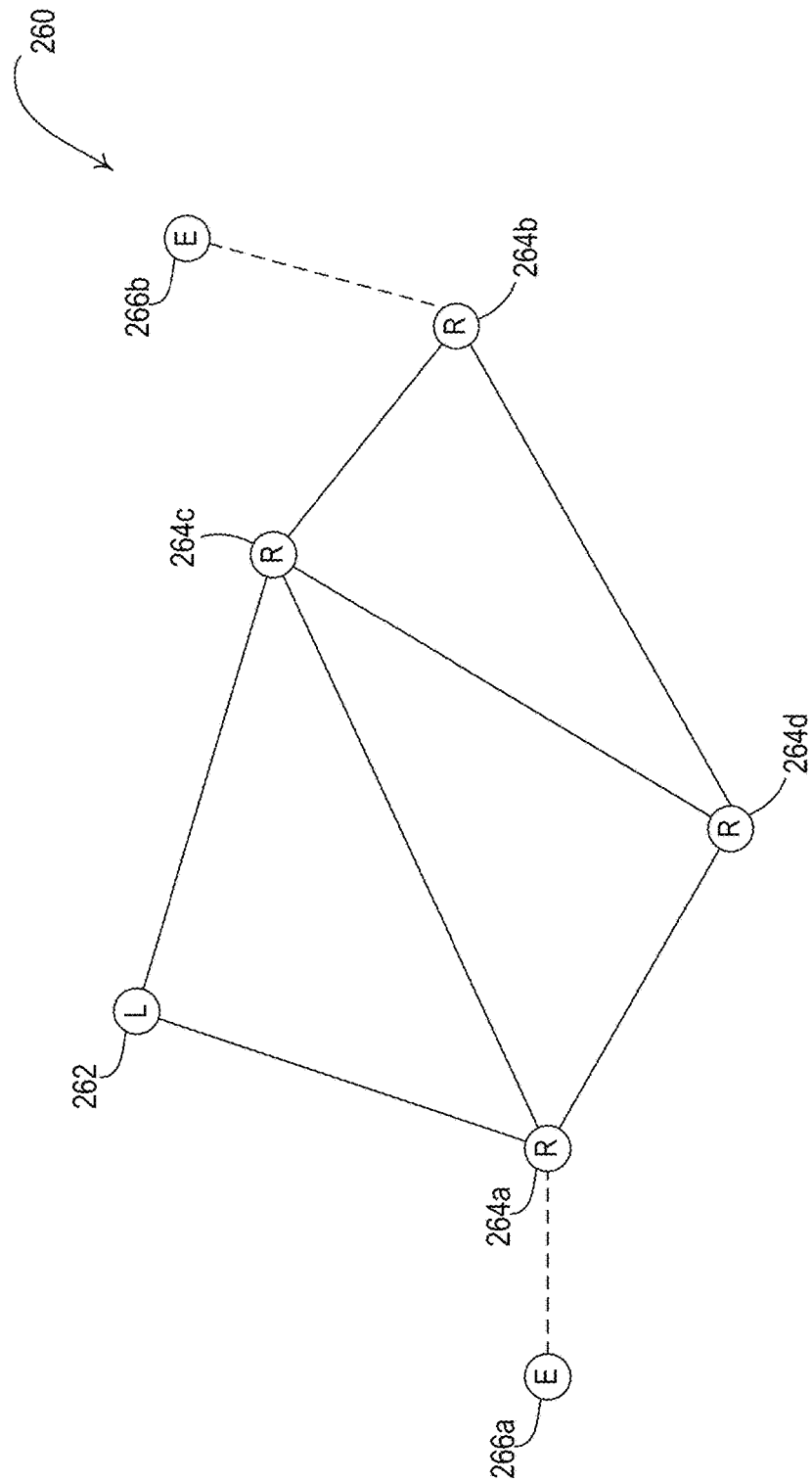
FIG. 2E is a diagram of an example network for communication within the load control system of FIG. 1.

FIG. 2E is an illustration of an example network 260 that may allow for communication between devices in a load control system (e.g., the load control system 100 and/or the load control system 200). The network 260 may include any suitable network to facilitate communications in a load control system or an Internet of Things (IoT) environment. For example, the network 260 may use the Thread® network protocol. The various control devices of the load control system 200 may communicate with each other via the network 260. As shown in FIG. 2E, the network 260 may comprise a single network partition. In addition, the network 260 may be an example of a network partition (e.g., a subnetwork or subnet) within a larger network. For example, the network 260 may be an example of a network partition within a larger network composed of a plurality of network partitions. The network 260 is an example network and the techniques described herein may be applied to other networks, for example, that include more devices or fewer devices than the network 260.

The circled nodes of FIG. 2E may represent devices that are joined to the network 260 and are attached to other devices the network 260 (e.g. the various control devices of the load control system 100 and/or load control system 200). A device that is attached to at least one other device on the network 260 may communicate with the other devices (e.g., that are attached to another device on the network 260). Communication within the network 260 may be facilitated by the links (e.g., attachments) established within the network 260. Referring to FIG. 2E, the links between the devices may be indicated by lines (e.g., solid and dashed lines) that connect the respective devices.

One or more of the devices shown in FIG. 2D may be joined to the network 260 via a joining procedure. The network 260 may be a mesh network, and each device may exchange network credentials with a commissioning device (e.g., the system controller or the mobile device) that may allow the device to join the network 260 and enable the device to communicate on the network 260. A device may be able to communicate with other devices using another wireless protocol, but may be unable to communicate with or attach to other devices on the network 260 without the network credentials. The network credentials may include a joinder identifier (e.g., or any other identifier) that the device may use to join the network 260 and communicate with another device.

A device may be claimed (e.g., via a claiming procedure) before being joined to the network 260. For example, the claiming procedure may be used to identify devices (e.g., individual devices and/or groups of devices) for being joined to the network 260. As part of the claiming procedure, a device may exchange credentials with a commissioning device to enable the device to communicate on the network 260. Without this exchange of credentials, the device may not get the joiner ID and may be unable to communicate on the network 260.

The devices attached to at least one other device on the network 260 may take on and/or be assigned a respective role in the network. For example, the roles may include: a leader device (e.g., leader device 262), a router device (e.g., router devices 264a-264d), and/or an end device (e.g., end devices 266a and 266b). The role of a device may indicate the functions and/or capabilities of the device with respect to the network 260.

As illustrated in FIG. 2E, the network 260 may include a leader device 262. The leader device 262 may manage other devices attached to the network 260. For example, the leader device 262 may assign and maintain router identifiers (e.g., router IDs) for each of the router devices 264a-264d. For example, each of the router devices 264a-264d may be assigned a unique router identifier. The leader device 262 may assign and maintain the roles of other devices. The leader device 262 may be configured as the gateway for the network 260. For example, the leader device may a device that facilitates communication (e.g., routes and receives messages to and from) between the network 260 and other networks or network partitions. Referring to FIG. 2A, a system controller (e.g., the system controller 240 shown in FIG. 2A) may be an example of a leader device 262. In addition, a device within a load control system that is capable of being assigned to the role of a router device may be assigned to the role of the leader device (e.g., a control device).

The network 260 may include one or more router devices 264a-264d. The leader device 262 may support and be attached to multiple router devices (e.g., more than 30 router devices). The leader device 262 may operate as a router device. The router devices 264a-264d on the network 200 (e.g., attached to the leader device 262 on the network 260) may be in communication with each other, for example, to form a mesh network. The router devices 264a-264d may be in communication with one another (e.g., as indicated by the solid lines connecting the router devices 264a-264d). The router devices 264a-264d may be in communication with the leader device 262, either directly or through one or more other router devices (e.g., as indicated by the solid lines connecting the leader device 262 to the router devices 264a and 264c). The router devices 264a-264d may receive and route messages to other devices on the network 260 (e.g., the end devices 266a, 266b). For example, the router devices 264a-264d may receive/transmit messages between devices, or between each other for communicating messages received from an attached device to another device attached to another router device. Referring now to the load control system 200 shown in FIG. 2A, a device that is, for example, externally powered by an AC main (e.g., a device that is not battery powered) may be assigned to the role of a router device. For example, the system controller 240 and/or the lighting control devices of the lighting fixtures 210a-210d may be assigned to the role of router devices.

The network 260 may include one or more end devices 266a, 266b (e.g., full or minimal end devices). Each of the end devices 266a, 266b may be attached to another device (e.g., a parent device) on the network 200 and may transmit and/or receive messages via an attached router device 264a-264d. For example, the end devices 266a, 266b may each transmit an address (e.g., a network address), a joiner identifier (e.g., for network authentication), and/or other types of device identification data to one or more of the router devices 264a-264d. Though two end devices 266a, 262b are shown in FIG. 2E, and each is attached to different router devices, each router device 264a-264d may support multiple end devices (e.g., more than 500 end devices). Referring to the load control system 200 of FIG. 2A, the system controller 240, input devices (e.g., the remote control device 232 and/or the occupancy sensor 230), and/or load control devices (e.g., the lighting control devices of the lighting fixtures 210a-210d), may be examples of the end devices 266a, 266b shown in FIG. 2E.

The leader device 262 may update the roles (e.g., or confirm role updates) of the devices communicating within the network 260, for example, based on changes to the network 260. In an example, a device may be assigned to a certain role when the device attaches to the network 260, and the leader device 262 may update the role of the device based on changes in network conditions. Changes in network conditions may include: increased message traffic, attachment of other devices, changes in signal strength, etc. Updates to the assigned role of a device may be based on the capabilities of the device. The leader device 262 may update the role of a device to a router device by assigning a router identifier (ID) to the device.

The devices attached to other devices on the network 260 may further operate as parent devices and child devices. Leader device (e.g., the leader device 262) and router devices (e.g., the router devices 264a-264d) that are attached to one or more end devices (e.g., the end devices 266a, 266b) may operate as parent devices. End devices (e.g., the end devices 266a, 266b) that are attached to a leader device (e.g., the leader device 262) and/or a router device (e.g., one of the router devices 264a-264d) may operate as child devices. As parent devices, the leader device 262 and the router devices 264a-264d may each be attached to one or more child devices (e.g., one or more of the end devices 266a, 266b, as described herein). In addition, the leader device 262 and the router devices 264a-264d may store and/or relay messages that are sent by their respective attached child devices. For example, the leader device 262 and the router devices 264 may receive messages from their respective child devices and route the received messages to the intended recipient device (e.g., either directly or via the respective parent device of the intended recipient device). Similarly, the leader device 262 and the router devices 264a-264d may receive messages intended for their respective child device and route the message to the appropriate child device.

As indicated in FIG. 2E, the relationship (e.g., attachment) between a child device and a respective parent device may be indicated by dashed lines. The router device 264a may receive messages intended for the end device 266a and forward the message to the end device 266a. As the router device 264a is configured as the parent device of the end device 266a, the end device 266a may transmit messages to the router device 264a, and the router device 264a may route the message to the intended recipient. For example, when the end device 266a intends to transmit a message to the end device 266b, the end device 266a may initially transmit the message to the router device 264a. The router device 264a may route the message to the router device 264b (e.g., the parent device of the end device 266b), and the router device 264b may then forward to message to the end device 266b.

As described herein, the network 260 may allow for communication between devices in a load control system (e.g., the load control system 200 shown in FIG. 2A). The end devices 266a, 266b may include load control devices (e.g., control-target devices) and/or input devices (e.g., control-source devices) that communicate with other devices in the load control system. For example, the end device 266a may communicate with another end device in the load control system via RF communications.

Referring to FIG. 2A, the remote control device 232 may operate as an end device for communicating digital messages comprising indications of user input and/or control instructions for controlling another end device (e.g., the lighting control devices of the lighting fixtures 210a-210d). The remote control device 232 may communicate via one or more intermediary parent devices, such as a leader device and/or a router device, for example. The leader device and/or the router device may communicate with one or more other leader devices and/or router devices in the network to route the messages to the other end device (e.g., the lighting control devices of the lighting fixtures 210a-210d) for performing load control.

Figure 3:
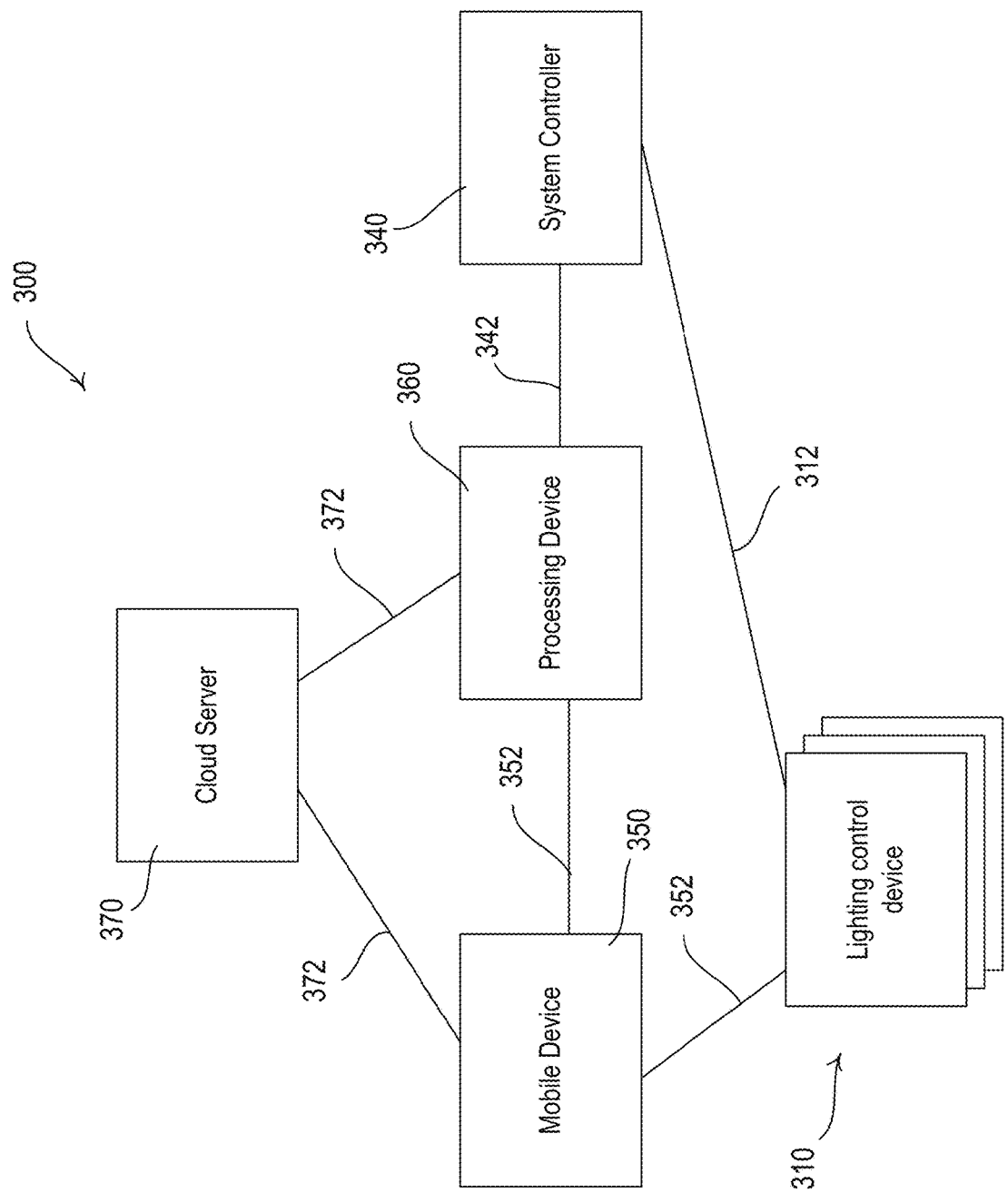
FIG. 3 is a system diagram illustrating a representative control system for configuring and/or controlling one or more control devices using beacons.

FIG. 3 is a system diagram illustrating an example control system 300 (e.g., the load control system 100 shown in FIG. 1 and/or the load control system 200 shown in FIGS. 2A-2C). As shown in FIG. 3, the control system 300 may include load control devices, such as lighting control devices 310 (e.g., the lighting control device 114 of the lighting fixtures 110, the lighting control devices 124a-124c of the lighting fixtures 120a-120c, the controllable light source 122 of the lighting fixture, and/or the lighting control devices of the lighting fixtures 210a-210d, 220a-220d), for being commissioned. The lighting control devices 310 may be commissioned by configuring the lighting control devices 310 for lighting control. The lighting control devices 310 may be configured for lighting control by being claimed, assigned to different fixtures, groups, zones and/or locations in configuration data of the control system 300 and/or joined to a communication link 312, such as a wireless communication network. The lighting control devices 310 may be configured by defining preset scenes or other lighting control parameters by which the lighting control devices 310 may be controlled.

The control system 300 may include a system controller 340 (e.g., the system controller 140). The system controller 340 may be in communication with the lighting control devices 310 via the communication link 312 for performing lighting control according to lighting control configuration information that may be previously stored thereon (e.g., on the system controller 340) during operation. The lighting control configuration information may include preset configurations, zone configurations, occupancy configurations, and/or timing schedule configurations for controlling the lighting control devices 310.

The lighting control configuration information may be generated by a network device, such as a processing device 360 (e.g., a personal computer or a laptop). The processing device 360 may be a network device on which design software may be executed for configuring (e.g., claiming, diagnostics, association, etc.) and/or controlling the design of the load control system within a load control environment. The processing device 360 may generate a control database including the lighting control configuration information (e.g., load control parameters) based on the floorplan and design of the lighting control system. The processing device 360 may generate a project code identifier for identifying the project within which the floorplan and/or control database for controlling devices in the floorplan are stored. The lighting control configuration information of the control database may be stored at the lighting fixtures 310 or at the system controller 340 for enabling lighting control according to the information. The processing device 360 may be in communication with the system controller 340 via communication link 342. The communication link 342 may be a wired or wireless communication link, such as an Ethernet link and/or a local network HTTPS communication link, for example.

The system controller 340 may send the lighting control configuration information to the lighting control devices 310 and/or control the lighting control devices 310 according to the lighting control configuration information. The system controller 340 may communicate with the lighting control devices 310 via the communication link 312 (e.g., the wireless communication network). The communication link 312 may include RF communication signals communicated via one or more protocols (e.g., standard communication protocols, such as a WI-FT®, WI-MAX®; BLUETOOTH®; NFC; ZIGBEE®, Thread; and/or proprietary communication protocols, such as CLEAR CONNECT™, Z-WAVE). The communication link 312 may include an Ethernet link or other wired network communication link.

After generating the lighting control configuration information at the processing device 360, the processing device 360 may share the lighting control configuration information with other devices for being updated and/or to assist in commissioning of the control system 300. For example, the processing device 360 may store the lighting control configuration information on a remote data source, such as a cloud server 370, for access by other devices. The processing device 360 may communicate with the cloud server 370 via a communication link 372. The communication link 372 may enable communications via wired and/or wireless signals (e.g., using Internet protocol (IP) and/or Hypertext Transfer Protocol (HTTP) communications). The lighting control configuration information may be stored at the processing device 360 and/or the cloud server 370 with a project identifier for being differentiated from other projects.

The control system 300 may include a network device, such as a mobile device 350 (e.g., a smart phone or a tablet), which may be implemented to claim (e.g., discover) control devices (e.g., the lighting control devices 310) for commissioning the control system 300. The mobile device 350 may allow a user to access a control database for a project in the control system 300 and discover the lighting control devices 310 for being configured for the project. The lighting control devices 310 may be discovered by the mobile device 350 via a wireless communication link 352 (e.g., a short-range wireless communication link). The wireless communication link 352 may allow for the communication of beacons or other short-range RF communications. The wireless communication link 352 may comprise RF signals that are communicated using the BLUETOOTH® communication protocol or the BLUETOOTH® low energy (BLE) communication protocol. Though the wireless communication link 352 may be described herein as including RF signals communicated using the BLUETOOTH® communication protocol, other short-range RF communication protocols may be implemented. For example, the wireless communication link 352 may include RF signals communicated using the near field communication (NFC) protocol, WI-FI communication protocol, and/or other RF communication protocols.

The mobile device 350 may access the lighting control configuration information of the control database from the cloud server 370 and/or from the processing device 360. The mobile device 350 may be in communication with the cloud server 370 via the communication link 372. The mobile device 350 may be in communication with the processing device 360 via a wireless communication link 352. The mobile device 350 may also, or alternatively, access the lighting control configuration information of the control database via a direct wired connection, such as a universal serial bus (USB) cable, and/or a computer-readable medium, such as a USB drive or other external memory.

The mobile device 350 may execute an application locally thereon to assist in commissioning the control system 300. The user may select a button on the application to synchronize the lighting control configuration information in the application with the lighting control configuration information stored for a project in the cloud server 370. A user of the mobile device 350 may access area and zone information in the lighting control configuration information for assigning lighting control devices 310 that have been discovered.

As the lighting control devices 310 are assigned to fixtures, groups, zones, and/or locations at the mobile device 350, the lighting control configuration information may be updated and sent to the cloud server 370. For example, the lighting control device identifiers and/or beacon identifiers of each lighting control device 310 may be stored with an associated area, zone and/or position within a zone for being controlled accordingly. The lighting control configuration information may then be accessed by the processing device 360 for being sent to the system controller 340 and/or the lighting control devices 310 for enabling lighting control according to the updated assignments.

Figure 4A:
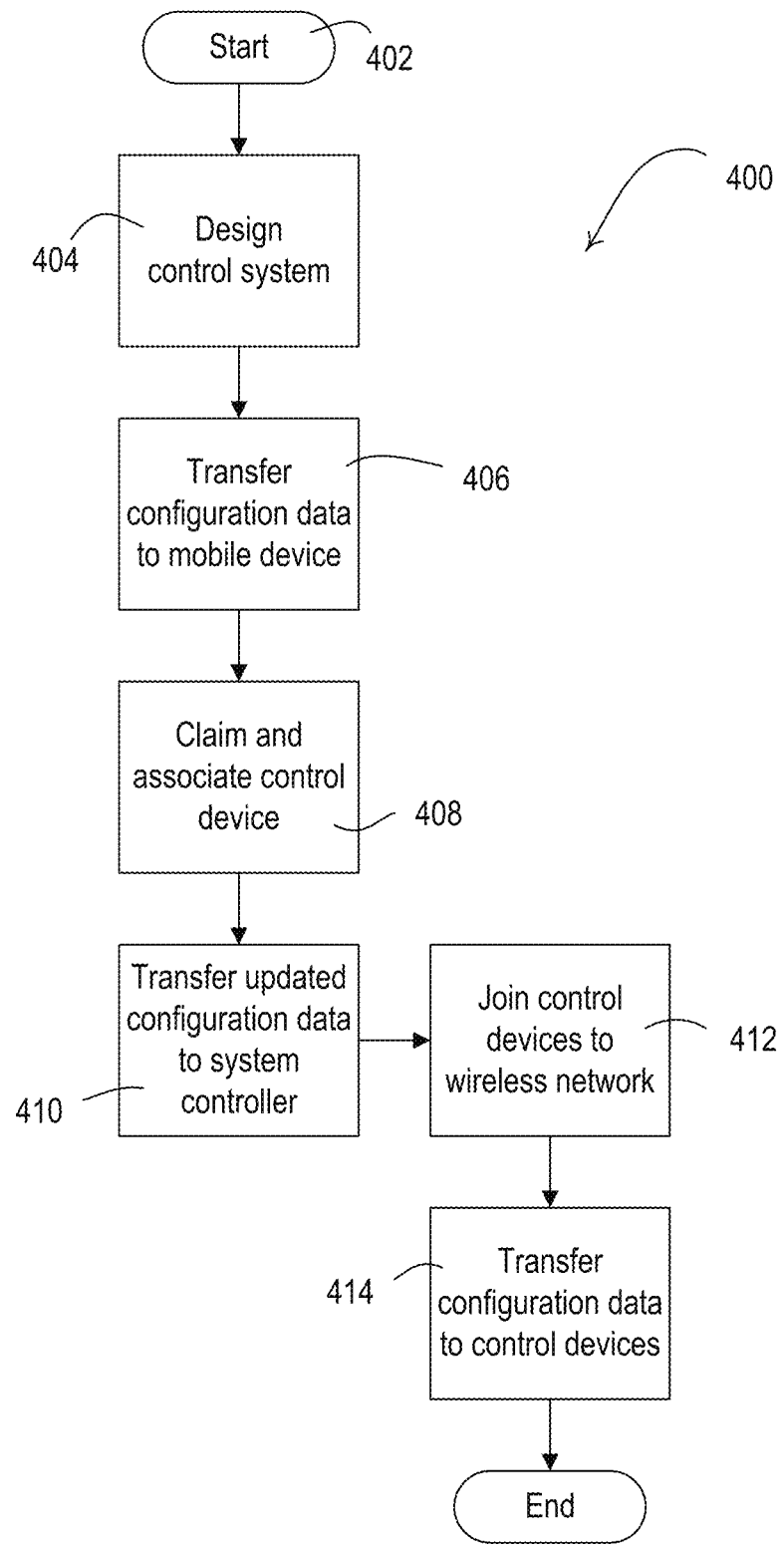
FIG. 4A is a flowchart depicting an example method (e.g., a commissioning procedure) for commissioning a control system.

FIG. 4A is a flowchart depicting an example method 400 (e.g., a commissioning procedure) for commissioning a control system, such as a load control system (e.g., the load control system 100). The method 400 may be implemented by one or more devices. For example, the method 400 may be implemented by a system controller (e.g., the system controller 140, 240, 340), a cloud server (e.g., the cloud server 170, 370), and/or a network device, such as a mobile device (e.g., the mobile device 150, 250, 350) and/or a processing device (e.g., such as the processing device 160, 360). The method 400 may begin at 402.

At 404, the load control system may be designed (e.g., as part of a design procedure). For example, the load control system may be designed using a design software running on the processing device. The design software may be configured to generate configuration data that may define the operation and/or functionality of the load control system. The configuration data may be stored in a configuration database (e.g., on the processing device, the cloud server, the mobile device, and/or the system controller). The processing device may store the configuration data (e.g., the configuration database) in a project (e.g., which may include other identifying information of a building in which the load control system may be installed). The configuration data may include representations of the control devices (e.g., lighting fixtures, occupancy sensors, remote control devices, etc.) in the load control system, as well as configuration identifiers (e.g., fixtures, groups, zones, areas, and/or location identifiers) of the control devices. For example, the configuration data may define functionality of the control devices (e.g., how lighting fixtures respond to the occupancy sensors and/or the remote-control devices). The configuration data may define lighting control configuration information including control parameters that may be stored in the control devices and/or the system controller (e.g., as will be described below at 414). The control parameters may be used by the control devices and/or system controller to control electrical loads during normal operation (e.g., after the method 400 is complete).

At 406, the configuration data (e.g., all or portions of the configuration database) may be transferred from the processing device to the mobile device (e.g., as part of a configuration data transfer procedure). For example, the processing device may be configured to transfer the configuration data to the mobile device via the cloud server. When the configuration data is ready to be transferred (e.g., when the control devices of the control system are ready to be claimed and/or associated with configuration identifiers (e.g., zone or group identifiers for being joined to a network)

of the configuration data, the processing device may transmit the configuration data to the cloud server via the Internet (e.g., via the communication link 372 using IP and/or HTTP communications). The processing device may display a project code (e.g., a code unique to the project of the load control system being commissioned). For example, the project code may comprise an alphanumeric sequence. A user may enter the project code into a configuration application running on the mobile device. The mobile device may transmit the project code to the cloud server, which may transmit the configuration data to the mobile device. In addition, the processing device may display a machine-readable code, such as a barcode and/or a quick response (QR) code, and the mobile device may scan the machine-readable code to determine the project code. When the processing device and/or the mobile device do not have Internet access, the configuration data may be transferred (e.g., directly transmitted) from the processing device to the mobile device via a direct wired connection, such as a universal serial bus (USB) cable, and/or a computer-readable medium, such as a USB drive or other external memory at 406. Further, the configuration data may be transmitted (e.g., directly transmitted) from the processing device to the mobile device via a short-range wireless communication link (e.g., via the communication link 352 using BLUETOOTH® or BLE technology).

At 408, the control devices of the load control system may be claimed and/or associated with configuration identifiers of the configuration data (e.g., fixtures, groups, zones, areas, and/or locations that may be defined by the configuration data). For example, the mobile device may claim and/or associate the control devices with the configuration identifiers of the configuration data as part of a configuration procedure (e.g., a claiming procedure and/or an association procedure) at 408. For example, the mobile device may begin to transmit (e.g., periodically transmit) a mobile device beacon via a short-range wireless communication link (e.g., via the communication link 352 using BLE technology). The control devices that receive the mobile device beacon and are within a discovery range of the mobile device may be configured to transmit a respective control device beacon. The mobile device may receive control device beacons from multiple control devices and may choose a control device from which a control device beacon was received to claim (e.g., the control device from which a control device beacon was received with the strongest received signal strength indicator). The installer may choose the configuration identifier to which to associate the present control device from the mobile device to initiate claiming of the control device. The installer may move the mobile device around the building in which the load control system is installed to claim and associate each of the control devices. As each of the control devices are claimed, the control device that is being claimed may transmit a unique identifier (e.g., a serial number) to the mobile device, and the mobile device may store the unique identifier as well as information about the association between the configuration identifier and the control device in the configuration data. When the installer is done claiming control devices (e.g., the mobile device has claimed all or a portion of the control devices of the load control system), the configuration procedure may end.

Before being claimed at 408, the control devices may (e.g., continuously) listen for the mobile device beacon on the short-range wireless communication link (e.g., the communication link 352). After being claimed at 408, the control devices may enter a joining mode. In the joining mode, the control devices may periodically switch between listening for the mobile device beacon (e.g., using BLE technology) and listening for a request to join a wireless communication network (e.g., the communication link 312). Switching between listening for the mobile device beacon and listening for the request to join the wireless communication network may allow the control devices to be ready to join the wireless communication network while still allowing the mobile device to connect to one or more of the control devices (e.g., to correct mistakes made while claiming a control device, or to unclaim a control device).

At 410, the configuration data (e.g., as updated during the configuration procedure of 408) may be transferred from the mobile device to the system controller. For example, the configuration data may be transferred from the mobile device to the system controller via the processing device. For example, the mobile device may be configured to transfer the configuration data to the processing device via the cloud server, via a direct wired connection, and/or via a short-range wireless communication link (e.g., as described above at 406). The processing device may then transmit the configuration data (e.g., all or a portion of the configuration database) to the system controller or another commissioner device (e.g., via the communication link 342). The commissioner device may be a device on a wireless communications network (e.g., a Thread® network) that is used to join other devices to the network. For example, the commissioner device may be a system controller, a lighting control device, a control-source device, etc. In addition, the mobile device may be configured to transmit the configuration data to the system controller via the cloud server (e.g., without transmitting the configuration data to the processing device). Further, the mobile device may be configured to transmit (e.g., directly transmit) the configuration data to the system controller via a direct wired connection and/or via a short-range wireless communication link.

The configuration data may include device identification data received from control devices, such as lighting fixtures. The system controller or other commissioner device may receive the device identification data of multiple devices. For example, multiple devices may have participated in the claiming procedure performed at 408. For each device that participated in the claiming procedure, the network device may transfer device identification data to the system controller or other commissioner device. The device identification data for each device may be transferred separately (e.g., not at the same time). The system controller or other commissioner device may indicate to a user (e.g., via an application executing on a separate computing device) how many devices have been claimed for being joined to the network and/or how many devices remain to be claimed for being joined to the network. For example, the network device may display a list of each control device in the area (e.g., in textual or graphic form). The color of a lighting fixture may change once the system controller or other commissioner device has received device identification data for that lighting fixture. The system controller or other commissioner device may aggregate the device identification data received from the devices and may generate a single list of lighting fixtures.

The system controller or other commissioner device may be operating in an offline mode (e.g., the commissioner device may be disconnected from the Internet or otherwise unable to access a particular online service used during commissioning). The network device may transfer the device identification data to the system controller or other commissioner device (e.g., directly to the commissioner device) via, for example, an RF signal, a USB transfer, and/or the like. In addition, the network device may transfer the device identification data to the system controller or other commissioner device via a processing device. The network device may be physically connected to the processing device (e.g., via USB). For example, the network device and the processing device may be connected by a cord with USB connectors at either end. The network device may transfer the device identification data to the processing device via the physical connection. The network device may be physically connected to the system controller or other commissioner device via a wired digital communication link (e.g., via an Ethernet link). The processing device may transfer the device identification data to the system controller or other commissioner device via the wired digital communication link. The network device may transfer the device identification data by transferring (e.g., copying) the device identification data to an external drive (e.g., a removable memory). The external drive may be connected to the processing device and the processing device may transfer (e.g., copy) the device identification data from the external drive to local memory. The processing device may store the device identification data in memory. The processing device may then transfer the device identification data to the commissioner device via the wired digital communication link. The commissioner device may also store the device identification data in memory.

At 412, the control devices that were claimed at 408 may be joined to a wireless communication network (e.g., the communication link 312). The system controller may operate as a commissioner device for joining the control devices to the wireless communication network. After the control devices are joined to the wireless communication network, the control devices may communicate with each other via the wireless communication network during normal operation. In addition, the control devices may stop monitoring the network on which the mobile device beacon was received, and may communicate on the wireless communication network (e.g., exclusively). At 414, the configuration data may be transferred to the control devices. For example, the system controller may transmit a portion of the configuration database that is relevant to a respective control device to that control device.

Figure 4B:
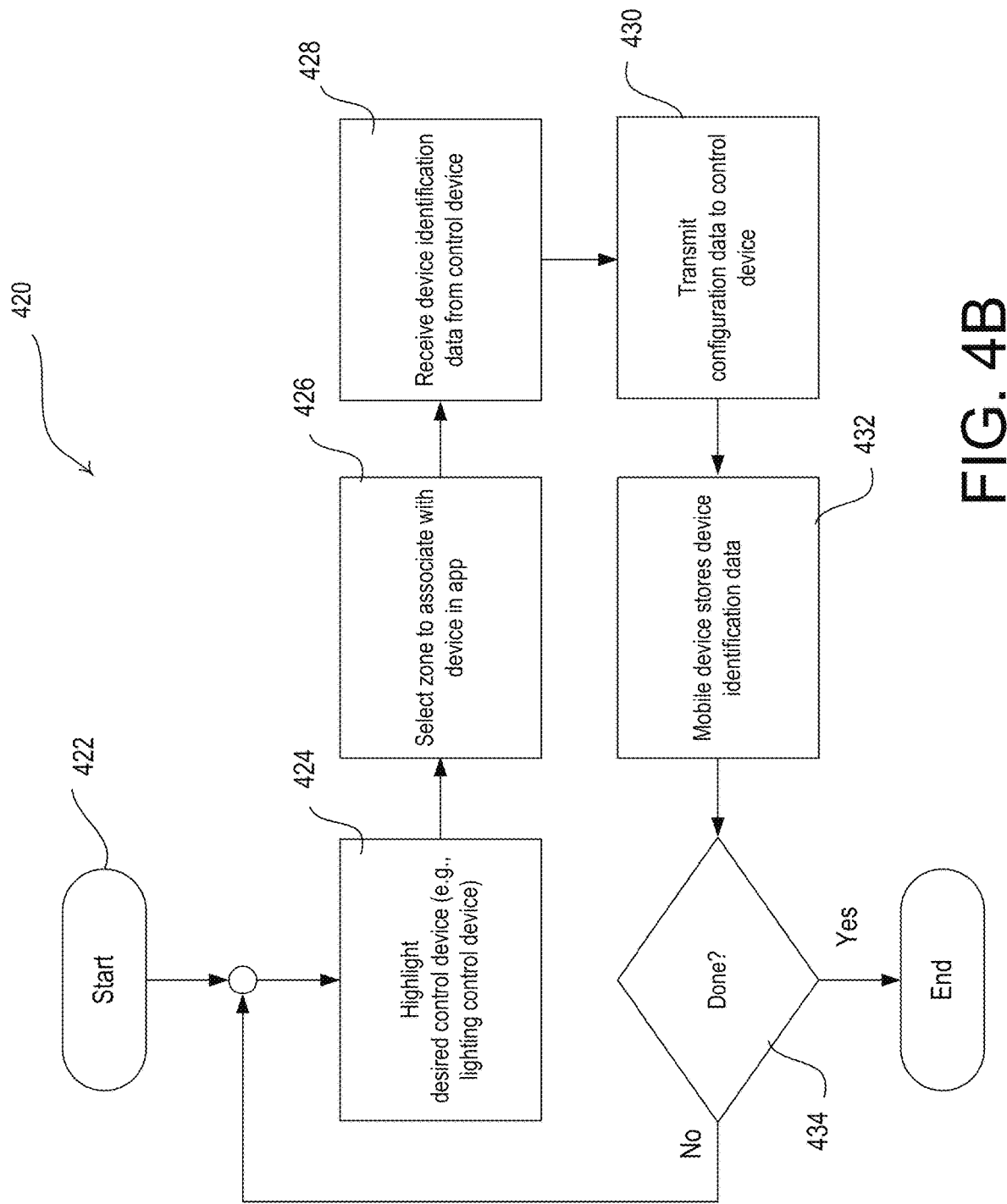
FIG. 4B is a flowchart depicting an example method of a claiming procedure for claiming devices for commissioning a control system in an offline mode.
Figure 4C:
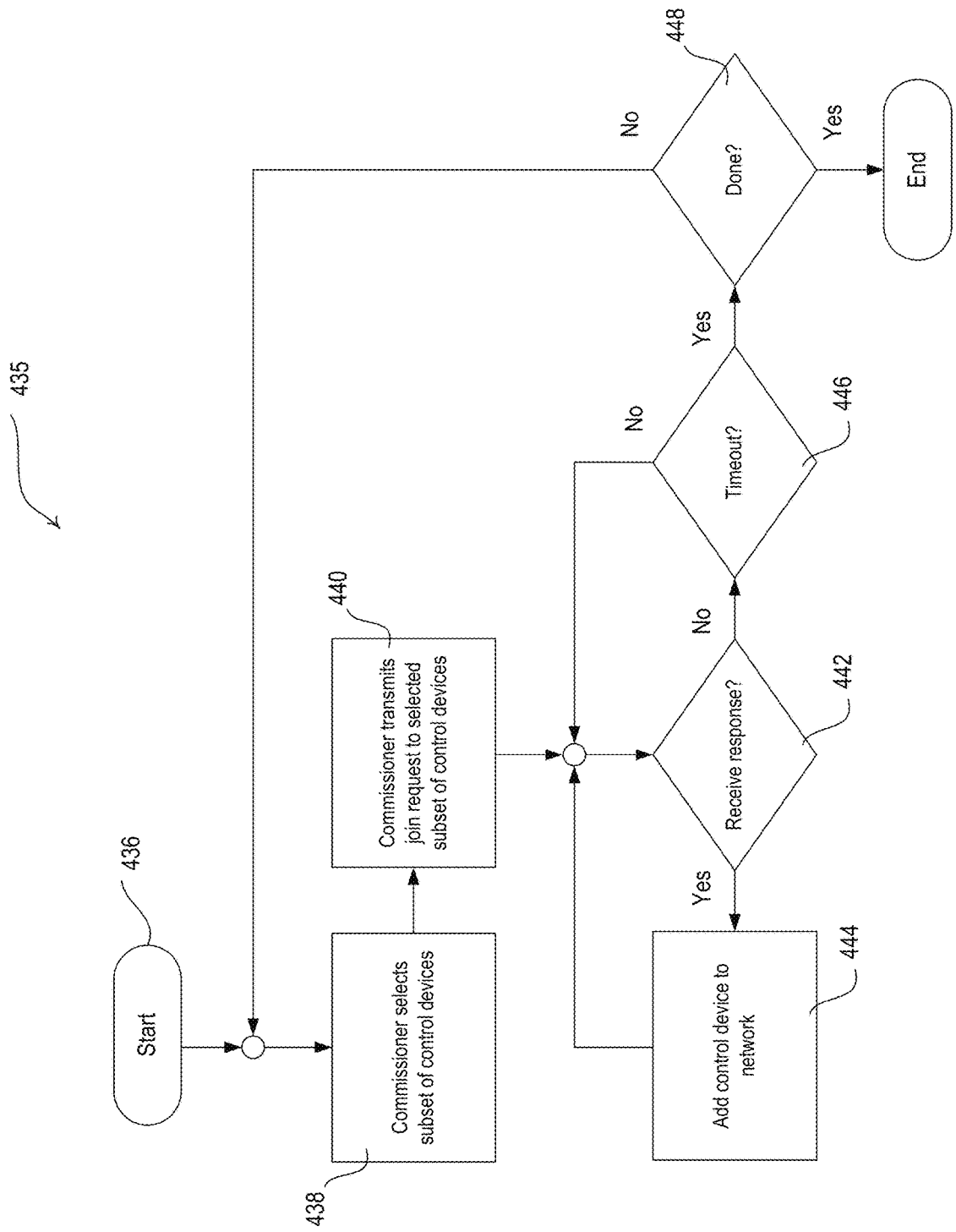
FIG. 4C is a flowchart depicting an example method of a joining procedure for joining devices in a control system to a network in an offline mode.

FIGS. 4B and 4C are flowcharts illustrating example methods 420, 435, respectively, that illustrate detailed portions of a commissioning procedure. The methods 420, 435 may be performed during a commissioning procedure (e.g., the commissioning procedure of the method 400 shown in FIG. 4A) for configuring and/or controlling one or more control devices, such as lighting fixtures (e.g., lighting control devices associated with the lighting fixtures). Each lighting fixture may include a lighting load (e.g., a lamp, an LED light source, etc.) and a lighting control device (e.g., a dimmer, an LED driver, a ballast, etc.) for controlling an amount of power provided to the lighting load.

The method 420 shown in FIG. 4B may be performed during the claiming procedure shown at 408 of the method 400 shown in FIG. 4A. The method 420, or portions thereof, may be implemented by one or more devices of a load control system (e.g., the load control system 100), such as, for example, a network device, such as a mobile device (e.g., the mobile device 150, 250), a system controller (e.g., the system controller 140, 240 or other control device), and/or the other control devices of the load control system (e.g., the lighting control devices of the lighting fixture 110, lighting fixture 120, or the lighting fixtures 210a-210d; the remote control device 136, 232; and/or the occupancy sensor 134, 234) may perform the method 420, or portions thereof. For example, other control devices may similarly perform one or more portions of the method 420.

The method 420 may be performed while one or more devices are in an offline mode. For example, the network device (e.g., the mobile device 150, 250), the system controller (e.g., the system controller 140, 240 or other control device), and/or the other control devices in the load control system (e.g., the lighting control devices of the lighting fixture 110, lighting fixture 120, or the lighting fixtures 210a-210d; the remote control device 136, 232; and/or the occupancy sensor 134, 234) may be in an offline mode. A device may be in an offline mode when the device is disconnected from having access to the Internet (e.g., via Wi-Fi, cellular, and/or another communication network) or a particular online service (e.g., service used to access information used during commissioning) via wired or wireless communications. For example, the method 420 may be performed during the commissioning procedure to configure the load control system in a building prior to a wired local area network, a wireless local area network, and/or another suitable wired or wireless communication network has been installed and/or configured in the building. The method 420 may be performed when one or more devices in the load control system are otherwise unable to access information via an online service (e.g., unable to login to service, access is temporarily unavailable, etc.). During implementation of the method 420, devices may be able to communicate directly via a local wired and/or wireless communication (e.g., BLUETOOTH®, BLUETOOTH® Low Energy (BLE), THREAD®, Wi-Fi Direct, nearfield communication (NFC), and/or other wireless communication) to share information. The local wireless communication may be a short-range wireless communication.

The method 420 may be used to claim one or more control devices (e.g., lighting control devices associated with lighting fixtures) in a given area (e.g., in the building in which the load control system is installed) for being joined to the network. The method 420 may have the advantage of being able to be performed while there is no connection to the Internet in the area. The claiming procedure may be used to gather device identification data from one or more control devices and/or to send configuration information to the control devices. The claiming procedure illustrated in the method 420 may be performed for each control device (e.g., lighting fixture) in an area. The claiming of devices may also be performed by different users and/or devices and the claimed devices may be batched together for joining the network.

As shown in FIG. 4B, the method 420 may begin at 422. At 424, one or more control devices may be highlighted for identification and/or configuration. The control device (e.g., lighting fixture) may be highlighted in response to, for example, a user of the network device coming in range of the control device, and/or the control device receiving a signal (e.g., an optical signal). For example, the user may highlight the control device by physically moving the network device close to the control device in the given area and/or by pointing an optical transmitter at the control device and transmitting an optical signal. The highlighted control device may be the closest control device in the given area to the user (e.g., the network device). The network device may determine whether the control device is the closest control device based on a signal strength of a message received from the control device, and/or based on a signal strength of the optical signal at the control device. The control device may indicate that it has been highlighted by, for example, providing a feedback type to the user in the room as described herein. For example, a lighting fixture may provide feedback by turning a predefined color (e.g., blue) to indicate that the lighting fixture is highlighted.

At 426, the highlighted control device may be associated with a configuration identifier. For example, the network device may receive a user selection of a configuration identifier to associate the configuration identifier with the highlighted control device. Alternatively, the network device may select a configuration identifier for the control device based on configuration data. The configuration data may be stored in a configuration database (e.g., on the processing device, the cloud server, the mobile device, and/or the system controller). The processing device may store the configuration data (e.g., the configuration database) in a project (e.g., which may include other identifying information of a building in which the load control system may be installed). The configuration data may include representations of the control devices (e.g., lighting fixtures, occupancy sensors, remote control devices, etc.) in the load control system, as well as configuration identifiers (e.g., fixtures, groups, zones, areas, and/or location identifiers) of the control devices. For example, the configuration data may define functionality of the control devices (e.g., how lighting fixtures respond to the occupancy sensors and/or the remote-control devices).

At 428, the network device may receive device identification data from the highlighted control device (e.g., a lighting control device controlling the highlighted lighting fixture). For example, the network device may receive an address (e.g., a Thread network address), a joiner ID (e.g., for network authentication), a unique identifier (e.g., serial number), and/or other types of device identification data. The method 420 may be performed while the control devices are transmitting (e.g., beaconing) such that the network device is capable of receiving the device identification data from signals (e.g., beacon signals) transmitted by the control devices. The device identification data may be transmitted via the same communication medium used to transmit the beacon signals (e.g., BLE communications) or another RF communication medium.

After reception of the device identification data from the control device, the network device may transmit configuration information to the control device at 430. For example, the configuration information may include a timestamp, the selected configuration identifier, a network device identifier/app identifier (e.g., indicating the device that claimed the control device), and/or channel information (e.g., which may aid the control device in joining to the correct network). The timestamp may be used to resolve (e.g., automatically) conflicts that may arise from multiple users commissioning at the same time and in the same space. The network device identifier/app identifier may be used to determine which user previously claimed the control device. The channel information may be used to accelerate the joining procedure for the control device. For example, when the control device is joined to the network, there may be multiple RF channels/frequencies available. The control device may scan through the available RF channels/frequencies to determine which RF channel/frequency the system controller is on. The channel information may allow the control device to implement more efficient scanning by instructing the control device to prefer the channel provided during claiming. The configuration information may include a logical load identifier that identifies the logical representation of the load in the design. The logical load identifier may be created when the user creates the load. The logical load identifier may allow a user to see that the control device was claimed without accessing the Internet.

The configuration information may be transmitted via an RF communication signal. In response to receiving the configuration information, the control device may indicate that the control device has been assigned to a fixture and/or a zone by providing a feedback type as described herein. For example, a lighting control device may indicate that the lighting control device has been assigned to the fixture and/or the zone by causing a corresponding lighting fixture to provide feedback. For example, the lighting fixture may turn a predefined color (e.g., green) to indicate that the lighting fixture has been assigned to a fixture and/or a zone.

At 432, the network device may store the device identification data received from the control device in memory. The device identification data of each control device may be stored with the floorplan identifier identifying the physical location of the control device on an application, for example.

At 434, a determination may be made as to whether additional control devices are to be identified and/or configured in the area. The network device may compare a list of control devices for which device identification data has been received during the commissioning procedure to a list of control devices to be configured within the area. The network device may prompt the user to indicate whether any further control devices are to be identified and/or configured. For example, the network device may display one or more buttons (e.g., "Continue" and "Finish", or just "Finish") on a display of the network device and determine whether further control devices are to be identified and/or configured based on the button selected by the user. This may allow a user to identify and/or configure a subset of devices in a zone, or across multiple zones. The user, or another user, may return to identify and/or configure other control devices. The network device may also automatically detect when the device identification data has been received from each of the control devices for a given zone or project and the method 420 may end at 434. The network device may (e.g., prior to performing the method 420) generate a list of control devices to be configured within the area. For example, the network device may generate the list by scanning a QR code present on each control device and adding each control device to the list. The network device may then determine whether the claiming procedure has been completed for each control device on the list at 434.

If it is determined that there are one or more control devices that are to be identified and/or configured (e.g., claimed) in an area or a zone, the method 420 may return to 424. In fact, a determination may be made that there are one or more control devices to be identified and/or configured when another control device is highlighted for identification and/or configuration. If it is determined that device identification and/or configuration (e.g., the claiming procedure) has completed, the method 420 may end.

Commissioning control devices (e.g., lighting control devices associated with lighting fixtures) by claiming each control device before proceeding to join the control devices to a network (e.g., instead of claiming and joining each control device before proceeding to the next control device) may have several advantages. For example, the control devices may be claimed while one or more devices in the system are otherwise unable to access information via an online service (e.g., unable to login to service, access is temporarily unavailable, etc.). In addition, commissioning control devices in this manner may allow multiple users or devices to claim control devices, and/or control devices in one or more areas may be claimed at different times. Further, the control devices may be commissioned before network infrastructure (e.g., local area networks) and/or network devices (e.g., routers, switches, and/or processors) have been installed in the area.

A control device may send transmissions using one or more network protocols. For example, an unclaimed control device may transmit messages (e.g., a beacon) using BLE communications. The unclaimed control device may constantly transmit the signal using BLE communications. After the control device is claimed, the control device may use alternating network protocols. For example, the control device may alternate using the Thread® protocol and/or BLE communications. The control device may communicate using the Thread® protocol in order to receive a joiner request sent by the system controller. The control device may use BLE communications in order to transmit signals (e.g., if the network device comes back in range and the user adjusts/corrects the selection of the control device).

After the control devices have been claimed, a joining procedure may be performed to join the control devices to the network. FIG. 4C is a flow diagram of an example method 435 that may be performed during a joining procedure. For example, the method 435 may be performed during the joining procedure shown at 412 of the method 400 shown in FIG. 4A. The joining procedure may be used to join the control devices to the network so that the control devices can be controlled via commands sent over the network.

The joining procedure may be performed immediately following the claiming procedure, or there may be a period of time between execution of the two procedures. The claiming of devices may also be performed by different users and/or devices and the claimed devices may be batched together for joining the network using the joining procedure. Performing the claiming and joining procedures in this manner may have advantages over, for example, claiming and joining each control device individually before proceeding to the next control device. For example, one or more control devices may be claimed while the network device and/or the system controller is operating in an offline mode. The control devices may be joined to the network when the network device and/or the system controller are no longer operating in the offline mode.

The system controller may send joiner messages to request control devices (e.g., lighting control devices associated with lighting fixtures) to join the network. In larger installations with higher numbers of control devices attempting to join the network at the same time, a system controller may receive multiple response messages from end devices that receive the joiner request message. The larger the number of devices that receive the joiner request message, the higher the likelihood that the system controller may receive a greater number of response messages and have trouble processing one or more of the received responses. Additionally, the more response messages that are being communicated, the greater the likelihood for collisions that may prevent the system controller from receiving the responses altogether.

The method 435 may begin at 436. At 438, the system controller and/or commissioner device may select a subset of the control devices (e.g., lighting control devices controlling a subset of lighting fixtures) to be joined to a network. The subset may be selected to reduce the number of response messages being communicated and/or received. The system controller may select the subset based on a random selection. For example, the system controller may create or retrieve from memory a list of each control device within the area.

The system controller may randomly select a control device from the list of control devices and add it to a subset list. The system controller may randomly select control devices to be added to the subset list (e.g., instead of adding the control devices by area, type, function, etc.) in order to increase the chance that at least one control device on the subset list is within range of the system controller (e.g., and is therefore able to receive a joiner request transmitted by the system controller). The system controller may continue randomly selecting control devices until the subset list has reached a predetermined size (e.g., 20) or percentage of the number of control devices in the list. The predetermined size of the subset list may be determined based on, for example, the number of control devices within the area.

Using a random subset of the control devices may reduce collisions between transmissions. Reducing collisions may be useful, for example, when there are a large number of control devices (e.g., tens or hundreds of control devices) performing the joining procedure. There may be a relatively large number of control devices (e.g., up to 200 control devices in a network), and each control device (e.g., or a relatively large set of them) may attempt to join at the same time when they are turned on or receive power. This may cause collisions between messages and, and as additional messages are received at the system controller, the processing of these messages may delay the processing of previously received messages. For example, the system controller sending a single joiner request to each of the control devices within a given area may cause delay due to the system controller having to process too many messages at the same time. Further, there may be multiple system controllers sending joiner requests, which may increase the probability of a collision between two transmissions. One or more devices may be outside the range of the system controller, and the system controller may waste power and/or time resources attempting to contact these devices. Using the method 435 to join control devices to the network may limit the number of devices attempting to join at a time to increase the chance that a device is able to successfully join network.

As the size of the subset list decreases, the chance that each of the devices on the subset list are out of range of the system controller may increase. The size of the subset list may therefore be chosen such that there is a relatively high probability that at least one device on the subset list is within range of the system controller. For example, the size of the subset list may be chosen to balance the reduction in collisions with the increase in probability. Once a device has been joined to the network, it may be used to join other devices to the network. For example, a device that has been joined to the network may be used as a repeater.

Upon adding a control device to the subset list, the system controller may indicate that the control device has been added to the subset list. For example, the system controller may update the list of control devices to indicate that the control device has been added to the subset list. The system controller may create a separate list that contains device identification data for control devices that have been added to a subset list.

The system controller may transmit a joiner request message to the selected subset of control devices at 440. For example, the system controller may send a message (e.g., via one or more wireless signals) to lighting control devices controlling a selected subset of lighting fixtures. The joiner request message may include, for example, the device identification data for each lighting fixture in the subset. The system controller may broadcast the joiner request message such that the joiner request message can be received by each of the control devices (e.g., lighting control devices) in the area. A control device that receives the joiner request message may determine whether to respond to the joiner request message based on whether the joiner request message includes the device identification data for the control device. For example, if the joiner request message does not include the device identification data for the control device, the control device may ignore the joiner request message.

Upon reception of the joiner request message, each control device (e.g., each lighting control device that is controlling one of the selected subset of lighting fixtures) may transmit a response message to the system controller. The control devices may transmit the response messages via one or more wireless signals. The response message may include, for example, an indication that the joiner request message was received. The system controller may monitor for the responses after transmitting the joiner request message. At 442, the system controller may determine whether at least one response message has been received by the system controller. If the system controller has received at least one response message from a control device that has not yet been joined to a network, the system controller may join the control device to the network at 444. Once the system controller has joined a control device to the network, the system controller may ignore further response messages to the joiner request message from the control device, and/or transmit an indication message to the control device indicating that the control device has been joined to the network. The system controller may add the control device to a list of control devices that have been joined to the network. Upon reception of the indication message, the control device may stop transmitting the response message to the joiner request message. After the system controller has joined the control device to the network, the method 435 may return to 442. The system controller may repeat 444 until the system controller does not receive any response message s to the joiner request message.

If the system controller determines at 442 that no response message s are received, it may be determined whether a timeout has occurred at 446. For example, the system controller may monitor for a response message to the joiner request message for a predetermined amount of time. If the system controller receives a response message within the predetermined amount of time, the system controller may determine that a timeout has not occurred, and the method 435 may return to 442. If the system controller does not receive a response message within the predetermined amount of time, or receives a response message from a lighting control device that it has already joined the network, the system controller may determine that a timeout has occurred and the method 435 may proceed to 448.

At 448, a determination may be made as to whether each of the control devices have been joined to the network. The system controller and/or the processing device may determine whether each device has been joined to the network based on the list of each of the control devices in the area. When a device is joined to the network, the system controller and/or the processing device may remove the device from the list of each of the control devices in the area. For example, the system controller and/or the processing device may determine that each of the control devices have been joined to the network if each control device in the area has been removed from the list.

If it is determined that additional control devices are to be joined to the network, the method 435 may return to 438, and the system controller may randomly select another subset list (e.g., excluding the control devices that have already been joined to the network) from the list of each of the control devices in the area. The system controller may continue joining devices until each control device has been joined to the network. If the system controller determines that each of the control devices have been joined to the network, the method 435 may end.

When the system controller has access to the Internet, the system controller may be capable of joining each control device one at a time (e.g., as it can access the information being used for the joining procedure as commissioning is happening). Performing claiming and/or joining with access to the Internet may allow for information to go from a control device to a network device, and from the network device to a system controller (e.g., via the cloud) to join to the network. In performing an online commissioning procedure, the devices that are closest to the system controller may be commissioned first and the network may be built out as the network grows from the system controller. Performing the commissioning procedure in this manner may be limiting in how the devices are added to the network. For example, control devices closer to the system controller may be commissioned before control devices farther away from the system controller because the devices that are farther away may be unable to communicate to the system controller directly (e.g., they are too far away) or because there may be no route to the system controller (e.g., there are no other mesh devices within range).

Figure 4D:
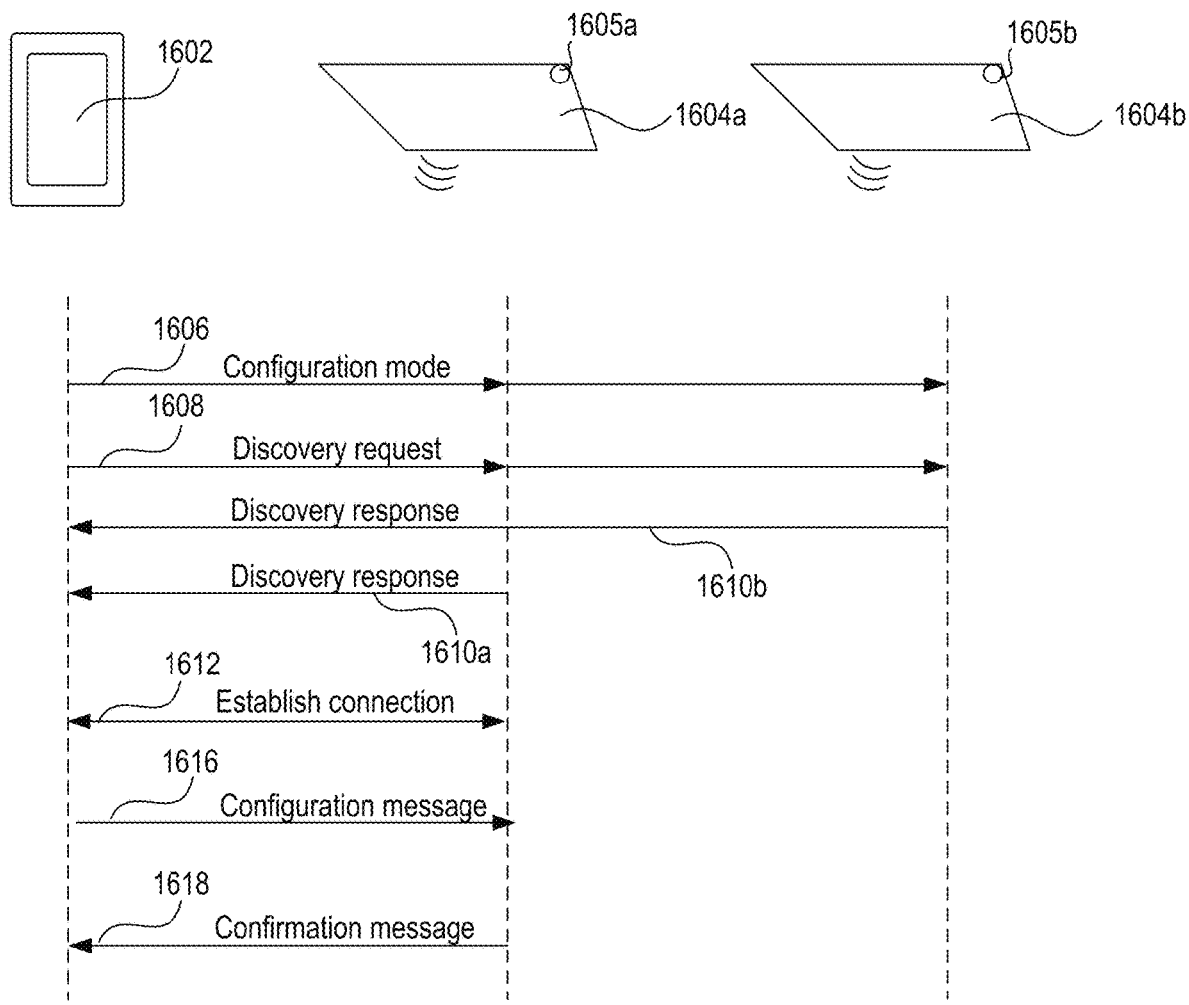
FIGS. 4D and 4E are system flow diagrams depicting example message flows for discovering control devices for enabling claiming and/or association of control devices.
Figure 4E:
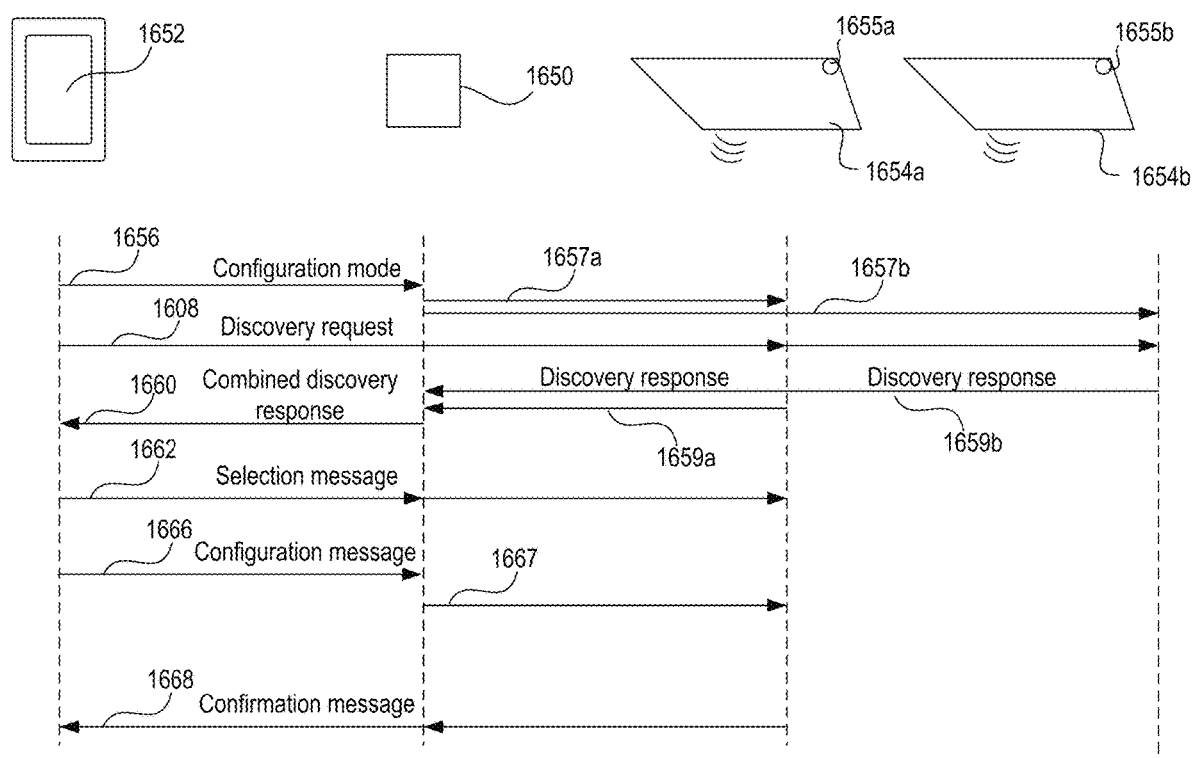

FIGS. 4D and 4E are system flow diagrams depicting example message flows for discovering control devices in a load control system. For example, a control device may be discovered for enabling configuration (e.g., claiming, diagnostics, association, etc.) and/or control of the control device. For example, the system flow diagrams depicted in FIGS. 4D and 4E may depict RF messages communicated between control devices that are performing the method 600 shown in FIG. 6A and/or the method 650 shown in FIG. 6B. As shown in FIG. 4D, a network device (e.g., a mobile device) may communicate with one or more control devices (e.g., lighting control devices) directly. For example, the network device and the control devices via a wireless connection. Alternatively, as shown in FIG. 4E, the network device may communicate with the control devices via a system controller. For example, the network device may communicate with the system controller via a wireless connection, and the system controller may communicate with the control devices via a wired connection. Though lighting control devices are shown in FIGS. 4D and 4E, other control devices may be used.

FIG. 4D is a system flow diagram depicting example message flows for discovering control devices in a load control system. For example, a control device may be discovered for enabling configuration (e.g., claiming, diagnostics, association, etc.) and/or control of the control device. As shown in FIG. 4D, the load control system may include a mobile device 1602 and lighting fixtures 1604a, 1604b. The lighting fixtures 1604a, 1604b may include respective load control devices configured to control respective lighting loads. The lighting control devices in the lighting fixtures 1604a, 1604b may be RF-capable devices that include a communication circuit capable of communicating messages via RF signals. The lighting control device in the lighting fixture 1604a may be in communication with a sensor 1605a that is capable of detecting visible light communications. The lighting control device in the lighting fixture 1604b may be in communication with a sensor 1605b that is capable of detecting visible light communications. The sensors 1605a, 1605b may be occupancy sensors, visible light sensors (e.g., cameras), daylight sensors, optical sensors, and/or any other type of sensor.

As shown in FIG. 4D, the mobile device 1602 may transmit a configuration mode message 1606 to the lighting fixtures 1604a, 1604b. The configuration mode message 1606 may indicate that the lighting control devices of the lighting fixtures 1604a, 1604b should enter a configuration mode (e.g., a claiming mode and/or an association mode). The configuration mode message 1606 may be transmitted via RF communication signals (e.g., BLUETOOTH® low energy (BLE) signal) and/or optical signals. The configuration mode message 1606 may be sent as a multicast message (e.g., a beacon message) that is received by the lighting control devices of the lighting fixtures 1604a, 1604b. The lighting fixtures 1604a, 1604b may enter the configuration mode without receiving the configuration mode message 1606.

After transmitting the configuration mode message 1606, the mobile device 1602 may perform discovery of the lighting control devices in the lighting fixtures 1604a, 1604b. The lighting control devices in the lighting fixtures 1604a, 1604b may be discovered by the mobile device sending a discovery request message 1608. The discovery request message 1608 may be transmitted to identify the lighting control devices to be claimed for joining the network.

The discovery request message 1608 may be transmitted in an RF signal, such as an RF beacon (e.g., a BLE signal) transmitted from the mobile device 1602. The discovery request message 1608 may be transmitted as an optical signal that may be transmitted to discover the lighting control devices of the lighting fixtures 1604a, 1604b. The optical signal may be transmitted (e.g., from the mobile device 1602 or another device with an optical transmitter) and identified by the sensors 1605a, 1605b of the lighting fixtures 1604a, 1604b. The lighting fixture 1604a and/or the lighting fixture 1604b may include one or more light sources (e.g., LED lamps). Each light source may have a separate sensor (e.g., detector) that may be used to measure, for example, the optical signal, a baseline ambient light level at the light source, etc. An optical transmitter may be attached to, connected to, and/or integrated into the mobile device 1602. The sensors 1605a, 1605b may be in communication (e.g., via wired or wireless communication) with the load control devices of the lighting fixtures 1604a, 1604b. The sensors 1605a, 1605b may provide the lighting control devices of the lighting fixtures 1604a, 1604b with an indication that the optical signal has been identified (e.g., at or above a predefined threshold). The optical signal may include light at one or more visible wavelengths. The optical signal may be received with an optical signal has different signal strengths (e.g., intensities) at each of the sensors 1605a, 1605b. The sensors 1605a, 1605b, or the control circuit in the lighting control device, may determine the respective signal strengths at which the optical signals are received.

The lighting control device 1604a and/or the lighting control device 1604b may provide a first feedback type that indicates the lighting control device has received and/or the discovery request message 1608. The feedback may be provided by flashing a lighting load on and off, increasing and/or decreasing the intensity level of the lighting load, increasing and/or decreasing the color temperature of the lighting load, illuminating the lighting load a predefined color (e.g., orange), illuminating the lighting load a predefined color temperature, and/or providing other visual feedback to the user.

The mobile device 1602 may receive discovery response messages 1610a, 1610b from the lighting control devices of the lighting fixtures 1604a, 1604b. The discovery response messages 1610a, 1610b may include the signal strength at which the discovery request message 1608 was received at the lighting fixtures 1604a, 1604b, respectively. As shown in FIG. 4D, the mobile device 1602 may receive a separate message discovery response message 1610a, 1610b from each of the lighting control devices of the lighting fixtures 1604a, 1604b indicating the signal strength that the discovery request message 1608 was received at the respective lighting fixture 1605a, 1604b. For example, when the discovery request message 1608 is transmitted in an optical signal, the discovery response messages 1610a, 1610b may include respective signal strengths (e.g., intensities) at which the optical signal was received. When the discovery request message 1608 is transmitted in an RF signal, the discovery response messages 1610a, 1610b may include respective RSSI values at which the discovery request message 1608 was received. The signal strengths may be indicated in the discovery response messages 1610a, 1610b as absolute values (e.g., in units of lux) and/or as relative values. The discovery response messages 1610a, 1610b may include respective identifiers and/or baseline ambient light levels of the lighting fixtures 1604a, 1604b.

Though the discovery response messages 1610a, 1610b may be transmitted as responses to the discovery request message 1608, the lighting control devices in the lighting fixtures 1604a, 1604b may transmit discovery response messages 1610a, 1610b as respective beacon messages for being discovered at the mobile device 1602 (e.g., in response to entering the configuration mode. The mobile device 1602 may determine the signal strengths at which the different discovery response messages 1610a, 1610b are received to determine the lighting control device associated with the strongest beacon.

Based on the discovery response messages 1610a, 1610b, the mobile device 1602 may determine which of the lighting control devices in the lighting fixtures 1604a, 1604b is selected for being claimed for joining the network. The discovery response messages 1610a, 1610b that are associated with the strongest signal strength may be selected for being claimed to join the network. For example, based on the discovery response messages 1610a, 1610b the mobile device 1602 may determine which of the lighting fixtures 1604a, 1604b received the discovery request message 1608 at the highest signal strength (e.g., when the discovery request message 1608 is an optical signal). For example, the mobile device 1602 may compare the signal strengths indicated in the discovery response messages 1610a, 1610b to identify the lighting fixture 1604a, 1604b that received the discovery request message 1608 at the highest signal strength. The mobile device 1602 may determine a normalized signal strength for a lighting fixture based on the baseline ambient light level and the signal strength at that fixture, and may identify the lighting fixture 1604a, 1604b that received the discovery request message 1608 at the highest normalized signal strength. In addition, based on the discovery response messages 1610a, 1610b, the mobile device 1602 may determine the signal strengths at which the different discovery response messages 1610a, 1610b are received to determine the lighting control device associated with the strongest signal strength (e.g., when the discover request message 1608 is a BLE signal). For example, the mobile device 1602 may compare the signal strengths of the discovery response messages 1610a, 1610b to identify the lighting fixture 1604a, 1604b associated with the highest signal strength.

As shown in FIG. 4D, the mobile device 1602 may determine that lighting control device of the lighting fixture 1604a is receiving the discovery request message 1608 at the highest signal strength, or that the mobile device 1602 is receiving the beacon signals from the lighting control device of the lighting fixture 1604a at the highest signal strength. The mobile device 1602 may select lighting control device 1604a for configuration (e.g., claiming and/or association). The mobile device 1602 may establish a connection 1612 (e.g., a two-way connection) with the lighting control device of the lighting fixture 1604a. The connection may be a BLE connection. The connection 1612 may be established by the mobile device 1602 and the lighting control device of the lighting fixture 1604a exchanging credentials to create a secure connection for enabling secure communications using the credentials. The connection message 1612 may indicate to the lighting control device of the lighting fixture 1604a that the lighting control device is selected for configuration (e.g., claiming and/or association). Alternatively, the mobile device may communicate with the lighting fixture 1604 without creating a connection.

The lighting control device 1604a may provide a second feedback type that indicates the lighting control device 1640a has been selected to be configured. For example, the lighting control device 1604a may provide the second feedback type in response to the establishment of the connection 1612 between the lighting control device 1604a and the mobile device 1602. The feedback may be provided by flashing a lighting load on and off, increasing and/or decreasing the intensity level of the lighting load, increasing and/or decreasing the color temperature of the lighting load, illuminating the lighting load a predefined color (e.g., blue), illuminating the lighting load a predefined color temperature, and/or providing other visual feedback to the user.

After establishing the connection 1612 to lighting control device of the lighting fixture 1604a, the mobile device 1602 may associate the lighting fixture with configuration data. The mobile device may receive a confirmation that the lighting control device of the lighting fixture 1604a received the connection message 1612 and/or a unique identifier (e.g., a configuration identifier) selected for the lighting control device of the lighting fixture 1604a. The mobile device 1602 may associate the lighting control device of the lighting fixture 1604a with the unique identifier, and may transmit a configuration message 1616 to the lighting fixture 1604a. The configuration message 1616 may indicate that the lighting fixture 1604a has been claimed and/or associated with the selected configuration identifier. The configuration message 1616 may include, for example, an indication that the lighting control device 1604a has been claimed, a unique identifier of the mobile device 1602 (e.g., an application running on the mobile device 1602), and/or other association information. The configuration message 1616 may be used as part of a configuration procedure (e.g., a claiming procedure, an association procedure, a diagnostics procedure, etc.). A control message may also, or alternatively, be sent at 1616 that includes control instructions for controlling the lighting control devices of the lighting fixtures. The mobile device 1602 may receive a confirmation message 1618 from the lighting control device 1604a. For example, the confirmation message 1618 may confirm that the lighting control device 1604a has received the configuration message 1616. The connection message 1612, the configuration message 1616, and/or the confirmation message 1618 may be transmitted and/or received via RF communication signals.

The lighting control device 1604a may provide a third feedback type that indicates the lighting control device has received the configuration message 1616. The feedback may be provided by flashing a lighting load on and off, increasing and/or decreasing the intensity level of the lighting load, increasing and/or decreasing the color temperature of the lighting load, illuminating the lighting load a predefined color (e.g., green), illuminating the lighting load a predefined color temperature, and/or providing other visual feedback to the user.

As shown in FIG. 4D, the mobile device 1602 may communicate with the lighting control devices 1604a and 1604b directly, for example via RF communication signals (e.g., BLUETOOTH® low energy (BLE) signals). FIG. 4E shows an example that is similar to the example shown in FIG. 4D. In FIG. 4E, the mobile device 1602 may communicate with the lighting control devices 1604a and 1604b via a system controller 1650, which may act as a relay one or more messages between the mobile device 1602 and the lighting control devices 1604a and 1604b. For example, as shown in FIG. 4E, the mobile device 1602 may send one or more messages to the system controller 1650 (e.g., via RF communication signals). The system controller 1650 may send one or more messages to and/or receive one or more messages from the lighting control devices 1604a and 1604b (e.g., via a wired or wireless connection). The system controller 1650 may forward messages received from the lighting control devices 1604a and 1604b to the mobile device 1602. The example shown in FIG. 4E may be used when the mobile device 1602 communicates with the system controller 1650 for RF communications. For example, the lighting control devices 1604a and 1604b may be unable to send or receive messages via RF communication signals.

FIG. 4E is a system flow diagram depicting example message flows for discovering control devices in a load control system. For example, a control device may be discovered for enabling claiming, diagnostics, configuration, control, and/or association of the control device. As shown in FIG. 4E, a load control system may include a mobile device 1652, a system controller 1650, and lighting control devices 1654a, 1654b. The lighting control devices 1654a, 1654b may control respective lighting loads. For example, the mobile device may communicate with the lighting control devices 1654a, 1654b via the system controller.

As shown in FIG. 4E, the mobile device 1652 may transmit a configuration mode message 1656 to the system controller 1650. The configuration mode message 1656 may be similar to the configuration mode message 1606 shown in FIG. 4D. The configuration mode message 1656 may indicate that the lighting control devices 1654a, 1654b should enter a configuration mode (e.g., a claiming mode and/or an association mode). The system controller 1650 may send the configuration mode message 1656 to the lighting control devices 1654 and 1654b (e.g., via a wired or wireless connection), or the system controller may send separate configuration mode messages 1657a, 1657b to the lighting control devices 1654a and 1654b indicating that the lighting control devices 1654a, 1654b should enter the configuration mode. The configuration mode message 1656 may be transmitted via RF communication signals (e.g., a BLUETOOTH® low energy (BLE) signals, WiFi signals, and/or cellular signals). The configuration mode message 1656 may be sent as a broadcast message (e.g., beacon), a multicast message, and/or an individual unicast message. The lighting fixtures 1604a, 1604b may enter the configuration mode without receiving the configuration mode message 1656 (e.g., or the separate configuration mode messages 1657a, 1657b).

After transmitting the configuration mode message 1656, the mobile device 1652 may transmit the discovery request message 1608 (e.g., an optical signal) to the lighting control devices 1654a, 1654b. The discovery request message 1608 may be an optical signal. The lighting control devices 1654a and 1654b may receive the discovery request message 1608 via sensors 1655a, 1655b. The sensors 1605a, 1605b may be occupancy sensors, visible light sensors (e.g., cameras), daylight sensors, optical sensors, and/or any other type of sensor. The lighting fixture 1604a and/or the lighting fixture 1604b may include one or more light sources (e.g., LED lamps). Each light source may have a separate sensor (e.g., detector) that may be used to measure, for example, the optical signal, a baseline ambient light level at the light source, etc. The lighting fixtures 1654a, 1654b may determine respective signal strengths (e.g., intensities) of the discovery request message 1608. The lighting control devices 1654a and 1654b may send discovery response messages 1659a and 1659b, respectively, to the system controller 1650. The discovery response messages 1659a and 1659b may be similar to the discovery response messages 1610a and 1610b shown in FIG. 4D. The discovery response messages 1659a and 1659b may include the signal strength of the discovery request message 1608 received at lighting control devices 1654a and 1654b, respectively. The signal strengths may be indicated in the discovery response messages 1659a and 1659b as absolute values (e.g., in units of lux) and/or as relative values.

The lighting control device 1654a and/or the lighting control device 1654b may provide a first feedback type that indicates the lighting control device has received the configuration mode message 1656 and/or the discovery request message 1608. The feedback may be provided by flashing a lighting load on and off, increasing and/or decreasing the intensity level of the lighting load, increasing and/or decreasing the color temperature of the lighting load, illuminating the lighting load a predefined color (e.g., orange), illuminating the lighting load a predefined color temperature, and/or providing other visual feedback to the user.

The system controller 1650 may receive the discovery response messages 1659a and 1659b from the lighting control devices 1654a and 1654b, respectively, and may send a combined discovery response message 1660 to the mobile device 1652. The combined discovery response message 1660 may include the signal strengths of the discovery request message 1608 at multiple lighting control devices. Alternatively, the system controller 1650 may forward the discovery response messages 1659a and 1659b to the mobile device 1652. The signal strengths may be indicated in the combined discovery response message 1660 as absolute values (e.g., in units of lux) and/or as relative values.

Based on the combined discovery response message 1660 and/or the discovery response messages 1659a and 1659b, the mobile device 1652 may determine which of the lighting control devices 1654a and 1654b is receiving the discovery request message 1608 at the highest normalized signal strength. For example, the mobile device 1652 may determine normalized signal strengths by comparing the signal strengths indicated in the combined discovery response message 1660 to a baseline ambient light level recorded by the mobile device 1652, the system controller 1650, lighting control device 1654a, and/or lighting control device 1654b.

As shown in FIG. 4E, the mobile device may determine that lighting control device 1654a is receiving the discovery request message 1608 at the highest normalized signal strength.

Alternatively, the discovery request message 1608 may not be transmitted, and the lighting control devices 1654a, 1654b may send the discovery response messages 1659a, 1659b after receiving the configuration mode message 1656 (e.g., without receiving the discovery request message 1608). The lighting fixtures 1654a, 1654b may transmit the discovery response messages 1659a, 1659b as respective beacons (e.g., control device beacons). For example, the discovery response messages 1659a, 1659b may be RF signals (e.g., BLE signals). The discovery response messages 1659a, 1659b may include respective identifiers of the lighting fixtures 1654a, 1654b. The lighting fixtures 1654a, 1654b may broadcast the discovery response messages 1659a, 1659b. The mobile device 1652 may receive the discovery response messages 1659a, 1659b, and may measure respective received signal strength indicators (RSSIs) of the discovery response messages 1659a, 1659b. The mobile device 1652 may select a lighting fixture for configuration and/or control based on the RSSIs. For example, the mobile device 1652 may select the lighting fixture that sent the discovery response message having the highest RSSI for configuration and/or control.

The mobile device may select lighting control device 1654a for configuration (e.g., claiming and/or association). The mobile device 1652 may send selection message 1662 to the system controller 1650. The selection message 1662 may indicate to the system controller 1650 and/or the lighting control device 1654a that the lighting control device 1654a is selected for configuration and/or control. The system controller 1650 may forward the selection message 1662 to the lighting control device 1654a, or the system controller 1650 may send a separate selection message to the lighting control device 1654a.

The lighting control device 1654a may provide a second feedback type that indicates that the lighting fixture 1654a has received the selection message 1662 from the mobile device 1652 via the system controller 1650. The feedback may be provided by flashing a lighting load on and off, increasing and/or decreasing the intensity level of the lighting load, increasing and/or decreasing the color temperature of the lighting load, illuminating the lighting load a predefined color (e.g., blue), illuminating the lighting load a predefined color temperature, and/or providing other visual feedback to the user Upon reception of the association message 1664, the mobile device 1652 may associate the lighting control device 1654a with the unique identifier, and may transmit a configuration message 1666 to the system controller 1650. The configuration message 1666 may include, for example, an indication that the lighting control device 1654a has been claimed, a unique identifier of the mobile device 1652 (e.g., an application running on the mobile device 1652), and/or other association information. The configuration message 1666 may be used as part of a configuration procedure (e.g., a claiming procedure, an association procedure, a diagnostics procedure, etc.) and/or as part of a control procedure. The system controller 1650 may forward the configuration message 1666 to the lighting control device 1654a, or the system controller 1650 may send a separate configuration message 1667 to the lighting control device 1654a.

The lighting control device 1654a may provide a third feedback type that indicates the lighting control device has received the configuration message 1666. The feedback may be provided by flashing a lighting load on and off, increasing and/or decreasing the intensity level of the lighting load, increasing and/or decreasing the color temperature of the lighting load, illuminating the lighting load a predefined color (e.g., green), illuminating the lighting load a predefined color temperature, and/or providing other visual feedback to the user.

After receiving the configuration message 1666, the lighting control device 1654a may transmit a confirmation message 1668 to the system controller 1650. For example, the confirmation message 1668 may confirm that the lighting control device 1654a has received the configuration message 1666. The system controller 1650 may forward the confirmation message 1668 to the mobile device 1652, or the system controller 1650 may send a separate confirmation message to the mobile device 1652. The selection message 1662, the association message 1664, the configuration message 1666, and/or the confirmation message 1618 may be transmitted and/or received via RF communication signals and/or via a wired connection.

FIGS. 5A-5H and 5J-5K illustrate example screenshots of a user interface 500 for enabling configuration (e.g., claiming and/or association) of lighting control devices in a load control system (e.g., the load control system 100). The user interface 500 may be displayed on a network device, such as a mobile device (e.g., the mobile device 150, 250, 350). For example, the mobile device may display the user interface 500 during a configuration data transfer procedure (e.g. as performed at 406 of method 400) and/or a configuration procedure (e.g., a claiming procedure and/or an association procedure as performed at 408 of method 400). The mobile device may execute an application locally for displaying the user interface 500. In addition, a remote computing device (e.g., the system controller 140, 240, 340 and/or the cloud server 370) may generate the user interface 5000 to be displayed on the mobile device via a local application (e.g., a browser or other application).

Figure 5A:
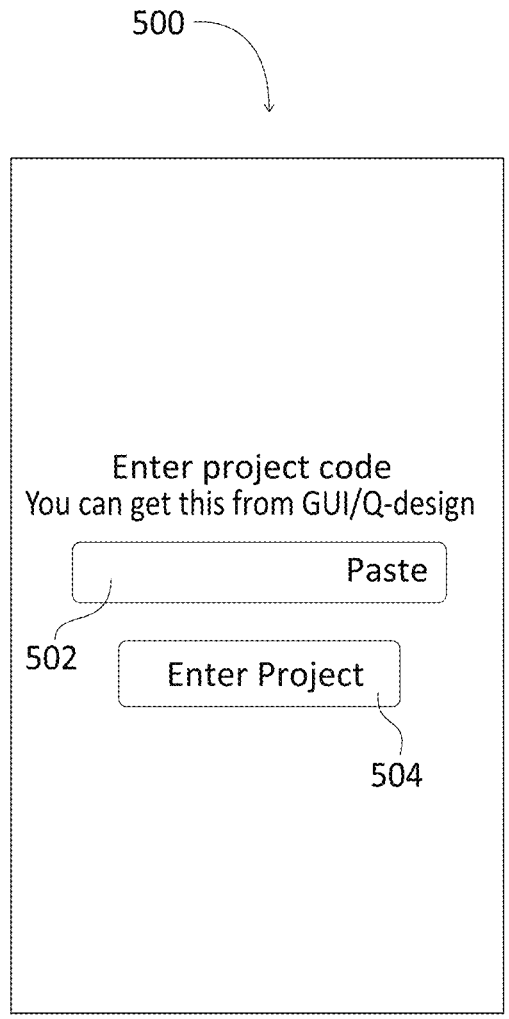
FIGS. 5A-5H and 5J-5K are example screenshots of a user interface for enabling configuration and/or control of lighting control devices via a network device.

As shown in FIG. 5A, a user may enter a project code into the project code box 502 on the mobile device to access configuration data of a configuration database (e.g., a lighting control database) of a project. The project code may be used to identify a project that has been created by a design software that may be executed on a processing device (e.g., as performed by the processing device at 404 of the method 400). The project code may be used to retrieve a configuration database of a project that has already been created. The project may be a predefined project that is accessed locally and/or from a remote data source (e.g., the cloud server 370). The mobile device may receive the control database of the project indicated by the project code in response to the user selecting the "Enter Project" button 504. The mobile device may access the lighting control configuration information stored in the control database with the project code to configure and/or control the lighting control devices in the load control system.

Figure 5B:
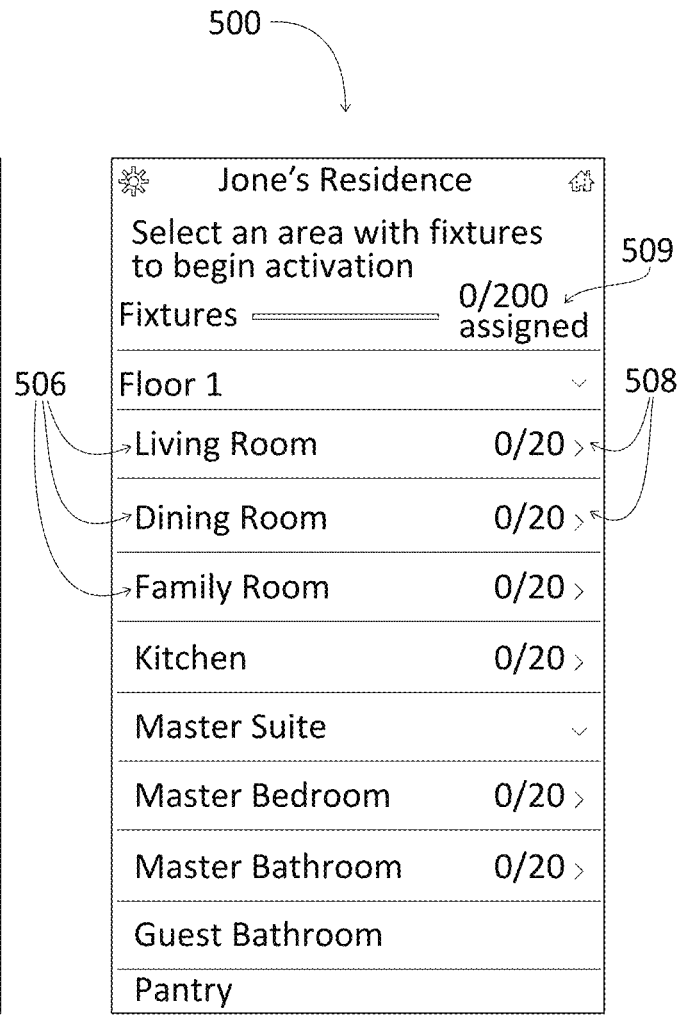

The configuration data (e.g., the lighting control configuration information) may include configuration identifiers (e.g., fixtures, groups, zones, areas, and/or locations) to which control devices may be assigned for enabling control (e.g., collective control) during normal operation. As shown in FIG. 5B, after entering the project code and accessing the configuration data, a user may select one of the areas 506 for being configured within the load control environment. The areas 506 may be retrieved from the control database of the project. The areas 506 may be identified by building, floor, room, or other area identifier. The areas 506 may be partitioned by subareas. The user interface 500 may indicate a number 508 of lighting control devices within each area 506 and/or a number 509 of lighting control devices within the project (e.g., as determined from the control database). The user interface may indicate the number of lighting control devices that have been assigned (e.g., already assigned) to a zone and/or otherwise configured within each area.

The configuration database (e.g., that defines the areas 506 and/or lighting control devices) may be predefined and/or defined within the application executing the user interface 500. For example, the configuration database may be predefined using the design software that may be used to configure a building design and/or a number of fixtures in each area of the building design (e.g., at 404 of the method 400). The design software may store configuration identifiers (e.g., names of the areas 506 and/or lighting control devices) in the configuration database of the project along with the project code that is used to access the project on the mobile device. The names of each of the lighting control devices 508 may be stored in the control database of the project with a unique identifier and/or a beacon identifier that may be transmitted by the lighting control device.

Figure 5C:
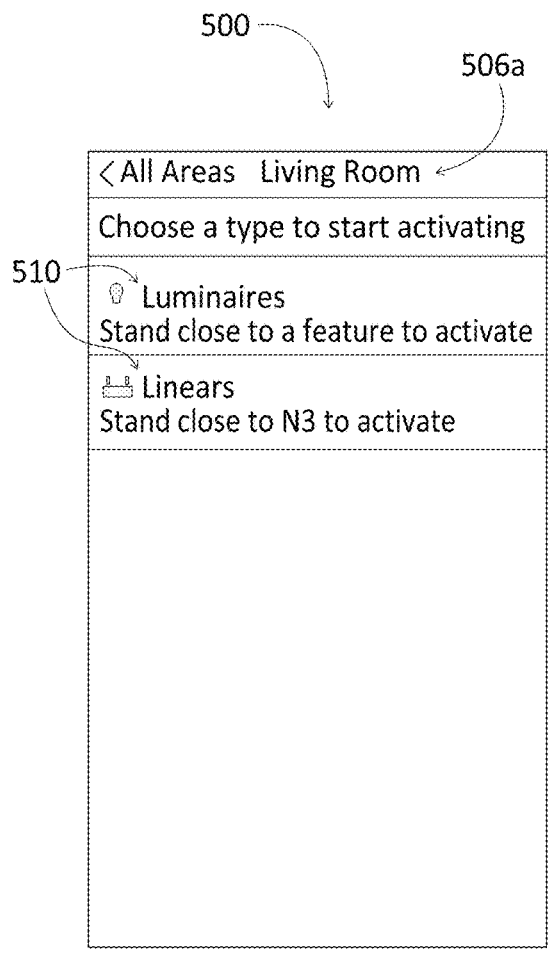

Referring now to FIG. 5C, the user may select an area 506a for configuration. The lighting control device types 510 capable of being configured in the area 506a may be displayed to the user. The user may select one of the lighting control device types 510 to begin configuring in the load control system. For example, the lighting control device types 510 may include luminaires (e.g., light bulbs and/or downlights) and linears (e.g., elongated light fixtures). Though some lighting control device types 510 are provided as examples, other lighting control device types may be similarly configured. Additionally, though lighting control devices are provided as example devices, other control devices may be similarly configured as described herein.

Figure 5D:
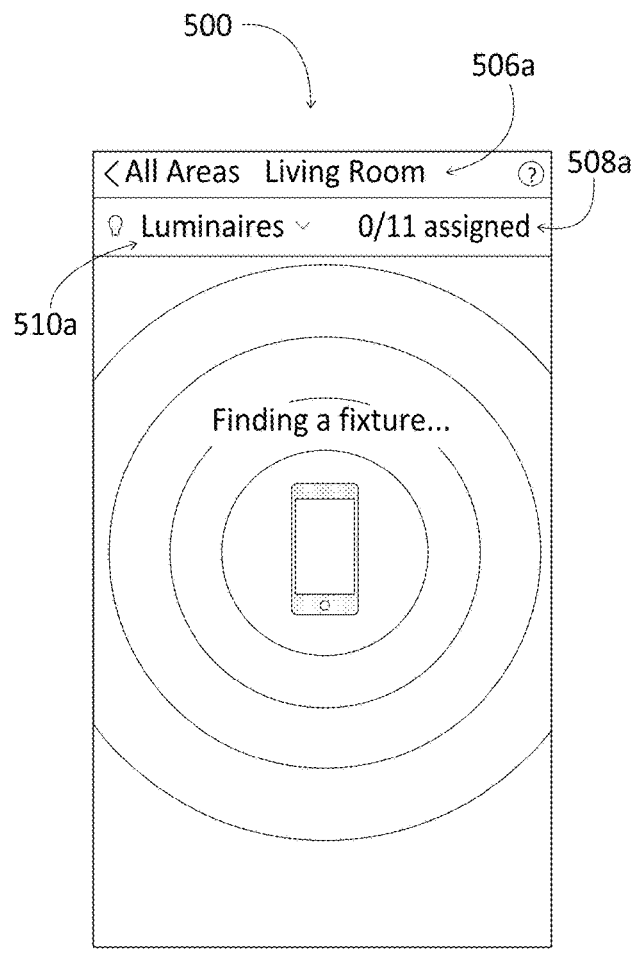

After the user selects one of the lighting control devices 510 for being configured, the mobile device may begin a discovery procedure for identifying the selected lighting control device types. As shown in FIG. 5D, the lighting control devices 510a (e.g., which may be luminaires) may be selected for discovery and/or for being configured and/or controlled. For example, the mobile device may enter a configuration mode (e.g., a claiming mode and/or an association mode) and begin transmitting (e.g., periodically transmitting) a mobile device beacon via a short-range wireless communication link (e.g., using BLE technology). In addition, the lighting control devices may begin periodically transmitting the control device beacons in response to being powered up, in response to detecting an actuation of a button, and/or in response to receiving a message. In an example, the mobile device may send a message (e.g., directly to the selected lighting control devices 510a or via the system controller) that causes the lighting control devices 510a to begin transmitting the control device beacons.

Those lighting control devices (e.g., luminaires) that receive the mobile device beacon and are within the discovery range of the mobile device may enter a configuration mode (e.g., a claiming mode and/or an association mode) and begin transmitting (e.g., periodically transmitting) respective control device beacons. The lighting control devices that are within the discovery range of the mobile device may also provide feedback to the user. For example, the feedback may be to turn the lighting load of the discovered lighting control devices a first color (e.g., orange). This feedback may indicate to the user the lighting control devices that have been discovered and/or are ready to be claimed. The user may move the mobile device to discover different lighting control devices in the area. In addition, the mobile device may send a message to the discovered lighting control devices to cause the lighting control devices to provide feedback to the user.

The mobile device may receive the control device beacons transmitted by the lighting control devices. The user interface 500 may indicate the lighting control devices that have been discovered and/or selected for being claimed and/or associated with a configuration identifier by the mobile device. As described herein, the discovered lighting control devices may include the control devices that receive the mobile device beacon above a received signal strength discovery threshold (e.g., are within a discovery range of the mobile device). The user interface may indicate the lighting control devices that have already been assigned to a configuration identifier and/or otherwise configured in the load control system. The mobile device may retrieve this information by performing a lookup in the configuration data using the beacon identifiers received in the control device beacons from the discovered lighting control devices.

Figures 5E, 5F:
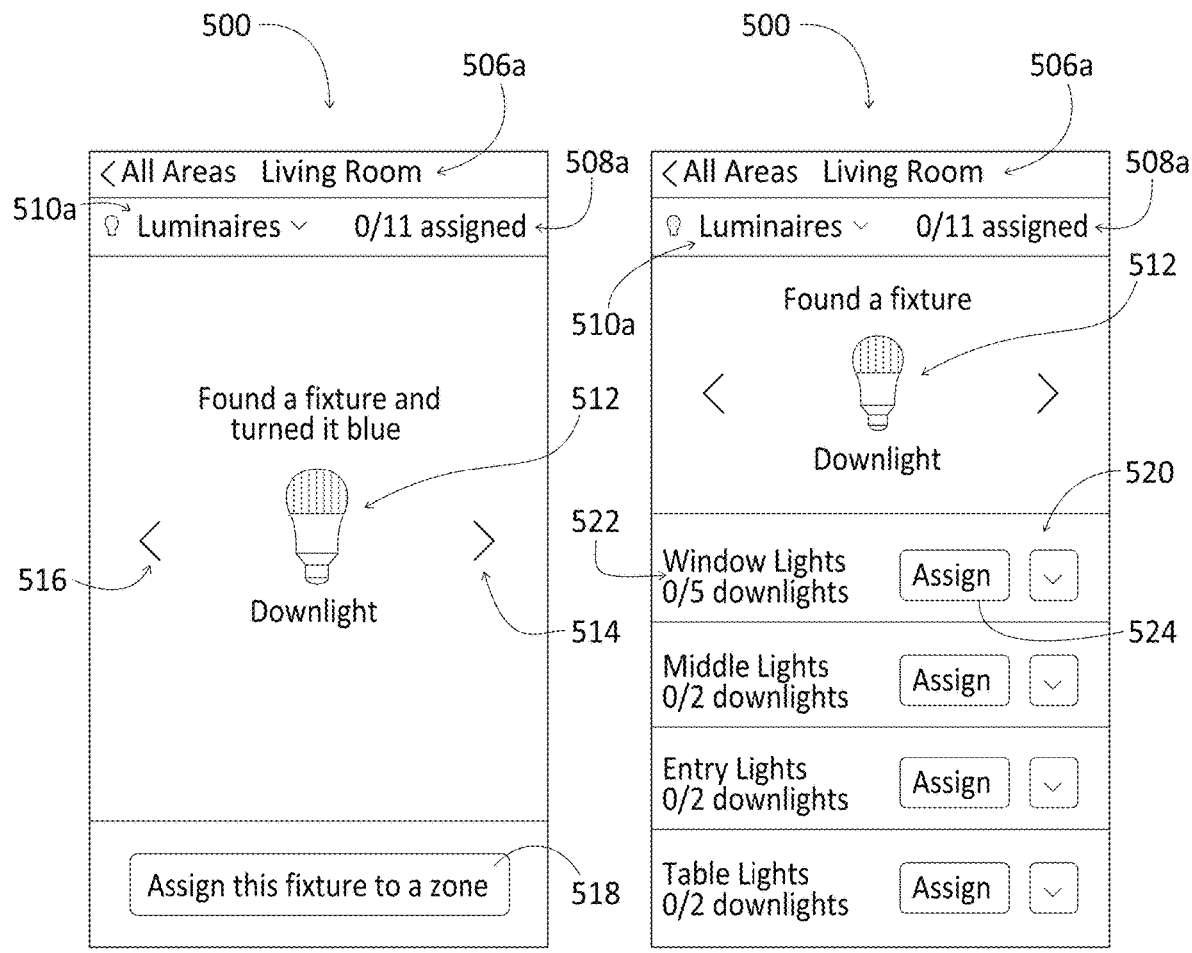

Referring now to FIG. 5E, the mobile device may identify a lighting control device within the discovered lighting control devices for being claimed and/or associated with a configuration identifier. The user interface may indicate that the lighting control device has been identified. The user interface may display a graphical representation 512 of the lighting control device that indicates a device type and/or feedback type for the identified lighting control device. The lighting control device having the strongest received signal strength indicator of the control device beacons received by the mobile device may automatically be selected as the lighting control device for being claimed and/or associated. The lighting control device having the next strongest received signal strength indicator may be selected as the lighting control device for being claimed and/or associated in response to the actuation of a next button 514. The previously-selected lighting control device may be selected once again as the lighting control device for being claimed and/or associated in response to the actuation of a previous button 516. In addition, the mobile device may also, or alternatively, identify the lighting control device for being claimed and/or associated based on a user selection from a list of the lighting control devices being displayed on the user interface 500.

The mobile device may send a message configured to cause the lighting control device identified for being claimed and/or associated to provide another feedback type. For example, the feedback may be to turn the lighting load a second color (e.g., blue). The different type of feedback may allow the user to distinguish the lighting control device being claimed and/or associated from the other lighting control devices (e.g., the other discovered lighting control devices that are the first color). To cause the lighting control device to change the feedback being provided, the mobile device may transmit (e.g., directly transmit) a message that includes the beacon identifier of the lighting control device that is identified for being claimed and/or associated. For example, the message may be a connection message initiating the establishment of a connection (e.g., a two-way communication connection) between the mobile device and the lighting control device. The lighting control device that identifies its beacon identifier in the message may establish a connection with the mobile device and change the feedback type being provided. In another example, the system controller may receive the message and may communicate with the identified lighting control device to cause the lighting control device to change the feedback type being provided.

The user may assign the lighting control device to a zone by selecting the zone assignment button 518. The selection of the zone assignment button 518 may allow the user to assign the lighting control device to one of a plurality of zones 520, as shown in FIG. 5F. The zones 520 may be predefined zones in the area 506a. The zones 520 and/or the areas 506a may be predefined in the configuration database using the design software, for example. The zones 520 and/or the areas 506a may also, or alternatively, be defined in the user interface 500 at the time of claiming and/or association. The user interface 500 may indicate a number 522 of predefined lighting control devices that may be assigned to each zone 520 as well as a number of the lighting control devices that have already been assigned to each zone 520.

The user interface 500 may display an assign button 524 that may allow a user to assign the identified lighting control device to the respective zone 520. Each of the zones 520 may have a corresponding assign button 524 for assigning the identified lighting control device to the corresponding zone.

After the identified lighting control device is assigned to one of the zones 520, the lighting control device may transmit device identification data to the network device. The device identification data may include, for example, an address (e.g., a Thread network address), a joiner ID, and/or any other kind of device identification data. Upon reception of the device identification data from the lighting control device, the network device may store the device identification in memory. The network device may transmit configuration information to the lighting control device. For example, the configuration data may include a timestamp, a network device identifier/app identifier, and/or channel information (e.g., which may aid the lighting control device in joining to the correct Thread network). The network device may store the device identification data in memory. The network device may display a notification (not shown) on the user interface that notifies the user that the network device has received the device identification data.

The network device may transmit configuration data to the lighting control device. For example, the configuration data may include a timestamp, a network device identifier/app identifier, and/or channel information (e.g., which may aid the lighting control device in joining to the correct Thread network). The configuration data may be transmitted via an RF communication signal. The lighting control device may indicate that it has received the configuration data by causing the corresponding lighting fixture to turn a predefined color (e.g., green).

Figures 5G, 5H:
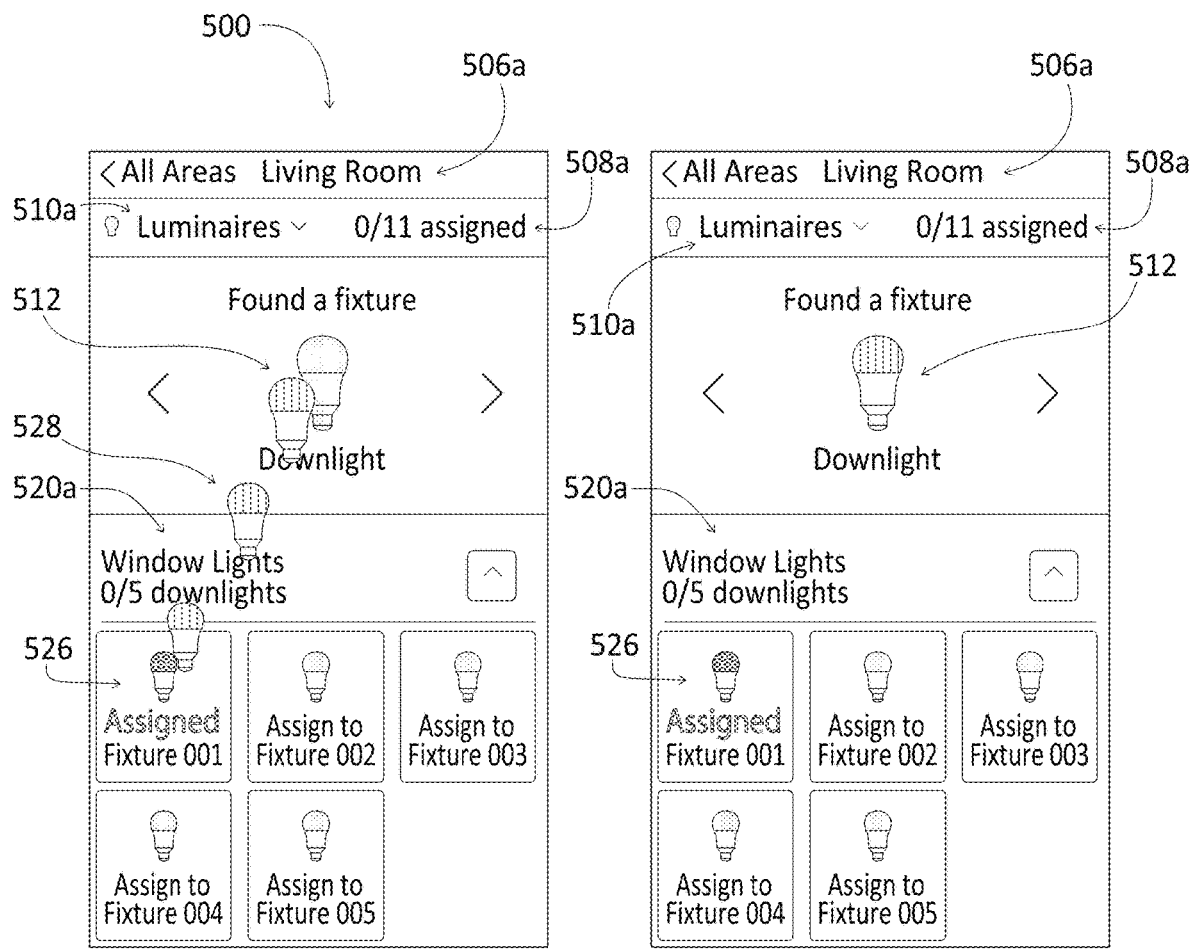

After selection of the assign button 524, the user may assign the lighting control device to a fixture (e.g., a location) within the zone 520. As shown in FIG. 5G, the selection of the assign button 524 corresponding to one of the zones 520 may allow the user to assign the identified lighting control device to one of a number of fixtures 526 of the zone 520. The user interface 500 may display the selected zone 520a to which the identified lighting control device may be assigned. The user interface may also display the number of fixtures 526 to which the lighting control device may be assigned within the zone 520a. The number and/or identification of the fixtures 526 within the zone 520a may be predefined in the lighting control configuration information or defined in the user interface. Each of the fixtures 526 may correspond to a given location within the zone in the lighting control configuration information. For example, each of the fixtures 526 may correspond to a given physical location in the zone on a floorplan.

The lighting control device may be assigned to a given fixture 526 within the zone 520*a*. The lighting control device may be assigned to the given fixture 526 by the user. For example, the user may select the given fixture 526 within the zone or drag the graphical representation 512 of the lighting control device to the given fixture 526 within the zone 520*a*. The lighting control device may be automatically assigned to a fixture 526 within the zone 520*a*. The fixture 526 may be automatically assigned to an unassigned fixture 526 at random or may be automatically assigned to the next empty fixture 526 within the zone 520*a*. The user interface may display a trail 528 that identifies a series of graphical representations 512 of the lighting control device on a path to the assigned fixture 526 in the zone 520*a*. The mobile device may store a zone identifier and/or a fixture identifier associated with the lighting control device identifier to assign the lighting control device to the zone 520*a* and/or the given fixture 516, respectively.

After the lighting control device is claimed and/or assigned to one of the fixtures 526 within the zone 520*a*, the lighting control device may provide a different feedback type to indicate that the lighting control device has been assigned to a fixture within a zone. For example, the mobile device may send a message to the lighting control device (e.g., directly or via the system controller) to indicate that the lighting control device is claimed and/or assigned to a fixture within the zone. The lighting control device may provide a different feedback type in response to the message. For example, the lighting control device may change the color of the lighting load from the color blue to the color green. The user interface 500 may illustrate the change in the feedback type being provided by the lighting control device.

After a lighting control device has been assigned to one of the fixtures 526 within the zone 520*a*, the mobile device may identify another lighting control device for being claimed and/or assigned to the zone 520*a* and/or otherwise configured and/or controlled. As shown in FIG. 5H, the user interface 500 may identify the claimed and/or assigned fixtures 526 within the zone 520*a*, as well as the unclaimed and/or unassigned fixtures 526 within the zone 520*a*. The fixtures 526 that are claimed and/or assigned may display a graphical representation that indicates the feedback type being provided by the devices that have already been claimed and/or assigned in the zone 520*a* (e.g., green lamp). The user interface may display the graphical representation 512 to indicate that another lighting control device has been identified for being claimed and/or assigned to a fixture 526 within the zone 520*a* and/or otherwise configured and/or controlled. The identified lighting control device may be the lighting control device from which the mobile device is receiving a control device beacon having the strongest received signal strength indicator of the unclaimed control devices. The identified lighting control device may be updated as the user moves around the load control environment with the mobile device. The mobile device may send a message that causes the lighting control device to provide feedback to the user to indicate the device identified for being claimed and/or associated to fixture. The feedback may be similar to the feedback type indicated by the graphical representation 512 displayed in the user interface 500.

Figures 5J, 5K:
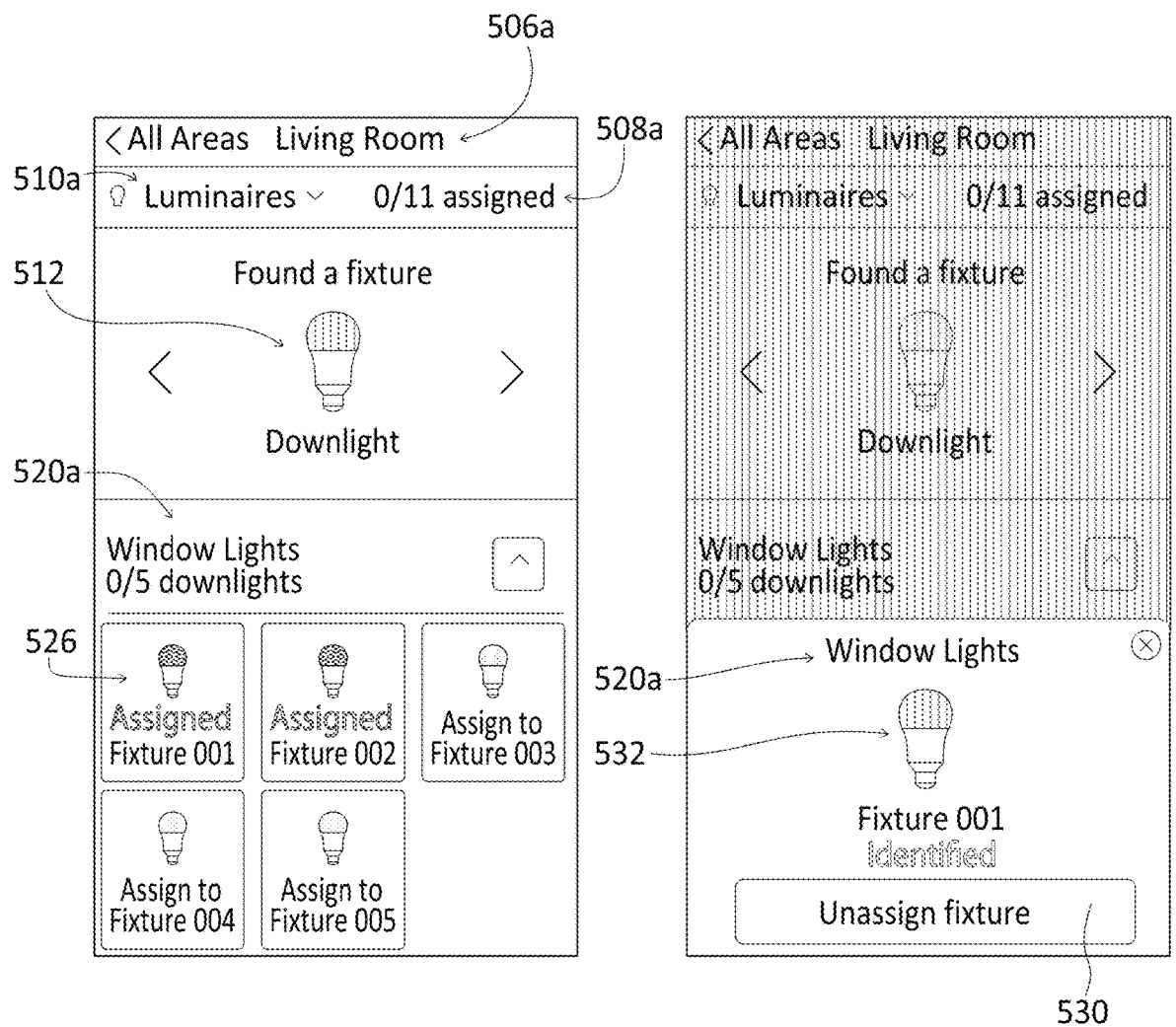

The next identified lighting control device may be claimed and/or assigned to a fixture 526 within the zone 520*a* and the user interface 500 may be updated to reflect the addition of the lighting control device to the zone 520*a*, as shown in FIG. 5J. The user may continue to walk around the load control environment to identify lighting control devices for being claimed and/or assigned to the zone 520*a*, and claiming and/or assigning the identified lighting control devices to the zone, as described herein. After each fixture 526 in the zone 520*a* has been claimed and/or assigned, the user may navigate to another zone for claiming and/or assigning lighting control devices.

The user interface may allow a user to unassign a lighting control device from a fixture 526 in a zone and/or the zone. As shown in FIG. 5K, after a user selects a lighting control device that has been assigned to a fixture 526 in the zone 520*a*, the user interface may display an unassign button 530 configured to unassign the selected lighting control device from the fixture 526 and the zone 520*a*. The user may select the unassign button 530 to remove the association of the zone identifier and/or fixture identifier with the lighting control device identifier to unassign the lighting control device from the zone 520*a* and/or the fixture 526, respectively. A graphical representation 532 may be displayed to indicate the feedback provided by the unassigned fixture. The feedback may be the same as the feedback provided prior to the lighting control device being assigned to a fixture 526 within the zone 520*a*.

As the user assigns lighting control devices to different zones of the load control system, each zone may provide a different feedback type to distinguish itself from other zones. For example, each zone in a room may be illuminated a different color.

Multiple users may be configuring (e.g., claiming, diagnostics, association, etc.) and/or controlling the load control system. To prevent multiple users from accessing and configuring the same fixtures, a single user may be able to claim a lighting control device at a time. In response to claiming and/or assigning a control device to a fixture, the mobile device may send a message to the control device indicating that the control device has been claimed. For example, the control device may be claimed upon receipt of the message indicating that the control device has been claimed. The mobile device may send a user identifier and/or mobile device identifier for being stored at the control device to indicate the user and/or device that has claimed the control device. When a control device has been claimed by a mobile device, the control device may be undiscoverable and/or prevented from being selected for being claimed and/or assigned to a fixture by another mobile device.

As a claimed control device may still be transmitting control device beacons, another mobile device may discover the claimed lighting control device and attempt to select the lighting control device for being claimed and/or assigned to a fixture. In response to the confirmation message from the mobile device confirming that the lighting control device has been selected by another mobile device, the lighting control device may send a message indicating that the lighting control device has already been claimed. The message may include the user identifier and/or the mobile device identifier of the user and/or device that has already claimed the lighting control device. The mobile device of the user attempting to claim an already claimed lighting control device may provide a notification to the user that the lighting control device has already been claimed. The notification may include the user identifier and/or the mobile device identifier of the user and/or device that has already claimed the lighting control device.

Each user or mobile device commissioning the system may have a different feedback type for the lighting control devices that are discovered, selected, identified for being claimed, and/or assigned or otherwise configured. For example, each user may have a different color scheme for devices that are selected for being claimed. Each user may also have a different color for the devices that the user has assigned to a zone or otherwise configured, such that lighting control devices configured by another user can be identified. For example, lighting control devices that have been discovered by a mobile device of a first user may be illuminated to a first color and lighting control devices that have been discovered by a mobile device of a second user may illuminated to a second color. The colors or other feedback types may be stored at the lighting control devices. For example, lighting control devices that have already been assigned to a position within a zone may have a user identifier, mobile device identifier, and/or color or other feedback type stored thereon, such that when the lighting control device is discovered by a mobile device, this information may be provided to the mobile device and/or the color or other feedback type may be provided to the user. The user may also, or alternatively, rename or store another identifier at the lighting control device, such that another user may identify the lighting control device as already being configured.

As each lighting control device may have a device type stored thereon, a user may assign lighting control devices to zones by device type. A mobile device may identify lighting control devices of different device types among the lighting control devices selected for being configured and/or controlled. For example, a portion of the lighting control devices may be identified as "down lights," while another portion of the lighting control devices may be identified as "track lights". The mobile device may automatically assign the lighting control devices of the same device types to different zones. The assignment of the lighting control devices into zones by device type may be performed in response to user actuation of a button on the mobile device. The assignment of the lighting control devices into zones by device type may be performed on unassigned lighting control devices after other lighting control devices have already been assigned to a zone. The assignment of the lighting control devices into zones may be performed on each lighting control device selected for being configured and/or controlled, rather than on a single identified lighting control device selected for being configured and/or controlled.

Figure 6A:
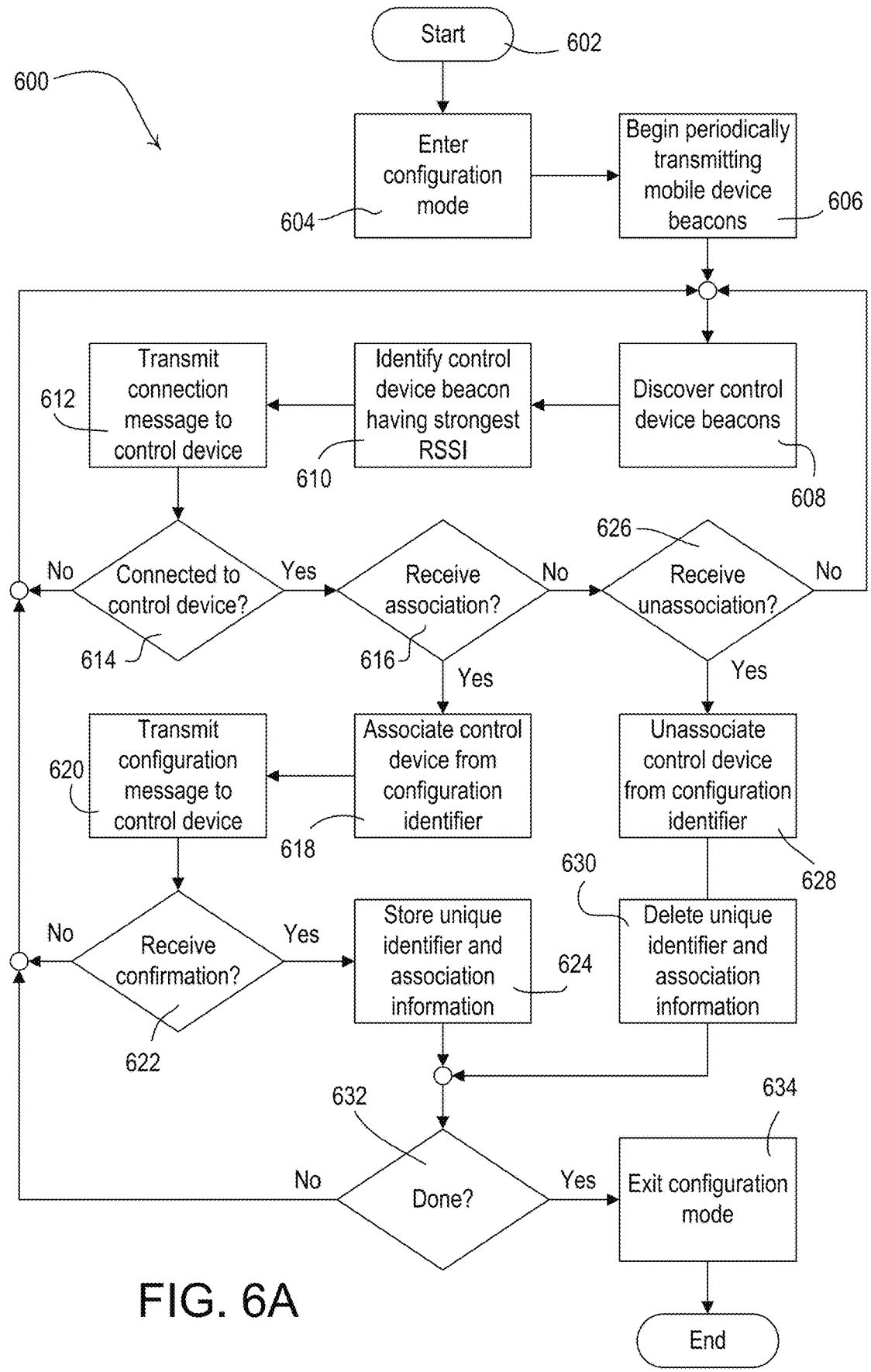
FIG. 6A is a flowchart depicting an example method for discovering control devices for enabling claiming and/or association of control devices.

FIG. 6A is a flowchart depicting an example method 600 for discovering control devices for enabling claiming and/or association of control devices. The method 600 may be executed as part of a configuration procedure (e.g., a claiming procedure and/or an association procedure). The method 600 may be implemented by one or more devices. For example, the method 600 may be executed by a mobile device (e.g., the mobile device 150, 250, 350) to claim control devices and/or associate control devices with configuration identifiers of configuration data of a load control system (e.g., as performed at 408 of the method 400). For example, the method 600 may be executed at 602 in response to the actuation of a button (e.g., a virtual or soft button) on a user interface (e.g., the user interface 500) of the mobile device.

At 604, the mobile device may enter a configuration mode (e.g., a claiming mode and/or an association mode). At 606, the mobile device may begin to periodically transmit beacons (e.g., mobile device beacons). The mobile device may be configured to transmit the mobile device beacons via a short-range wireless communication link (e.g., using BLE technology). The mobile device beacon may include, for example, a unique identifier that identifies the mobile device (e.g., or an application executed on the mobile device) and/or a received signal strength discovery threshold. When one of the control devices receives the mobile device beacon and the received signal strength indicator of the mobile device beacon is greater than or equal to the received signal strength discovery threshold included in the mobile device beacon (e.g., the control device is within a discovery range of the mobile device), the control device may enter a configuration mode (e.g., a claiming mode and/or an association mode) and begin to transmit (e.g., periodically transmit) a beacon (e.g., a control device beacon). The mobile device may adjust the received signal strength discovery threshold that is included in the mobile device beacon to adjust the discovery range of the mobile device.

At 608, the mobile device may discover (e.g., receive) the control device beacons transmitted by the control devices in response to receiving the mobile device beacon. Each control device beacon may include the unique identifier of the control device that transmitted the respective beacon. At 610, the mobile device may identify the control device beacon that has the strongest received signal strength indicator (RSSI) of the received control device beacons. At 612, the mobile device may transmit a connection message to the control device that transmitted the control device beacon identified at 610 (e.g., the control device beacon having the strongest RSSI). For example, in response to the control device receiving the connection message from the mobile device, the mobile device and the control device may be configured to establish a connection (e.g., a two-way communication connection). In addition, the connection message may indicate to the control device that the control device has been selected for claiming. If the mobile device is not able to establish the connection at 614, the method 600 may loop to allow the mobile device to attempt to connect to the same control device or a different control device.

When the mobile device successfully establishes a connection with the control device at 614, the mobile device may determine if an instruction to associate the control device with one of the configuration identifiers of the configuration data has been received from a user via the user interface of the mobile device (e.g., the user interface 500) at 616. For example, the mobile device may receive a selection of a configuration identifier (e.g., a fixture, group, zone, area, and/or location that may be defined by configuration data) to associate with the control device with which the mobile device is connected. In addition, the mobile device may receive a selection of one or more other control devices (e.g., control-source devices to associate with a control-target device, or vice versa) to associate with the control device with which the mobile device is connected. When the mobile device receives an instruction to associate the control device with one of the configuration identifiers at 616, the mobile device may create an association between the control device and the selected configuration identifier of the configuration data at 618. To associate the control device with other control devices identified in the configuration identifiers, the mobile device may store the configuration identifier of the control device with the associated configuration identifiers in memory. The associated configuration identifiers may be sent to the control device over the connection from the mobile device for being stored at the control device. The associated configuration identifiers may be stored locally at the control device, such that the control device may send messages to and/or receive messages from the associated devices for enabling load control.

The mobile device may transmit a configuration message (e.g., a claiming message, an association message, a diagnostics message, etc.) to the control device to which the mobile device is connected at 620. The configuration message may indicate that the control device has been claimed and/or associated with the selected configuration identifier of the configuration data. In response to receiving the configuration message, the control device may transmit a confirmation message (e.g., a claim confirmation message) to the mobile device. The claim confirmation message may include a unique identifier (e.g., a serial number) of the control device from which the claim confirmation message is transmitted. Before sending the claiming message, the mobile device may check whether the control device has already been claimed. If the control device has already been claimed, the mobile device may prevent the transmission of an additional claiming message and proceed to 622.

If the mobile device does not receive a claim confirmation message from the control device at 622, the method 600 may loop to allow the mobile device to attempt to connect to the same control device or a different control device. The claim confirmation message may include a unique identifier (e.g., a serial number) of the control device. When the mobile device receives the claim confirmation message from the control device to which the mobile device is connected at 622, the mobile device may store the unique identifier of the control device and association information (e.g., the configuration identifier to which the control device as associated) in memory at 624. The unique identifiers that are stored during the claiming procedure may be the devices that may be joined to the network (e.g., individually or in a batch) during a joining procedure. The association information may be stored to identify the control devices associated with the control devices that are claimed for joining the network.

If the mobile device does not receive an instruction to associate the control device to which the mobile device is connected with one of the configuration identifiers at 616, but receives an instruction to unassociate the control device with an associated configuration identifier at 626, the mobile device may unassociate the control device with the associated configuration identifier at 628 and delete the unique identifier of the control device and association information from memory at 630. The mobile device may send a message to the control device(s) to remove the association from memory at the control device(s).

If the mobile device is not done claiming and/or associating control devices with configuration identifiers of the configuration data at 632, the method 600 may loop to allow the mobile device to attempt to connect to a different control device or the same control device (e.g., if the control device was just unclaimed and/or unassociated at 626). When the mobile device is done claiming and/or associating control devices at 632 (e.g., the user actuates a button on the user interface of the mobile device to end the configuration procedure), the mobile device may exit the configuration mode at 634, and the method 600 may end. In addition, the mobile device may stop periodically transmitting the mobile device beacons at 634.

Different types of feedback may be provided by the control devices to indicate different information to the user. For example, a lighting control device may provide a feedback type to indicate that the lighting control device has been discovered and/or selected for configuration and/or control (e.g., control devices transmitting beacons received by the mobile device above the discovery threshold). The lighting control devices selected for configuration and/or control may flash (e.g., with varying frequencies), increase/decrease the intensity level of the lighting load, increase/decrease the color temperature of the lighting load, illuminate the lighting load a predefined color or color temperature, and/or providing another visual feedback via the lighting load to the user.

The selected lighting control devices having the beacon that is received at the mobile device with the strongest signal strength may provide a different feedback type. For example, the lighting control device that transmitted the control device the beacon having strongest signal strength received by the mobile device may flash at a different rate than other control devices selected for configuration and/or control, increase/decrease the intensity level of the lighting load at a different rate than other control devices selected for configuration and/or control, increase/decrease the color temperature of the lighting load at a different rate than other control devices selected for configuration and/or control, illuminate the lighting load a different color or color temperature than other control devices selected for configuration and/or control, and/or provide other visual feedback that differentiates the lighting control device to the user.

After the lighting control device has been configured (e.g., assigned to an area and/or zone), the lighting control device may provide a different feedback type. For example, the lighting control devices that have been assigned to an area or a zone in the lighting control configuration information may flash at a different rate than the unassigned devices selected for configuration and/or control, increase/decrease the intensity level of the lighting load at a different rate than the unassigned devices selected for configuration and/or control, increase/decrease the color temperature of the lighting load at a different rate than the unassigned devices selected for configuration and/or control, illuminate the lighting load a different color or color temperature than the unassigned devices selected for configuration and/or control, and/or provide other visual feedback that differentiates the assigned lighting control devices to the user.

The feedback types may be preprogrammed at the lighting control devices and/or provided in a message to the lighting control devices. For example, the feedback types may be provided in the configuration message that a lighting control device has been selected for configuration and/or control and/or in another message to the lighting control devices from a device in the load control system.

Figure 6B:
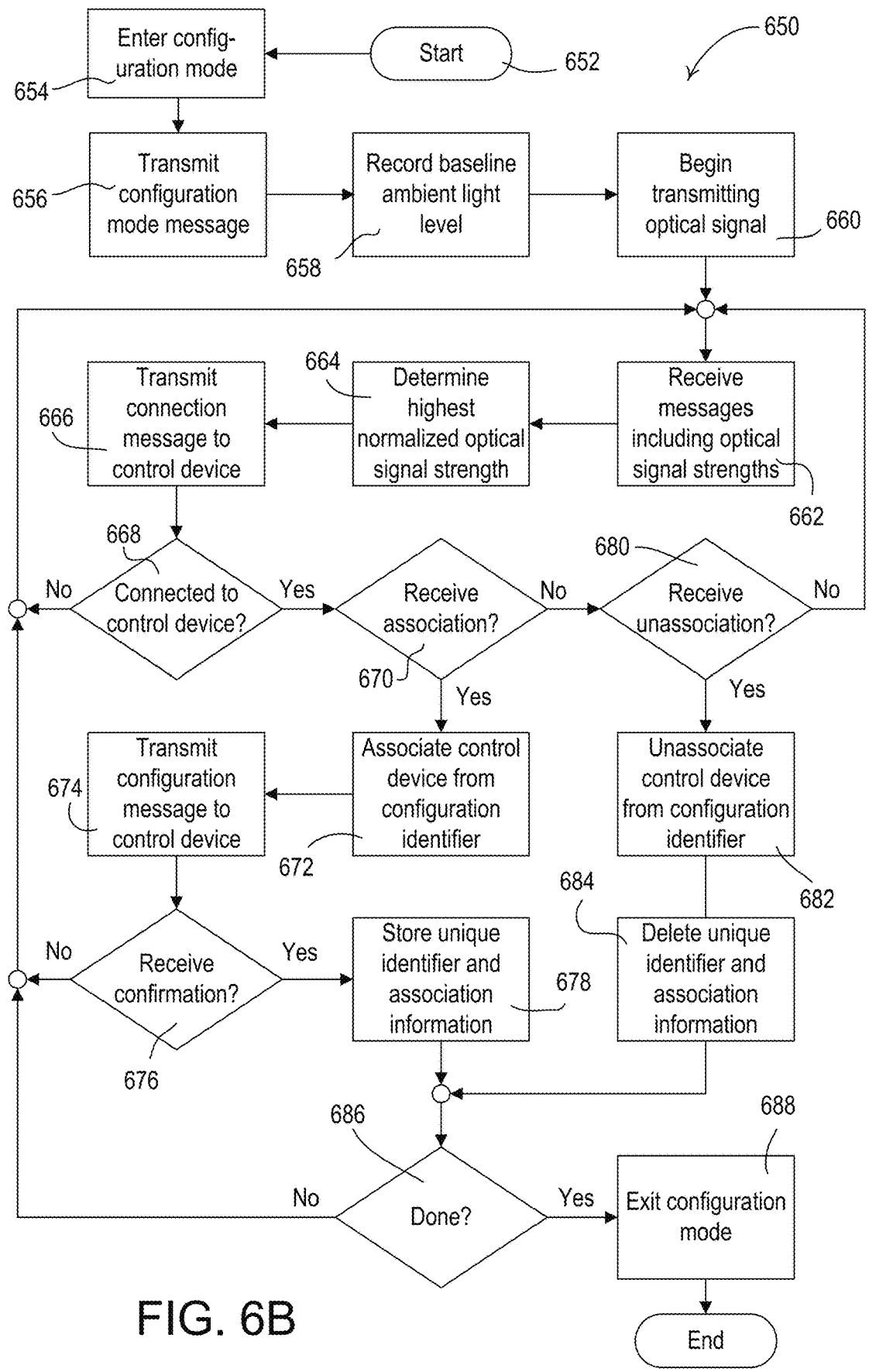
FIG. 6B is another flowchart depicting an example method for discovering control devices for enabling claiming and/or association of control devices.

As shown in FIG. 6A, a mobile device may trigger a control device (e.g., a lighting control device) to enter a configuration mode using a mobile device beacon. For example, the mobile device may transmit the mobile device beacon via RF communication signals. FIG. 6B shows an example that is similar to the example shown in FIG. 6A. As shown in FIG. 6B, a mobile device may trigger a control device to enter a configuration mode using an optical signal. For example, the optical signal may be light at a given wavelength. An optical signal may perform better than an RF beacon, for example, in a location in which other RF traffic may interfere with RF beacons transmitted to/from the control device. In addition, an optical signal may have greater precision than a beacon. For example, using a directional (e.g., focused) light beam may aid in determining which control device of a plurality of control devices has been selected for configuration. Identifying or selecting particular control devices using RF beacons may be more less accurate due to the interference and inconsistency of RF communications. An optical signal may be used regardless of whether the control device has connected to a wireless network, while a beacon may not be received by the control device if it is not connected to the wireless network.

FIG. 6B is a flowchart depicting an example method 650 for discovering control devices for enabling claiming and/or association of control devices. The method 650 may be executed as part of a configuration procedure (e.g., a claiming procedure and/or an association procedure). The method 650 may be implemented by one or more devices. For example, the method 650 may be executed by a mobile device (e.g., the mobile device 150, 250, 350) to claim control devices and/or associate control devices with configuration identifiers of configuration data of a load control system (e.g., as performed at 408 of the method 400). For example, the method 650 may be executed at 652 in response to the actuation of a button (e.g., a virtual or soft button) on a user interface (e.g., the user interface 500) of the mobile device.

At 654, the mobile device may enter a configuration mode (e.g., a claiming mode and/or an association mode). The mobile device may transmit a configuration mode message to the control devices at 656. The configuration mode message may include, for example, a unique identifier that identifies the mobile device (e.g., or an application executed on the mobile device). The configuration mode message may indicate that the control devices should enter a discovery mode. The control device may enter the discovery mode in response to the configuration mode message.

At 658, the mobile device may record a baseline ambient light level in an area in which the control devices are located. The area may be a room in a building, for example. The mobile device may record the baseline ambient light level via a photosensor, a visible light sensor (e.g., a camera) and/or other suitable sensor, which may be integrated into and/or connected to the mobile device. In addition, the control device may each record a baseline ambient light level at the respective control device (e.g., using an integral detector and/or sensor at the control device) and transmit the baseline ambient light level to the mobile device at 658. At 660, one or more optical signals (e.g., the optical signals 109) may be transmitted to the control device. For example, the mobile device may begin transmitting the optical signals using an optical transmitter (e.g., the optical transmitter 108), which may be connected to the mobile device. In addition, the optical signals may be transmitted by a laser pointer or a similar device that is included in or attached to the mobile device. The optical transmitter may also be separate from the mobile device and activated by the user independently. The optical signals may be transmitted at a given wavelength (e.g., which may be between approximately 400 nm and 700 nm). The wavelength at which the optical signal is transmitted may be a predefined wavelength to which the internal detector and/or sensor of the control device may be responsive. The optical signals may be transmitted in a direction aimed at one of the control devices.

At 662, the mobile device may receive one or more discovery response messages from the control devices. The discovery response messages may indicate that the control device received the optical signals. Each discovery response message received from a control device may include a respective optical signal strength at which the optical signal was received by the control device. The discovery response messages may be transmitted via RF, for example using BLE or another RF communication protocol. The discovery response messages may also, or alternatively, be communicated via an optical signal from the control device. For example, a lighting control device may vary the intensity and/or color of a lighting load to communicate the discovery response message (e.g., and the optical signal strength) back to the mobile device. At 664, the mobile device may determine which control device received the optical signal at the highest signal strength. For example, the mobile device may determine a normalized optical signal strength for each control device from which the mobile device received a discovery response message at 662. The mobile device may calculate the normalized optical signal strength for a control device by subtracting the baseline ambient light level from the optical signal strength received from that control device in the discovery response message, where the baseline ambient light level is either the baseline ambient light level recorded by the mobile device at 658 or the baseline ambient light level recorded by the control device and received by the mobile device at 658. Alternatively, each control device may determine a respective normalized optical signal strength by subtracting the baseline ambient light level from the optical signal strength measured by the control device, and may transmit an indication of the normalized optical signal strength to the mobile device. The mobile device may compare the determined normalized optical signal strengths and may determine which control device has the highest normalized optical signal strength.

At 666, the mobile device may transmit a connection message to the control device determined at 664 to have the highest normalized optical signal strength. For example, in response to the control device receiving the connection message from the mobile device, the mobile device and the control device may be configured to establish a connection (e.g., a two-way communication connection). The connection may be established by the mobile device and the control device exchanging credentials to create a secure connection for enabling secure communications that use the credentials. The connection message may indicate to the control device that the control device has been selected for claiming. If the mobile device is not able to establish the connection at 668, the method 650 may return to 662 to allow the mobile device to attempt to connect to the same control device or a different control device. The mobile device may receive additional discovery response messages that include optical signal strengths from control devices, or use the optical signal strengths in the previously received discovery response messages. For example, the mobile device may determine the control device having the next highest normalized optical signal strength at 664 and attempt to connect to that control device.

When the mobile device successfully establishes a connection with the control device at 668, the mobile device may determine if an instruction to associate the control device with one of the configuration identifiers of the configuration data has been received from a user via the user interface of the mobile device (e.g., the user interface 500) at 670. For example, the mobile device may receive a selection of a configuration identifier (e.g., a fixture, group, zone, area, and/or location that may be defined by configuration data) to associate with the control device with which the mobile device is connected. In addition, the mobile device may receive a selection of one or more other control devices (e.g., control-source devices to associate with a control-target device, or vice versa) to associate with the control device with which the mobile device is connected. When the mobile device receives an instruction to associate the control device with one of the configuration identifiers at 670, the mobile device may create an association between the control device and the selected configuration identifier of the configuration data at 672. To associate the control device with other control devices identified in the configuration identifiers, the mobile device may store the configuration identifier of the control device with the associated configuration identifiers in memory. The associated configuration identifiers may be sent to the control device over the connection from the mobile device for being stored at the control device. The associated configuration identifiers may be stored locally at the control device, such that the control device may send messages to and/or receive messages from the associated devices for enabling load control.

The mobile device may transmit a configuration message (e.g., a claiming message, an association message, a diagnostics message, etc.) to the control device to which the mobile device is connected at 674. The configuration message may indicate that the control device has been claimed for being joined to the network. The configuration message may indicate that the control device has been associated with the selected configuration identifier of the configuration data. In response to receiving the configuration message, the control device may transmit a claim confirmation message to the mobile device. The claim confirmation message may include a unique identifier (e.g., a serial number) of the control device from which the claim confirmation message is transmitted. Before sending the configuration message, the mobile device may check whether the control device has already been claimed. If the control device has already been claimed, the mobile device may prevent the transmission of an additional configuration message and proceed to 678.

If the mobile device does not receive a claim confirmation message from the control device at 676, the method 650 may return to 662 to allow the mobile device to attempt to connect to the same control device or a different control device. The mobile device may receive additional confirmation messages that include optical signal strengths from control devices, or use the optical signal strengths in the previously received confirmation messages. For example, the mobile device may determine the control device having the next highest normalized optical signal strength at 664 and attempt to connect to that control device.

When the mobile device receives the claim confirmation message from the control device to which the mobile device is connected at 676, the mobile device may store the unique identifier of the control device and corresponding association information (e.g., the configuration identifier to which the control device as associated) in memory at 678. The unique identifiers that are stored during the claiming procedure may be the devices that may be joined to the network (e.g., individually or in batch) during a joining procedure. The association information may be stored to identify the control devices associated with the control devices that are claimed for joining the network.

Referring again to 670, if the mobile device does not receive an instruction to associate the control device to which the mobile device is connected with one of the configuration identifiers at 670, but receives an instruction to unassociate the control device with an associated configuration identifier at 680, the mobile device may unassociate the control device with the associated configuration identifier at 682 and delete the unique identifier of the control device and association information from memory at 684. The mobile device may send a message to the control device(s) to remove the association from memory at the control device(s).

If the mobile device is not done claiming and/or associating control devices with configuration identifiers of the configuration data at 686, the method 650 may return to 662 to allow the mobile device to attempt to connect to the same control device or a different control device (e.g., if the control device was just unclaimed and/or unassociated at 680). When the mobile device is done claiming and/or associating control devices at 686 (e.g., the user actuates a button on the user interface of the mobile device to end the configuration procedure), the mobile device may exit the configuration mode at 688, and the method 650 may end. In addition, the mobile device may stop transmitting the optical signal at 688.

Figure 7A:
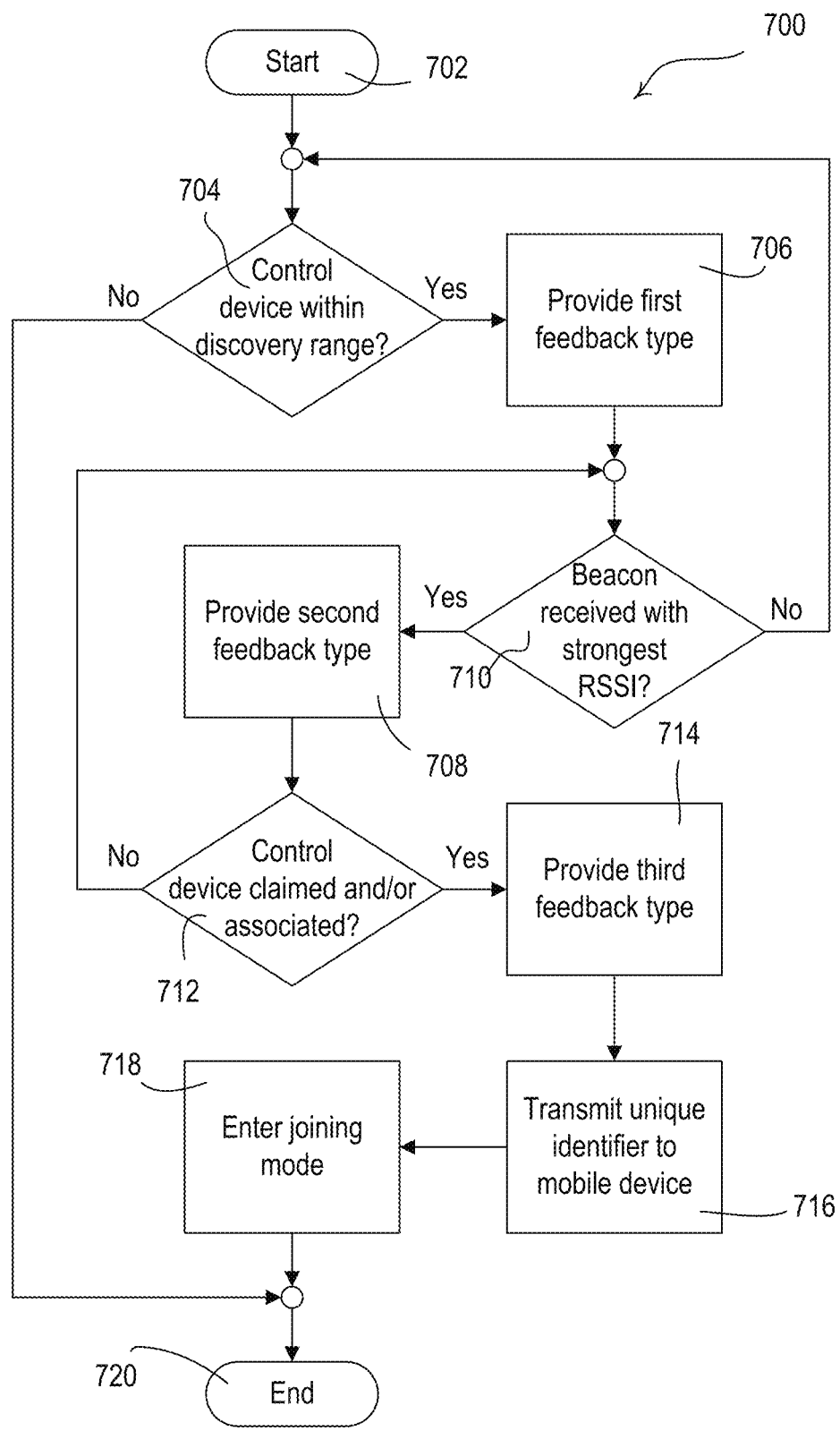
FIG. 7A is a flowchart depicting an example method for discovering control devices and providing feedback for enabling configuration and/or control using beacons.

FIG. 7A is a flowchart illustrating an example method 700 for configuring control devices of a load control system (e.g., the load control system 100 and/or the load control system 200 shown in FIG. 2A) for claiming and/or associating the control devices. The method 700 may be executed as part of a configuration procedure (e.g., a claiming procedure and/or an association procedure). The method 700 may be implemented by a control device, such as a lighting control device (e.g., the lighting control devices 110, 210a-210d, 310). However, other control devices may similarly perform one or more portions of the method 700. During the method 700, the lighting control device may provide different types of feedback. The method 700 may be executed after the lighting control device entered a configuration mode (e.g., a claiming mode and/or an association mode) when the lighting control device was powered up. While in the configuration mode, the lighting control devices may transmit (e.g., periodically transmit) a beacon (e.g., a control device beacon). The control device beacon may include a unique identifier of the lighting control device and/or a device type. The control device beacon may be transmitted via RF communication signals (e.g., BLUETOOTH® low energy (BLE) signal).

As shown in FIG. 7A, the method 700 may begin at 702. For example, the mobile device may execute the method 700 periodically. At 704, a determination may be made as to whether the lighting control device has been discovered (e.g., added to a temporary group of discovered control devices) by a network device, such a mobile device (e.g., the mobile device 150, 250, 350). For example, there may be a temporary group including one or more discovered control devices. The determination may be made based on whether the lighting control device has received an indication that the lighting control device has been discovered from the mobile device (e.g., which may send the indication upon receipt of the control device beacon from the lighting control device). For example, the determination may be made in response to receiving from the mobile device a confirmation message including the indication that the lighting control device has been discovered from the mobile device. The confirmation message may include a temporary group identifier and/or a type of feedback to provide to indicate that the lighting control device has been discovered. If the lighting control device is not with the discovery range of the mobile device at 704, the method 700 may end.

If the lighting control device has been discovered at 704, the lighting control device may provide a first feedback type that indicates the lighting control device has been discovered (e.g., is within the discovery range of the mobile device) at 706. The feedback may be provided by flashing a lighting load on and off, increasing and/or decreasing the intensity level of the lighting load, increasing and/or decreasing the color temperature of the lighting load, illuminating the lighting load a predefined color, illuminating the lighting load a predefined color temperature, and/or providing other visual feedback to the user. The lighting control device may stop providing the first feedback type when the lighting control device falls outside of the discovery range of the mobile device (e.g., after a timeout period from when the lighting control device falls outside of the discovery range).

A determination may be made, at 708, as to whether the control device beacon transmitted by the lighting control device has been received at the mobile device with the strongest received signal strength indicator (RSSI) of the discovered lighting control devices. For example, a message may be received by the lighting control device that indicates the control device beacon of the lighting control device has been received by the mobile device with the strongest received signal strength indicator of the discovered lighting control devices. The message may similar to the confirmation message indicating that the lighting control device has been discovered. If the lighting control device determines that the beacon control signal of the lighting control device has not been received with the strongest received signal strength indicator at 708, the lighting control device may continue to provide the first feedback type again at 706 if the lighting control device is still within the discovery range of the mobile device at 704.

In response to detecting that the beacon control signal of the lighting control device has been received with the strongest received signal strength indicator at 708, the lighting control device may provide a second feedback type at 710. The second feedback type may differentiate the lighting control device from the other discovered control devices providing the first feedback type. For example, the second feedback type may be provided by flashing a lighting load on and off, increasing and/or decreasing the intensity level of the lighting load, increasing and/or decreasing the color temperature of the lighting load, illuminating the lighting load at a predefined color, illuminating the lighting load at a predefined color temperature, and/or providing other visual feedback to the user that is different from the first feedback type.

In an example, the discovered lighting control devices may illuminate each corresponding lighting load the color orange to indicate the lighting control devices that have been discovered, and the lighting control device that transmitted the control device beacon having the strongest received signal strength indicator received by the mobile device may illuminate a corresponding lighting load the color blue. The blue lighting load may indicate to the user the lighting control device of the discovered lighting control devices that is selected for claiming and/or association. The blue lighting load may indicate to the user the lighting control device of the discovered lighting control devices that is most likely the closest in proximity to the mobile device. The orange lighting loads may indicate to the user those lighting loads that are within the discovery range of the mobile device and/or in a configuration mode. In addition, the orange lighting loads may indicate to the user that those lighting control devise and/or lighting loads that are operating properly.

A lighting control device (e.g., a single lighting control device) in the discovered devices may provide the second feedback type at a given time. As the user walks around with the mobile device, a control device beacon of another lighting control device may be received with a stronger received signal strength indicator. The mobile device may communicate one or more messages configured to cause the lighting load providing the second feedback type to change. The mobile device may cause a different lighting load to provide the second feedback type by transmitting a message within the wireless range of the temporary group that has the identifier of the updated lighting control device from which the control device beacon having the strongest received signal strength indicator is being received. The lighting control device that is currently providing the second feedback type may receive the message and stop providing the second feedback type, since the received identifier is associated with another lighting control device. The lighting control device may revert back to providing the first feedback type, or stop providing feedback altogether (e.g., if a message fails to be received by the mobile device within a predefined period of time). Accordingly, if the lighting control device determines that the beacon control signal of the lighting control device was not received with the strongest received signal strength indicator at 708, the lighting control device may provide the first feedback type again at 706 if the lighting control device is still within the discovery range of the mobile device at 704.

After providing the second feedback type at 710, a determination may be made, at 712, as to whether the lighting control device has been claimed and/or assigned to a configuration identifier (e.g., zone or group identifier for being joined to a network) of the configuration data. For example, the lighting control device may receive a message (e.g., a claiming message) that indicates the lighting control device has been claimed. In addition, the message may indicate that the lighting control device has been assigned to a configuration identifier. The configuration identifier may be a fixture, group, zone, area, and/or location that may be defined by the configuration data (e.g., the lighting control configuration information) generated by the design software. The configuration identifier may represent a fixture, group, and/or zone at a physical location within a building and may be indicated on a floorplan. The message may be transmitted by the mobile device. The message may include the configuration identifier of the fixture, group, and/or zone, such that the lighting control message may be responsive to messages configured to control devices in the fixture, group, and/or zone.

If the lighting control device has not been claimed and/or assigned to a configuration identifier at 712, the lighting control device may continue to provide the second feedback type at 710 if the beacon control signal of the lighting control device is still received by the mobile device with the strongest received signal strength indicator at 708. However, if the lighting control device determines that the beacon control signal of the lighting control device is no longer received with the strongest received signal strength indicator at 708, the lighting control device may then provide the first feedback type again at 706 if the lighting control device is still within the discovery range of the mobile device at 704.

When the lighting control device has been claimed and/or assigned to a configuration identifier at 712, the lighting control device may provide a third feedback type at 714. The third feedback type may differentiate the lighting control device from the other discovered control devices providing the first feedback type and/or the second feedback type. For example, the third feedback type may be provided by flashing a lighting load on and off, increasing and/or decreasing the intensity level of the lighting load, increasing and/or decreasing the color temperature of the lighting load, illuminating the lighting load at a predefined color, illuminating the lighting load at a predefined color temperature, and/or providing other visual feedback to the user that is different from the first feedback type and/or second feedback type. In an example, the discovered lighting control devices (e.g., that are unassigned to area fixture or zone and do not have the beacon signal received strongest by the mobile device) may illuminate each corresponding lighting load the color orange to indicate the lighting control devices that have been discovered (e.g., are within wireless range of the mobile device), the lighting control device that has the beacon signal received strongest by the mobile device (e.g., and is unassigned to area fixture and/or zone) may illuminate a corresponding lighting load the color blue, and the lighting control devices that have been assigned to area fixture and/or zone may illuminate a corresponding lighting load the color green. The green lighting load may indicate to the user the lighting control devices out of the discovered lighting control devices that have already been claimed and/or assigned to a configuration identifier. Lighting control devices assigned to different fixtures, groups, and/or zones may provide different types of feedback (e.g., illuminate lighting loads different colors, flash differently, illuminate lighting loads different color temperatures or dimming levels, etc.).

The third feedback type may also, or alternatively, be provided in response to other configuration information for configuring (e.g., claiming, diagnostics, association, etc.) and/or controlling the lighting control device. For example, the third feedback type may be provided after the lighting control device is configured with scenes, dimming levels, and/or other lighting control information to complete configuration (e.g., claiming, diagnostics, association, etc.) and/or control of the lighting control device. After providing the third feedback type at 714, the lighting control device may transmit a message (e.g., a claim confirmation message) that includes a unique identifier (e.g., a serial number) of the lighting control device at 716. The lighting control device may then enter a joining mode at 718. The method 700 may end at 720. In the joining mode, the lighting control device may stop transmitting (e.g., periodically transmitting) the control device beacon continuously via the short-range wireless communication link, and may periodically switch between transmitting the control device beacon (e.g., using BLE technology) and listening for a request to join a wireless communication network (e.g., as performed at 412 of the method 400).

The first feedback type, second feedback type, and/or third feedback type may be provided by a lighting control device while the lighting control device is within the discovery range and/or temporary group. When the mobile device moves away from the lighting control device, such that the lighting control device is outside of the discovery range and/or temporary group, the lighting control device may stop providing feedback.

If a lighting control device is removed from a prior assignment or other configuration (e.g., claiming, diagnostics, association, etc.) and/or control of the lighting control device is removed, the lighting control device may stop providing the third feedback type. The lighting control device may revert back to the first feedback type and/or the second feedback type when the lighting control device being configured and/or controlled (e.g., the lighting control device is in the discovered temporary group of lighting control devices being configured and/or controlled). The lighting control devices may stop providing feedback when they are outside of the discovery range of the mobile device (e.g., are removed from the discovered temporary group of lighting control devices being configured and/or controlled). The lighting control devices may be automatically removed from the temporary group and/or stop providing feedback when the lighting control devices fail to receive a message from the mobile device within a predefined period of time (e.g., indicating that the mobile device may be out of wireless range). The lighting control devices may also, or alternatively, be removed from the temporary group and/or stop providing feedback when the lighting control device receives a message from the mobile device and determines from the signal strength of the message or an indication in the message that the lighting device is outside of the discovery range (e.g., while the lighting control device is within the wireless range of communications from the mobile device). Though the method 700 may be described with reference to lighting control devices, other types of control devices may be similarly implemented.

Figure 7B:
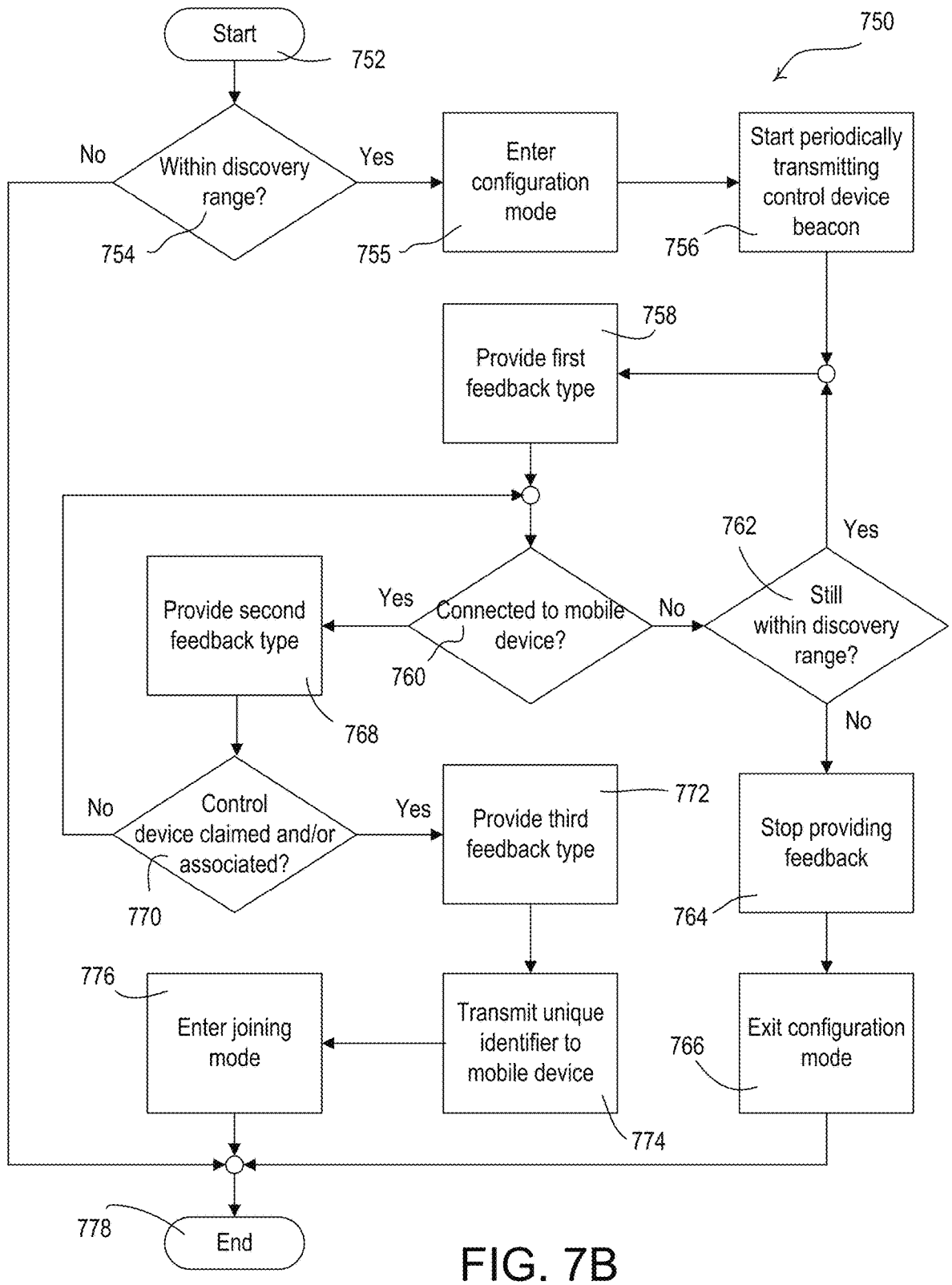
FIG. 7B is another flowchart depicting an example method for discovering control devices and providing feedback for enabling configuration and/or control using beacons.

FIG. 7B is a flowchart illustrating an example method 750 for configuring control devices of a load control system (e.g., the load control system 100 and/or the load control system 200 shown in FIG. 2A) for claiming and/or associating the control devices. The method 750 may be executed as part of a configuration procedure (e.g., a claiming procedure and/or an association procedure). The method 750 may be implemented by a control device (e.g., a lighting control device). However, other control devices may similarly perform one or more portions of the method 750. During the method 750, the lighting control device may provide different types of feedback. The method 750 may be executed when the lighting control device is not already in a configuration mode (e.g., the lighting control device did not enter a configuration mode and start periodically transmitting control device beacons at power up).

The method 750 may reduce RF traffic (e.g., RF transmissions) in an area, as compared to the method 700 of FIG. 7A. The RF traffic in an area (e.g., in a building in which the lighting control device is installed) may be generated by the control devices of the load control system as well as other devices in the area, such as other beaconing devices, wireless network access points, etc. The method 750 may be implemented, for example, when a network device, a mobile device, a system controller, and/or other control devices identify the number of control devices in the load control system is above a device count threshold (e.g., greater than 25, 50, 100, etc.). For example, if the number of control devices in the load control system is above the threshold, there may be a relatively high amount of RF traffic (e.g., interference) if the control devices transmit beacons simultaneously. Additionally, or alternatively, the method 750 may be implemented when network congestion is detected as exceeding a threshold at a device (e.g., a lighting control device, a system controller, a network device, a mobile device, etc.). The network congestion may exceed a threshold when the probability of a message reception has dropped below a reception probability threshold (e.g., the message may need to be retransmitted a number of times greater than a retransmission threshold, for example). The method 750 may reduce the amount of RF traffic present in the area in which the load control system is located, for example by reducing the number of control devices transmitting beacons at any given time, which may result in a lower incidence of collisions between transmissions and/or dropped messages. The identification of the likelihood of high RF traffic and/or network congestion may be provided manually by a user (e.g., using a user interface of the mobile device) and/or automatically by one or more of the control devices of the load control system (e.g., the system controller).

As shown in FIG. 7B, the method 750 may begin at 752, for example, when the lighting control device receives a beacon (e.g., a mobile device beacon) from a network device, such as a mobile device (e.g., the mobile device 150, 250, 350). The mobile device beacon may be transmitted in response to a configuration mode (e.g., a claiming mode and/or an association mode) being entered at the mobile device (e.g., in response to a selection of a button on an application at the mobile device). The mobile device beacon may be transmitted periodically while the mobile device is in the configuration mode. The mobile device beacon may include a beacon identifier of the mobile device. For example, the beacon identifier may be unique identifier that identifies the mobile device (e.g., or an application executed on the mobile device) and/or a non-unique identifier, such as an identifier of a group, area, building, load control system, and/or manufacturer of the mobile device and/or the control devices of the load control system. The beacon identifier may be an identifier of an application running on the mobile device. The mobile device beacon may be transmitted via RF communication signals (e.g., a BLUETOOTH® low energy (BLE) signal). The mobile device may determine a received signal strength indicator (e.g., RSSI) of the received network device beacon (e.g., the signal strength at which the network device beacon is received). The received signal strength indicator of the mobile device beacon may be compared to a received signal strength discovery threshold (e.g., a received signal strength discovery threshold). The received signal strength discovery threshold may be received in the mobile device beacon and/or preconfigured at the lighting control device. The received signal strength discovery threshold may be configured by a user of the mobile device, preconfigured on the mobile device and/or the lighting control device, and/or configured by a network (e.g., received from the system controller).

At 754, a determination may be made as to whether the lighting control device is within a discovery range of the mobile device. For example, the lighting control device may determine that the lighting control device is within the discovery range of the mobile device by determining if the received signal strength indicator (RSSI) of the received mobile device beacon is greater than or equal to a received signal strength discovery threshold (e.g., the received signal strength discovery threshold included in the received mobile device beacon). If the lighting control device determines that the lighting control device is within the discovery range of the mobile device at 754, the lighting control device may enter a configuration mode (e.g., a claiming mode and/or an association mode) at 755. In addition, the lighting control device may enter (e.g., only enter) the configuration mode if the beacon identifier of the received mobile device beacon is a particular (e.g., predetermined) beacon identifier. The configuration mode may be a mode in which the mobile device may store associations of the unique identifiers of the lighting control devices and configuration identifiers of the configuration data (e.g., locally and/or at the system controller). The stored associations may enable identification of associated control devices for performing load control or otherwise responding to messages from associated devices during normal operation. For example, entering the configuration mode may be triggered in response to the mobile device beacon received by the lighting control device. If the lighting control device determines that the lighting control device is not within the discovery range of the mobile device at 754, the method 750 may end at 778.

The mobile device beacon may operate as a triggering event for triggering a lighting control device to transmit a beacon (e.g., a control device beacon). At 756, the lighting control device may start to periodically transmit the control device beacon. The control device beacon may include a beacon identifier of the lighting control device and/or a device type. For example, the beacon identifier of the control device may be a unique identifier that identifies the lighting control device and/or a non-unique identifier, such as an identifier of a group, area, building, load control system, and/or manufacturer of the mobile device and/or the control devices of the load control system 100. The control device beacon may be communicated in response to receiving a mobile device beacon having a received signal strength indicator (RSSI) greater than the received signal strength discovery threshold and/or the beacon identifier of the received mobile device beacon is a particular (e.g., predetermined) beacon identifier.

The lighting control device may provide a first feedback type, at 758, that indicates the lighting control device has entered the configuration mode. The first feedback type may be provided by flashing a lighting load on and off, increasing and/or decreasing the intensity level of the lighting load, increasing and/or decreasing the color temperature of the lighting load, illuminating the lighting load a predefined color (e.g., orange), illuminating the lighting load a predefined color temperature, and/or providing other visual feedback to the user. The lighting control device may stop providing the first feedback type when the lighting control device falls outside of the discovery range of the mobile device (e.g., after a timeout period from when the lighting control device falls outside of the wireless range of the mobile device). The lighting control device may resume providing the first feedback type if the lighting control device comes within the discovery range of the mobile device again (e.g., after a timeout period from when the lighting control device falls outside of the discovery range).

A determination may be made, at 760, as to whether the lighting control device is connected to the mobile device or not. For example, the lighting control device may determine if the control device beacon transmitted by the lighting control device has been received at the mobile device with the strongest received signal strength indicator (RSSI) of the lighting control devices that are in the configuration mode (e.g., those lighting control devices that have not yet been claimed). For example, a message may be received by the lighting control device that indicates the control device beacon has been received by the mobile device with the strongest RSSI of the control devices in the configuration mode. For example, the message may be a connection message initiating the establishment of a connection (e.g., a two-way communication connection) between the mobile device and the lighting control device.

If the lighting control device did not receive a connection message (e.g., the beacon control signal of the lighting control device has not been received with the strongest received signal strength indicator) at 760, the lighting control device may determine if the lighting control device is still within the discovery range of the mobile device (e.g., still receiving the mobile device beacons) at 762. If the lighting control device is still within the discovery range of the mobile device at 762, the lighting control device may continue to provide the first feedback type again at 758. If the lighting control device is no longer within the discovery range at 762, the lighting control device may stop providing feedback (e.g., the first feedback type) at 764, exit the configuration mode at 766, and the method 700 may end at 778. In addition, the control device may stop periodically transmitting the control device beacons at 764.

When the lighting control device is connected to the mobile device (e.g., in response to the control device beacon of the lighting control device being received with the strongest received signal strength indicator of the lighting control devices in the configuration mode) at 762, the lighting control device may provide a second feedback type at 768. The second feedback type may differentiate the lighting control device from the other lighting control devices providing the first feedback type. For example, the second feedback type may be provided by flashing a lighting load on and off, increasing and/or decreasing the intensity level of the lighting load, increasing and/or decreasing the color temperature of the lighting load, illuminating the lighting load at a predefined color (e.g., blue), illuminating the lighting load at a predefined color temperature, and/or providing other visual feedback to the user that is different from the first feedback type.

In an example, the lighting control devices that are in the configuration mode may illuminate each corresponding lighting load the color orange to indicate the lighting control devices are in the configuration mode, and the lighting control device that transmitted the control device beacon received by the mobile device with the strongest received signal strength indicator may illuminate a corresponding lighting load the color blue. The blue lighting load may indicate to the user the lighting control device that is selected for claiming and/or association. The blue lighting load may indicate to the user the lighting control device of the discovered the lighting control devices that is most likely the closest in proximity to the mobile device. The orange lighting loads may indicate to the user those lighting loads that are within the discovery range of the mobile device and/or are in the configuration mode. In addition, the orange lighting loads may indicate to the user those lighting control devices and/or lighting loads that are operating properly.

A lighting control device (e.g., a single lighting control device) in the discovered group of devices may provide the second feedback type at a given time. As the user walks around with the mobile device, a control device beacon of another lighting control device may be received with a stronger received signal strength indicator. The mobile device may communicate one or more messages configured to cause the lighting load providing the second feedback type to change. The mobile device may cause a different lighting load to provide the second feedback type by transmitting a message (e.g., a connection message) that has the identifier of the updated lighting control device from which the strongest control device beacon is being received. The mobile device may break the two-way communication connection with the lighting control device that is currently providing the second feedback type, and that lighting control device may stop providing the second feedback type. The lighting control device may revert back to providing the first feedback type, or stop providing feedback altogether (e.g., if the lighting control device fails to receive a mobile device beacon from the mobile device within a predefined period of time). Accordingly, if the lighting control device determines that the beacon control signal of the lighting control device was not received with the strongest received signal strength indicator at 760, the lighting control device may provide the first feedback type again at 758 if the lighting control device is still within the discovery range of the mobile device at 762.

After providing the second feedback type at 768, a determination may be made, at 770, as to whether the lighting control device has been claimed and/or assigned to a configuration identifier of the configuration data. For example, the lighting control device may receive a message (e.g., a claiming message) that indicates the lighting control device has been claimed. In addition, the message may indicate that the lighting control device has been assigned to a configuration identifier. The configuration identifier may be a fixture, group, zone, area, and/or location that may be defined by the configuration data (e.g., lighting control configuration information) generated by the design software. The configuration identifier may represent a fixture, group, and/or zone at a physical location within a building and may be indicated on a floorplan. The message may be transmitted by the mobile device. The message may include the configuration identifier of the fixture, group, and/or zone, such that the lighting control message may be responsive to messages configured to control devices in the fixture, group, and/or zone.

If the lighting control device has not been claimed and/or assigned to a configuration identifier at 770, the lighting control device may continue to provide the second feedback type at 768 if the beacon control signal of the lighting control device is still received by the mobile device with the strongest received signal strength indicator at 760. However, if the lighting control device determines that the beacon control signal of the lighting control device is no longer received with the strongest received signal strength indicator at 760, the lighting control device may then provide the first feedback type again at 758 if the lighting control device is still within the discovery range of the mobile device at 762.

When the lighting control device has been claimed and/or assigned to a configuration identifier at 770, the lighting control device may provide a third feedback type at 772. The third feedback type may differentiate the lighting control device from the other control devices in the configuration mode providing the first feedback type and/or the second feedback type. For example, the third feedback type may be provided by flashing a lighting load on and off, increasing and/or decreasing the intensity level of the lighting load, increasing and/or decreasing the color temperature of the lighting load, illuminating the lighting load at a predefined color (e.g., green), illuminating the lighting load at a predefined color temperature, and/or providing other visual feedback to the user that is different from the first feedback type and/or second feedback type.

In an example, the lighting control devices that are within discovery range of the mobile device (e.g., are in the configuration mode) may illuminate each corresponding lighting load the color orange to indicate the lighting control devices that are within discovery range of the mobile device (e.g., are within the discovery range of the mobile device) (e.g., that are not claimed and do not have the control device beacon signal received strongest by the mobile device). The lighting control device that has the control device beacon received by the mobile device with the strongest received signal strength indicator (e.g., and is unclaimed) may illuminate a corresponding lighting load the color blue, and the lighting control devices that have been claimed may illuminate a corresponding lighting load the color green. The green lighting load may indicate to the user the lighting control devices that have already been claimed and/or assigned to a configuration identifier. Lighting control devices claimed and assigned to different fixtures, groups, and/or zones may provide different types of feedback (e.g., illuminate lighting loads different colors, flash differently, illuminate lighting loads different color temperatures or dimming levels, etc.).

The third feedback type may also, or alternatively, be provided in response to other configuration information for configuring (e.g., claiming, diagnostics, association, etc.) and/or controlling the lighting control device. For example, the third feedback type may be provided after the lighting control device is configured with scenes, dimming levels, and/or other lighting control information to complete configuration (e.g., claiming, diagnostics, association, etc.) and/or control of the lighting control device. After providing the third feedback type at 772, the lighting control device may transmit a message (e.g., a claim confirmation message) that includes a unique identifier (e.g., a serial number) of the lighting control device at 774. The lighting control device may then enter a joining mode at 776. In the joining mode, the lighting control device may stop transmitting (e.g., periodically transmitting) the control device beacon continuously via the short-range wireless communication link, and may periodically switch between transmitting the control device beacon (e.g., using BLE technology) and listening for a request to join a wireless communication network (e.g., as performed at 412 of the method 400). The method 750 may end at 778.

The first feedback type, second feedback type, and/or third feedback type may be provided by a lighting control device while the lighting control device is in the configuration mode (e.g., receives the mobile device beacon at or above the received signal strength discovery threshold). When the mobile device moves away from the lighting control device, such that the received signal strength indicator of the mobile device beacon is below the received signal strength discovery threshold, the lighting control device may stop providing feedback.

If a lighting control device is removed from a prior assignment or the claimed status of the lighting control device is removed, the lighting control device may stop providing the third feedback type. The lighting control device may revert back to the first feedback type and/or the second feedback type when the lighting control device is in the configuration mode. The lighting control devices may stop providing feedback when the lighting control are outside of the discovery range of the mobile device (e.g., do not receive the mobile device beacon at or above the received signal strength discovery threshold). The lighting control devices may automatically exit the configuration mode and/or stop providing feedback when the lighting control devices fail to receive a mobile device beacon from the mobile device within a timeout period (e.g., indicating that the mobile device may be out of the discovery range). The lighting control devices may also, or alternatively, exit the configuration mode and/or stop providing feedback when the lighting control device receives a message from the mobile device and determines from the received signal strength indicator of the mobile device beacon is less than the received signal strength discovery threshold, and/or an indication in a message that the lighting device is outside of the discovery range (e.g., while the lighting control device is within the wireless range of communications from the mobile device). Though the method 750 may be described with reference to lighting control devices, other types of control devices may be similarly implemented.

Figure 7C:
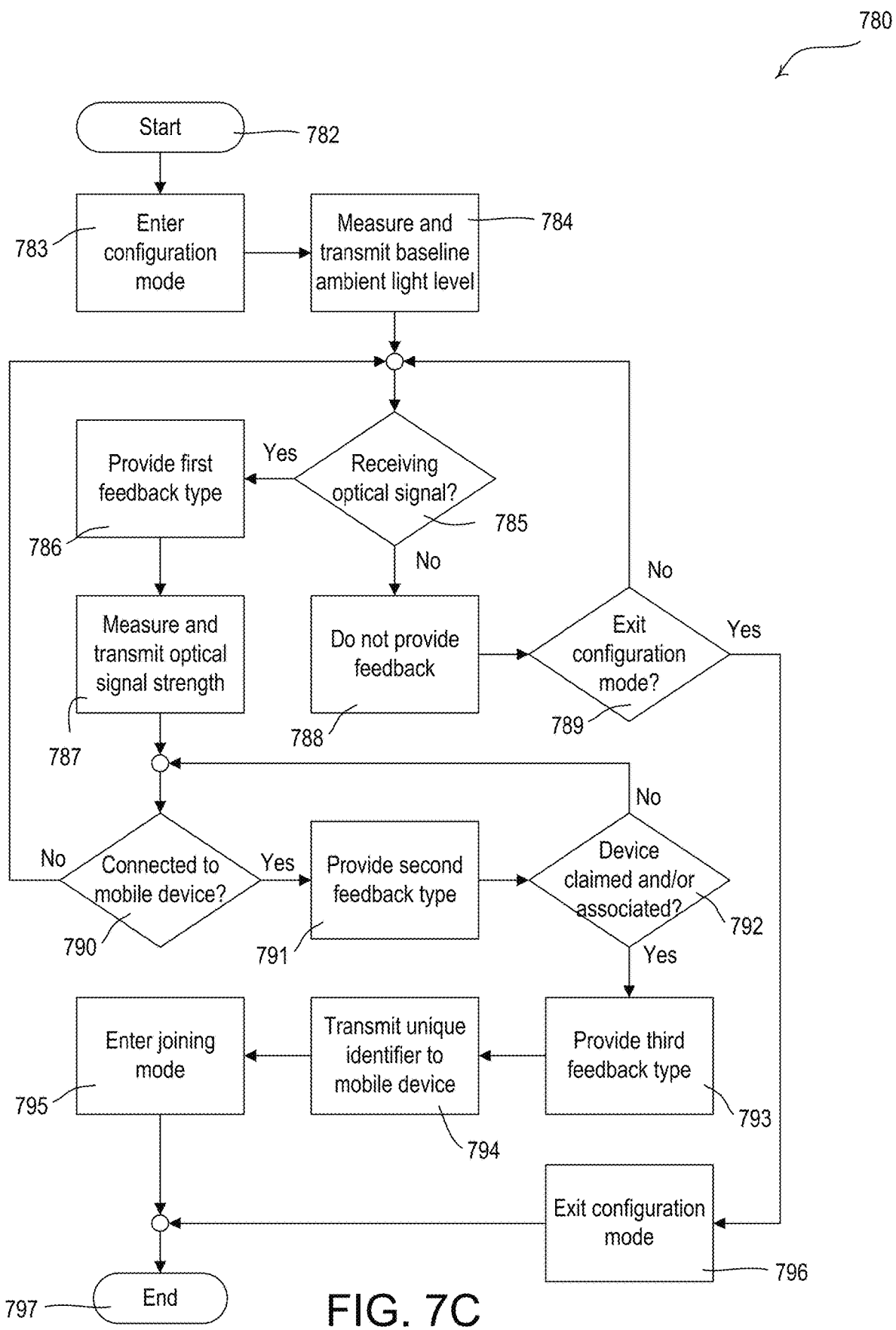
FIG. 7C is yet another flowchart depicting an example method for discovering control devices and providing feedback for enabling configuration and/or control using beacons.

As shown in FIG. 7B, a mobile device may select a control device (e.g., a lighting control device) to be configured and/or controlled based on the signal strengths of control device beacons transmitted by the control device and received by the mobile device. For example, the control device may transmit the control device beacon via RF communication signals (e.g., BLE signals). FIG. 7C shows an example that is similar to the example shown in FIG. 7B. As shown in FIG. 7C, a mobile device may select a control device to be configured and/or controlled based on the signal strength of a one or more optical signal transmitted by the mobile device and received by the control device. For example, the optical signal may be light at a given wavelength. Using an optical signal may provide an alternative wireless medium on which to transmit a signal, where the signal strength of the signal is used to select the control device to be configured and/or controlled. In addition, using a directional (e.g., focused) light beam may aid in determining which control device of a plurality of control devices has been selected for configuration. An optical signal may be used regardless of whether the control device has connected to a wireless network, while a beacon may not be received by the control device if it is not connected to the wireless network (e.g., is connected to a wired network or wired communication link).

FIG. 7C is a flowchart illustrating an example method 780 for configuring control devices of a load control system (e.g., the load control system 100 and/or the load control system 200 shown in FIG. 2A) for claiming and/or associating the control devices. The method 780 may be executed as part of a configuration procedure (e.g., a claiming procedure and/or an association procedure). The method 780 may be implemented by a control device (e.g., a lighting control device). However, other control devices may similarly perform one or more portions of the method 780. During the method 780, the lighting control device may provide different types of feedback. The method 780 may be executed when the lighting control device is not already in a configuration mode (e.g., the lighting control device did not enter a configuration mode and start periodically transmitting control device beacons at power up).

As shown in FIG. 7C, the method 780 may begin at 782, for example, when the lighting control device receives a configuration mode message from a network device, such as a mobile device (e.g., the mobile device 150, 250, 350). The lighting control device may receive the configuration mode message via a system controller or another device (e.g., the load controller 121 shown in FIG. 1). The configuration mode message may be transmitted in response to a configuration mode (e.g., a claiming mode and/or an association mode) being entered at the mobile device (e.g., in response to a selection of a button on an application at the mobile device). The configuration mode message may indicate that the lighting control device should enter a configuration mode. The configuration mode message may include a unique identifier that identifies the mobile device (e.g., or an application executed on the mobile device) and/or a non-unique identifier, such as an identifier of a group, area, building, load control system, and/or manufacturer of the mobile device and/or the control devices of the load control system. The unique identifier may be an identifier of an application running on the mobile device. The configuration mode message may be transmitted via RF communication signals (e.g., a BLUETOOTH® low energy (BLE) signal). For example, the configuration mode message may be transmitted using the near field communication (NFC) protocol, Thread® protocol, WI-FI communication protocol, and/or other RF communication protocols. The configuration mode message may be transmitted via a wired link, and/or via an optical signal. At 783, the lighting control device may enter the configuration mode (e.g., in response to receiving the configuration mode message).

At 784, the lighting control device may measure and transmit a baseline ambient light level. The lighting control device may measure the baseline light level using an internal detector of a lighting load controlled by the lighting control device and/or a sensor of the lighting fixture, which may be integrated into or connected to the lighting control device. The lighting control device may record the baseline light level at one or more wavelengths (e.g., which may be between 400 nm and 700 nm). The lighting control device may measure an absolute value for the baseline light level. For example, the lighting control device may measure the baseline light level in units of lux. Alternatively, the lighting control device may measure a relative value for the baseline light level. For example, the lighting control device may compare the ambient light level to one or more thresholds and determine the baseline light level. For example, the lighting control device may record the baseline light level as 1 if the lighting control device measures an ambient light level between 100 and 200 lux, 2 if the lighting control device measures an ambient light level between 200 and 300 lux, or 3 if the lighting control device measures an ambient light level between 300 and 400 lux. The lighting control device may transmit the baseline light level to the mobile device, for example directly or via the load controller and/or the system controller.

At 785, the lighting control device may determine whether the lighting control device is receiving an optical signal (e.g., whether the lighting control device has been selected for claiming and/or association). The optical signal may be received at a given wavelength. The wavelength of the optical signal may be selected to be a wavelength to which the internal detector and/or the sensor is most responsive. The lighting control device may (e.g., periodically) measure the ambient light level and may compare the ambient light level to a threshold value. If the ambient light level is higher than the threshold value, the lighting control device may determine that it is receiving the optical signal.

If the lighting control device does not determine that it is receiving the optical signal, the lighting control device may not provide feedback at 788. For example, the lighting control device may remain unlit and/or may not transmit a message to the mobile device in response to the optical signal. At 789, the lighting control device may determine whether it should exit configuration mode. If the lighting control device determines that it should not exit the configuration mode, the method 780 may loop and the lighting control device may determine whether it is receiving the optical signal at 785. If the lighting control device determined that it should exit the configuration mode, the lighting control device may exit the configuration mode at 796 and the method 780 may end at 797.

If the lighting control device determines at 785 that it is receiving the optical signal, the lighting control device may provide a first feedback type, at 786, that indicates the lighting control device has received the optical signal. The first feedback type may be provided by flashing a lighting load on and off, increasing and/or decreasing the intensity level of the lighting load, increasing and/or decreasing the color temperature of the lighting load, illuminating the lighting load a predefined color (e.g., orange), illuminating the lighting load a predefined color temperature, and/or providing other visual feedback to the user. The lighting control device may stop providing the first feedback type when the lighting control device stops receiving the optical signal (e.g., after a timeout period from when the lighting control device stops receiving the optical signal). The lighting control device may resume providing the first feedback type if the lighting control device receives the optical signal again (e.g., after a timeout period from when the lighting control device receives the optical signal).

At 787, the signal strength of the optical signal may be measured and transmitted. For example, the signal strength may be measured in units of lux. The signal strength of the optical signal may be measured by an internal detector of a lighting load controlled by the lighting control device and/or a sensor integrated into or connected to the lighting control device. The lighting control device may transmit a discovery response message including the optical signal strength to the mobile device (e.g., directly or via the load controller and/or the system controller). The discovery response message may be transmitted using RF communication signals (e.g., a BLUETOOTH® low energy (BLE) signal). The optical signal strength may be measured and/or transmitted periodically.

A determination may be made, at 790, as to whether the lighting control device is connected to the mobile device or not. For example, the mobile device may determine if the optical signal received by the lighting control device has the highest normalized optical signal strength among the lighting control devices that are in the configuration mode (e.g., those lighting control devices that have not yet been claimed). For example, the lighting control device may receive a selection message from the mobile device that indicates that the optical signal strength measured by the lighting control device is highest among the control devices in the configuration mode. For example, the selection message may be a connection message initiating the establishment of a connection (e.g., a two-way RF communication connection) between the mobile device and the lighting control device.

When the lighting control device is connected to the mobile device at 790, the lighting control device may provide a second feedback type at 791. The second feedback type may differentiate the lighting control device from the other lighting control devices providing the first feedback type. For example, the second feedback type may be provided by flashing a lighting load on and off, increasing and/or decreasing the intensity level of the lighting load, increasing and/or decreasing the color temperature of the lighting load, illuminating the lighting load at a predefined color (e.g., blue), illuminating the lighting load at a predefined color temperature, and/or providing other visual feedback to the user that is different from the first feedback type.

In an example, the lighting control devices that are receiving the optical signal may illuminate each corresponding lighting load the color orange to indicate the lighting control devices are receiving the optical signal, and the lighting control device having the highest normalized optical signal strength may illuminate a corresponding lighting load the color blue. The blue lighting load may indicate to the user the lighting control device that is selected for claiming and/or association. The blue lighting load may indicate to the user the lighting control device of the discovered lighting control devices at which the optical transmitter is pointed. The orange lighting loads may indicate to the user those lighting loads that are receiving the optical signal. In addition, the orange lighting loads may indicate to the user those lighting control devices and/or lighting loads that are operating properly.

A lighting control device (e.g., a single lighting control device) of the lighting control devices may provide the second feedback type at a given time. As the user points the optical transmitter at different lighting fixtures, the lighting control device receiving the optical signal with the highest normalized optical signal strength may change. The mobile device may communicate one or more messages configured to cause the lighting load providing the second feedback type to change. The mobile device may cause a different lighting load to provide the second feedback type by transmitting a message (e.g., a connection message) that has the identifier of the updated lighting control device that is receiving the optical signal at the highest signal strength. The mobile device may break the two-way communication connection with the lighting control device that is currently providing the second feedback type, and that lighting control device may stop providing the second feedback type. The lighting control device may revert back to providing the first feedback type (e.g., if the lighting control device fails to receive the optical signal at the highest signal strength) or stop providing feedback altogether (e.g., if the lighting control device fails to receive the optical signal within a predefined period of time). Accordingly, if the lighting control device determines that the optical signal was not received at the highest signal strength at 790 and is still receiving the optical signal at 785, the lighting control device may provide the first feedback type again at 786.

After providing the second feedback type at 791, a determination may be made, at 792, as to whether the lighting control device has been claimed and/or assigned to a configuration identifier of the configuration data. For example, the lighting control device may receive a message (e.g., a claiming message) that indicates the lighting control device has been claimed. In addition, the message may indicate that the lighting control device has been assigned to a configuration identifier. The configuration identifier may be a fixture, group, zone, area, and/or location that may be defined by the configuration data (e.g., lighting control configuration information) generated by the design software. The configuration identifier may represent a fixture, group, and/or zone at a physical location within a building and may be indicated on a floorplan. The message may be transmitted by the mobile device. The message may include the configuration identifier of the fixture, group, and/or zone, such that the lighting control message may be responsive to messages configured to control devices in the fixture, group, and/or zone.

If the lighting control device has not been claimed and/or assigned to a configuration identifier at 792, the lighting control device may continue to provide the second feedback type at 791 if the optical signal is still received at the lighting control device with the highest signal strength. However, if the lighting control device determines that the optical signal is no longer received at the lighting control device with the highest signal strength, the lighting control device may then provide the first feedback type again at 786.

When the lighting control device has been claimed and/or assigned to a configuration identifier at 792, the lighting control device may provide a third feedback type at 793. The third feedback type may differentiate the lighting control device from the other control devices in the configuration mode providing the first feedback type and/or the second feedback type. For example, the third feedback type may be provided by flashing a lighting load on and off, increasing and/or decreasing the intensity level of the lighting load, increasing and/or decreasing the color temperature of the lighting load, illuminating the lighting load at a predefined color (e.g., green), illuminating the lighting load at a predefined color temperature, and/or providing other visual feedback to the user that is different from the first feedback type and/or second feedback type.

In an example, the lighting control devices that are not claimed and are not receiving the optical signal at the highest signal strength may illuminate each corresponding lighting load the color orange to indicate the lighting control devices that are receiving the optical signal. The lighting control device that is receiving the optical signal at the highest signal strength (e.g., and is unclaimed) may illuminate a corresponding lighting load the color blue, and the lighting control devices that have been claimed may illuminate a corresponding lighting load the color green. The green lighting load may indicate to the user the lighting control devices that have already been claimed and/or assigned to a configuration identifier. Lighting control devices claimed and assigned to different fixtures, groups, and/or zones may provide different types of feedback (e.g., illuminate lighting loads different colors, flash differently, illuminate lighting loads different color temperatures or dimming levels, etc.).

The third feedback type may also, or alternatively, be provided in response to other configuration information for configuring (e.g., claiming, diagnostics, association, etc.) and/or controlling the lighting control device. For example, the third feedback type may be provided after the lighting control device is configured with scenes, dimming levels, and/or other lighting control information to complete configuration (e.g., claiming, diagnostics, association, etc.) and/or control of the lighting control device. After providing the third feedback type at 793, the lighting control device may transmit a message (e.g., a claim confirmation message) that includes a unique identifier (e.g., a serial number) of the lighting control device at 794. The lighting control device may then enter a joining mode at 795. In the joining mode, the lighting control device may stop transmitting (e.g., periodically transmitting) the optical signal strength (e.g., using BLE technology), and may periodically switch between transmitting the discovery response message (e.g., using BLE technology) and listening for a request to join a wireless communication network (e.g., as performed at 412 of the method 400). The method 780 may end at 797.

The first feedback type, second feedback type, and/or third feedback type may be provided by a lighting control device while the lighting control device is in the configuration mode (e.g., receives the optical signal). When the mobile device moves away from the lighting control device, such that the lighting control device is not receiving the optical signal, the lighting control device may stop providing feedback.

If a lighting control device is removed from a prior assignment or the claimed status of the lighting control device is removed, the lighting control device may stop providing the third feedback type. The lighting control device may revert back to the first feedback type and/or the second feedback type when the lighting control device is receiving the optical signal. The lighting control devices may stop providing feedback when the lighting control stops receiving the optical signal. The lighting control devices may stop providing feedback when the lighting control devices fail to receive the optical signal within a timeout period (e.g., indicating that the mobile device may be out of the discovery range). The lighting control devices may exit the configuration mode when the lighting control device receives a message from the mobile device to exit the configuration mode. Though the method 780 may be described with reference to lighting control devices, other types of control devices may be similarly implemented.

Figure 8:
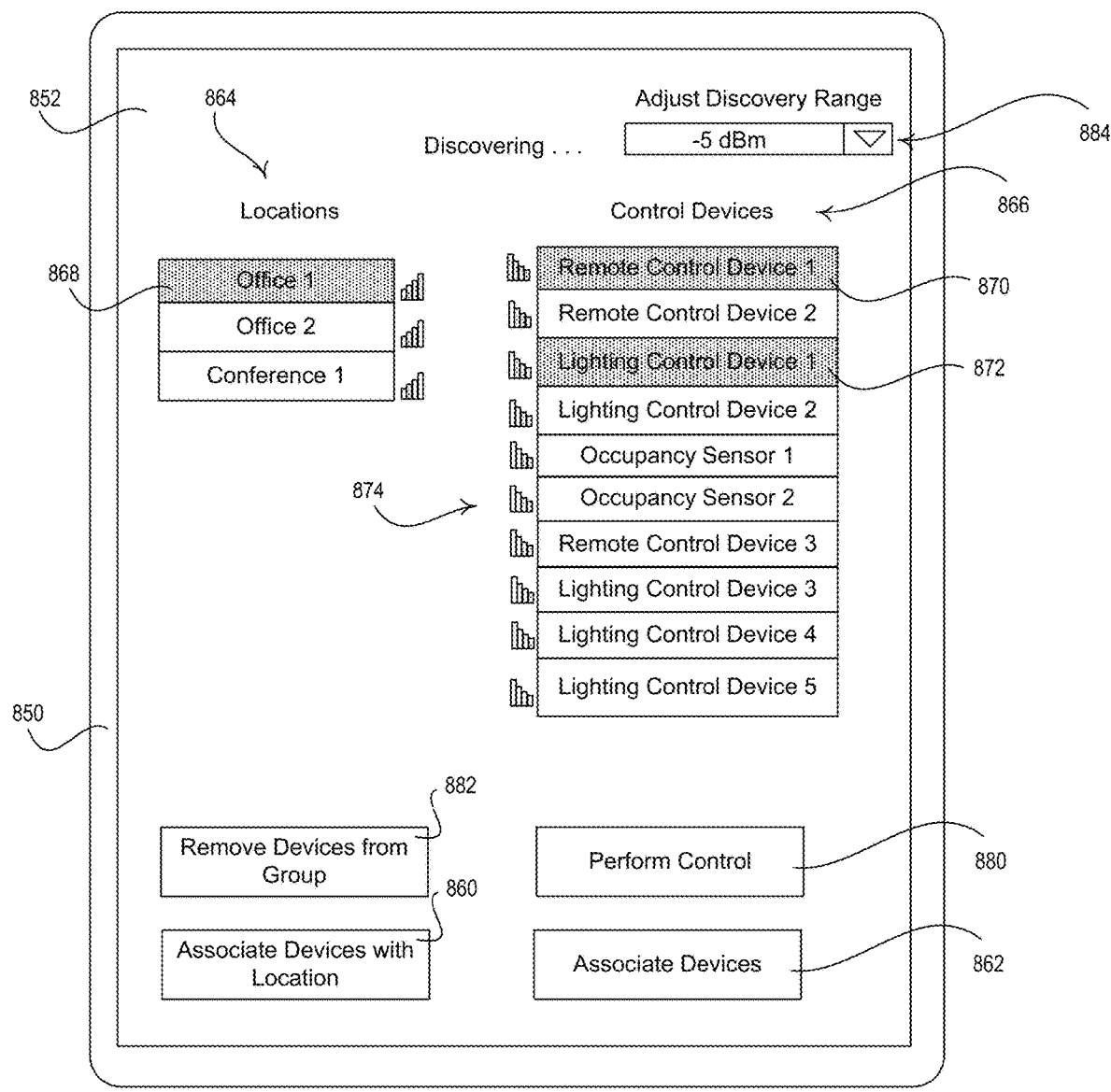
FIG. 8 shows an example interface that may be displayed on a network device for configuring and/or controlling one or more control devices.

FIG. 8 shows an example interface 822 that may be displayed on a mobile device, such as a mobile device 850 (e.g., the mobile device 150, 250, 350) for configuring and/or controlling temporary groups of control devices (e.g., control devices selected for configuration and/or control). The mobile device may be, for example, a configuration device. As shown in FIG. 8, a user interface 852 may include a group (e.g., a temporary group) of control devices 866 that may be discovered and/or selected for configuration and/or control at the mobile device 850. The temporary group of control devices 866 may be displayed in order of being selected for configuration and/or control or relative-location based on the signal strength of control device beacons transmitted by the control devices. The signal strength indicator 874 may represent a value of the signal strength, which may be indicated as an icon and/or score that indicates the received signal strength of the corresponding control device in the temporary group of control devices 866.

The user may select one or more control devices for being deselected from the temporary group of control devices 866. For example, the user may select the control devices 870 ("Remote Control Device 1") and control device 872 ("Lighting Control Device 1") for being deselected for configuration and/or control (e.g., from the temporary group of control devices 866). The user may select the button 882 to deselect one or more of the selected control devices 870, 872 from the temporary group of control devices 866.

The interface 852 may include a group of configuration identifiers, such as locations 864, that may be retrieved from configuration data stored on the mobile device 850 and/or discovered at the mobile device 850. The group of locations 864 may be displayed in an order. For example, the group of locations 864 may be displayed in an order of relative locations based on the signal strength of the location beacon received for a location. The signal strength of one or more of the location beacons for the locations in the group of locations 864 may be indicated with signal strength indicator 874.

A user may select a location in the list of locations 864 for being associated with the temporary group of control devices 866. As shown in FIG. 8, the location 868 may be selected for being associated with the temporary group of control devices 866. The user may select the button 860 to associate the temporary group of control devices 866 (e.g., the selected control devices 870, 872) with the selected location (e.g., the selected location 868).

A discovery threshold for discovering control device beacons and/or location beacons may be adjusted using the discovery threshold indicator 884. The discovery threshold indicator 884 may be a dropdown menu, a textual input, or another form of user input at the interface 852. The temporary group of discovered control devices 866 and/or locations may change based on the change in the discovery threshold.

The temporary group of control devices may be associated with one another upon the user selecting the button 862. The temporary group of control devices may be associated with a temporary group identifier that may be sent to the control devices, or the control-target devices may receive the unique identifiers of other control devices (e.g., control-target and/or control-source devices) in the temporary group for enabling collective control of the control-target devices. The association may be stored at the mobile device 850 and/or the system controller.

A user may select the button 880 to perform control of one or more control devices in the temporary group of control devices 866. For example, the selection of the lighting control device 872 ("Lighting Control Device 1") and the button 880 may present the user with buttons or a virtual dimmer that may allow the user to control the lighting level of the lighting load.

Figure 9:
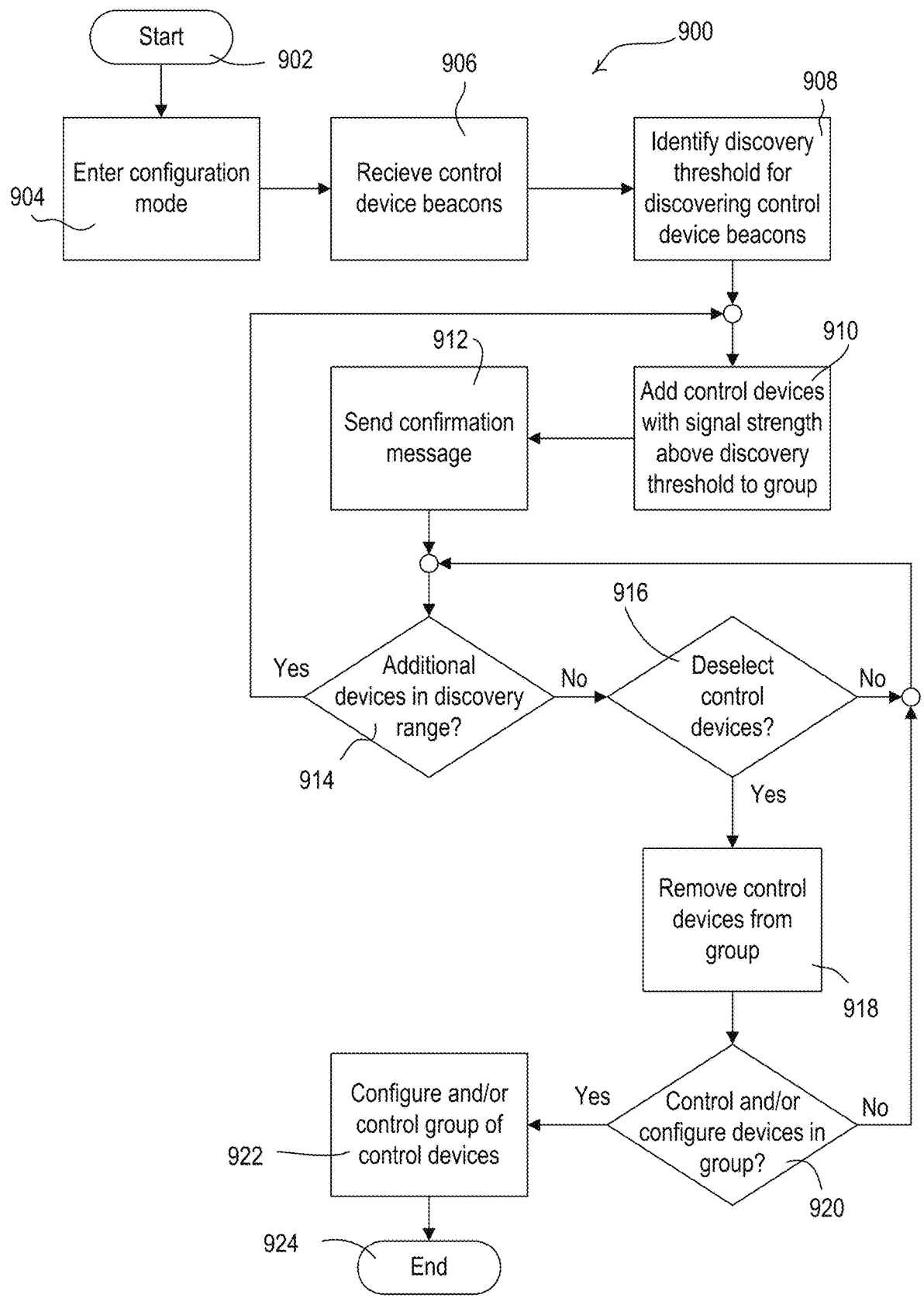
FIG. 9 is a flowchart depicting an example method for discovering control devices for enabling configuration and/or control using beacons.

FIG. 9 is a flowchart depicting an example method 900 for discovering control devices for enabling configuration and/or control using beacons. The method 900 may be implemented by one or more devices. The method 900 may be executed as part of a configuration procedure (e.g., a claiming procedure and/or an association procedure). The method 900 may be implemented by one or more devices. For example, the method 900 may be executed by a mobile device (e.g., the mobile device 150, 250, 350).

As shown in FIG. 9, the method 900 may begin at 902. At 904, a configuration mode (e.g., a claiming mode and/or an association mode) may be entered. The configuration mode may be entered by a mobile device (e.g., the mobile device 150, 250, 350, 850), a system controller (e.g., the system controller 140, 240, 340), and/or one or more control devices (e.g., the lighting control devices of the lighting fixtures 110, 120a-120c, 130, 210a-210d, 220a-220d). The configuration mode may be entered in response to an actuation of a button on one or more of the devices and/or receipt of a message (e.g., from the mobile device and/or the system controller) that causes beacon transmission.

At 906, control device beacons may be received. The control device beacons may include unique identifiers that correspond to different control devices. The control device beacons may include unique identifiers of the control device types from which the control device beacons may be transmitted. The control device beacons may be transmitted by control devices, such as lighting control devices (e.g., the lighting control device 114 of the lighting fixture 110, the lighting control devices 124a-124c, of the lighting fixtures 120a-120c, the controllable light source 122, the lighting control devices of the lighting fixtures 210a-210d, 220a-220d, and/or the lighting control devices 310) at or near a corresponding control device. The control device beacons may be transmitted via RF communication signals (e.g., BLUETOOTH® low energy (BLE) signal), for example.

At 908, a discovery threshold at which the control device beacons are discovered may be identified. The signal strength of the control device beacons may be identified by the strength at which the RF communication signals of the beacon are received (e.g., the received signal strength indicator of the control device beacon). The signal strength may be lower for beacons that are transmitted from further away and/or receive some interference between the transmission of the beacon and the receipt of the beacon. The discovery threshold may establish a discovery range of the mobile device. For example, the discovery threshold may be identified by adjusting the discovery threshold indicator 884 displayed on the user interface 852 of the mobile device 850.

The unique identifier in the beacons that are discovered at a signal strength above the discovery threshold may be automatically selected for being configured and/or controlled (e.g., claimed and/or associated with configuration identifiers) at 910. At 912, a confirmation message may be sent to each control device that has been selected for configuration and/or control. The control device may provide feedback to a user that the control device has been selected for configuration and/or control. For example, a lighting control device may cause the state of a lighting load to change, such as by flashing the lighting load on and off, increasing and/or decreasing the intensity level of the lighting load, increasing and/or decreasing the color temperature of the lighting load, and/or providing other visual feedback to the user. Audio feedback may be provided. The confirmation message may include a temporary group identifier and/or a feedback type for being communicated to the user.

At 914, a determination may be made as to whether additional control devices are discovered from the beacons of the control devices being above the discovery threshold (e.g., if there are additional control device within the discovery range of the mobile device). The additional control devices may be discovered by the mobile device moving around the load control environment, or the discovery threshold being adjusted, to discover control device beacons within the discovery range. If additional control devices are discovered from the beacons, the unique identifier in the beacons may be automatically selected for being configured and/or controlled in the load control environment at 910.

At 916, a determination may be made as to whether an indication has been received to deselect control devices for configuration and/or control. Control devices that are automatically selected for configuration and/or control may be deselected by receiving an indication of a user selection to deselect the device. For example, a temporary group of discovered devices that are configurable and/or controllable and/or devices selected for configuration and/or control may be displayed on the mobile device and the user may select the control devices for being deselected for configuration and/or control. The user may select a control device and cause the mobile device to send a message (e.g., directly or via the system controller) to the selected control device to cause the selected control device to visually identify itself (e.g., by flashing, dimming, or changing color temperature in a manner different from the feedback provided indicating that the control device is selected for configuration and/or control). The control devices that are automatically selected for configuration and/or control may be deselected when the discovery threshold is adjusted, and the received signal strength identifier of the beacon received from the control device is below the discovery threshold. If an indication is not received to remove devices from the group at 916, the method 900 may return to 914 to determine whether to select control devices for configuration and/or control. If an indication is received to deselect control devices at 916, the indicated control devices may be deselected at 918.

At 920, a determination may be made as to whether an indication is received to configure and/or control the control devices that have been selected for configuration and/or control (e.g., for being claimed and/or associated with a configuration identifier of configuration data of the load control system). For example, in response to the feedback provided by the control devices and/or the devices indicated on the display of the mobile device as being selected for configuration and/or control, the user may perform one or more selections on the mobile device to configure and/or control the devices selected for configuration and/or control. At 922, the control devices selected for configuration and/or control may be configured and/or controlled in response to the user selections. For example, the control devices selected for configuration and/or control may be associated in storage with a location identifier and/or the unique identifier of the other control devices selected for configuration and/or control. The location identifier may include a temporary group identifier identifying a location of a temporary group of control devices selected for configuration and/or control, an area identifier identifying a defined area in the load control environment, a floorplan identifier identifying a location of a space or a device in a predefined floorplan, a zone identifier identifying a location of a lighting zone or other load control zone in a load control environment or floorplan, and/or a fixture identifier identifying the location of a fixture in a load control environment or floorplan. Control-source devices selected for configuration and/or control may be associated with control-target devices selected for configuration and/or control, such that control-target devices may perform control of an electrical load in response to messages from the control-source devices. The control-target devices selected for configuration and/or control may be collectively controlled. Additional configuration may be performed to select or deselect control devices for configuration and/or control. The method 900 may end at 924.

The method 900 may be implemented at a mobile device (e.g., such as the mobile device 150, 250, 350) and/or a system controller (e.g., such as the system controller 140, 240, 340). Portions of the method 900 may be implemented at the mobile device and at the system controller. For example, the mobile device may receive the location beacon and the control device beacons and may identify the unique identifiers being communicated in the beacons. The mobile device may communicate the identifiers to the system controller for performing configuration and/or control. The mobile device may identify the signal strength of the control device beacons. The mobile device may communicate the signal strength to the system controller and the system controller may generate the temporary group of control devices for being displayed at the mobile device (e.g., via an application executing at the mobile device). The stored associations at the mobile device may be sent to the system controller for storage thereon for being communicated to other control devices and/or coordinating delivery of messages to associated devices for performing load control.

Figure 10:
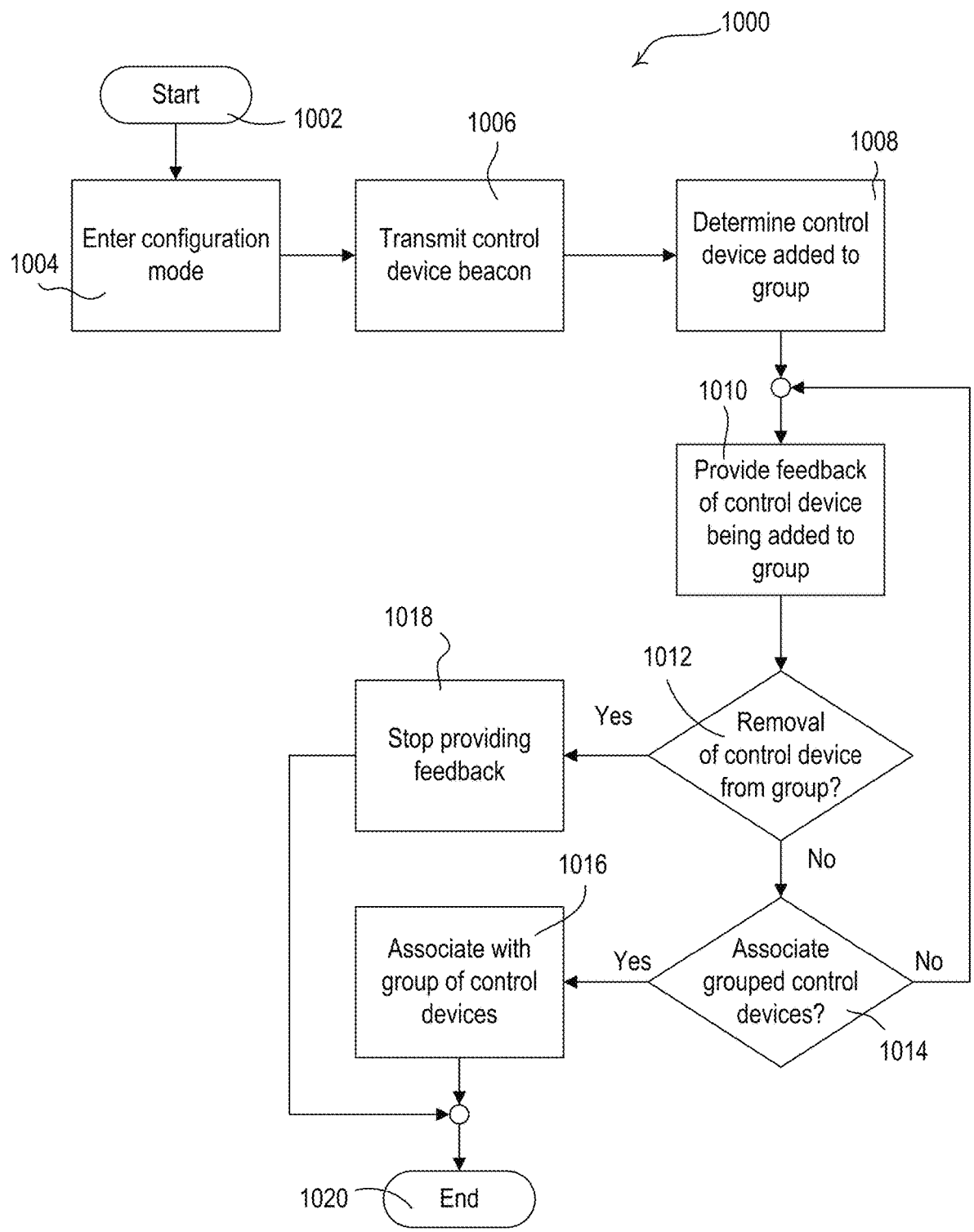
FIG. 10 is a flowchart depicting another example method for discovering control devices for enabling configuration and/or control using beacons.

FIG. 10 is a flowchart depicting another example method 1000 for discovering control devices for enabling configuration and/or control using beacons. The method 1000 may be implemented by a control device, such as a lighting control device (e.g., the lighting control device 114 of the lighting fixture 110, the lighting control devices 124a-124c of the lighting fixtures 120a-120c, the controllable light source 122, the lighting control devices of the lighting fixtures 210a-210d, 220a-220d, and/or the lighting control devices 310). However, other control devices may similarly perform one or more portions of the method 1000.

As shown in FIG. 10, the method 1000 may begin at 1002. At 1004, the lighting control device may enter a configuration mode (e.g., a claiming mode and/or an association mode). For example, the configuration mode may be triggered by actuation of a button on the lighting control device or in response to a message received by the lighting control device. A beacon may be transmitted from the lighting control device at 1006. The beacon may include a unique identifier of the lighting control device and/or a device type. The beacon may be transmitted via RF communication signals (e.g., BLUETOOTH® low energy (BLE) signal). The beacon may be communicated periodically during the configuration mode or in response to a triggering event. The triggering event may be a message, actuation of a button, or an occupancy condition detected from an occupancy sensor.

At 1008, the lighting control device may determine that the device has been selected being configured and/or controlled. The determination may be made in response to a confirmation message from a mobile device (e.g., the mobile device 150, 250, 350) and/or a system controller. The confirmation message may include a temporary group identifier and/or a type of feedback to indicate that the lighting control device has been selected for configuration and/or control.

At 1010, feedback may be provided that indicates the lighting control device has been selected for configuration and/or control. The feedback may be provided by flashing a lighting load on and off, increasing and/or decreasing the intensity level of the lighting load, increasing and/or decreasing the color temperature of the lighting load, illuminating the lighting load at a predefined color, illuminating the lighting load at a predefined color temperature, and/or providing other visual feedback to the user.

A determination may be made, at 1012, as to whether the lighting control device has been deselected for configuration and/or control. For example, a message may be received by the lighting control device that indicates the lighting control device has been deselected. In response to detecting that the lighting control device has been deselected, the lighting control device may stop providing feedback to the user at

1018. For example, the lighting control device may stop flashing the lighting load on and off, increasing and/or decreasing the intensity level of the lighting load, increasing and/or decreasing the color temperature of the lighting load, and/or providing other visual feedback to the user. The method 1000 may end at 1020.

If the lighting control device does not detect that a control device has been deselected for configuration and/or control at 1012, a determination may be made at 1014 as to whether an indication to associate the control devices selected for configuration and/or control has been received. The indication may be a message that is received from the mobile device or the system controller. For example, the user may select a button on the mobile device to associate a temporary group of discovered control devices for being collectively controlled. The message may include a temporary group identifier for the temporary group of control devices and/or the unique identifier of other control devices in the temporary group for being stored at the lighting control device. The temporary group identifier may be a location identifier or zone identifier for controlling devices selected for configuration and/or control in the same location or zone. The lighting control device may be configured to respond to messages from associated devices and/or the temporary group identifier for enabling control of the lighting load in response to the messages. The method 1000 may end at 1020.

Figure 11:
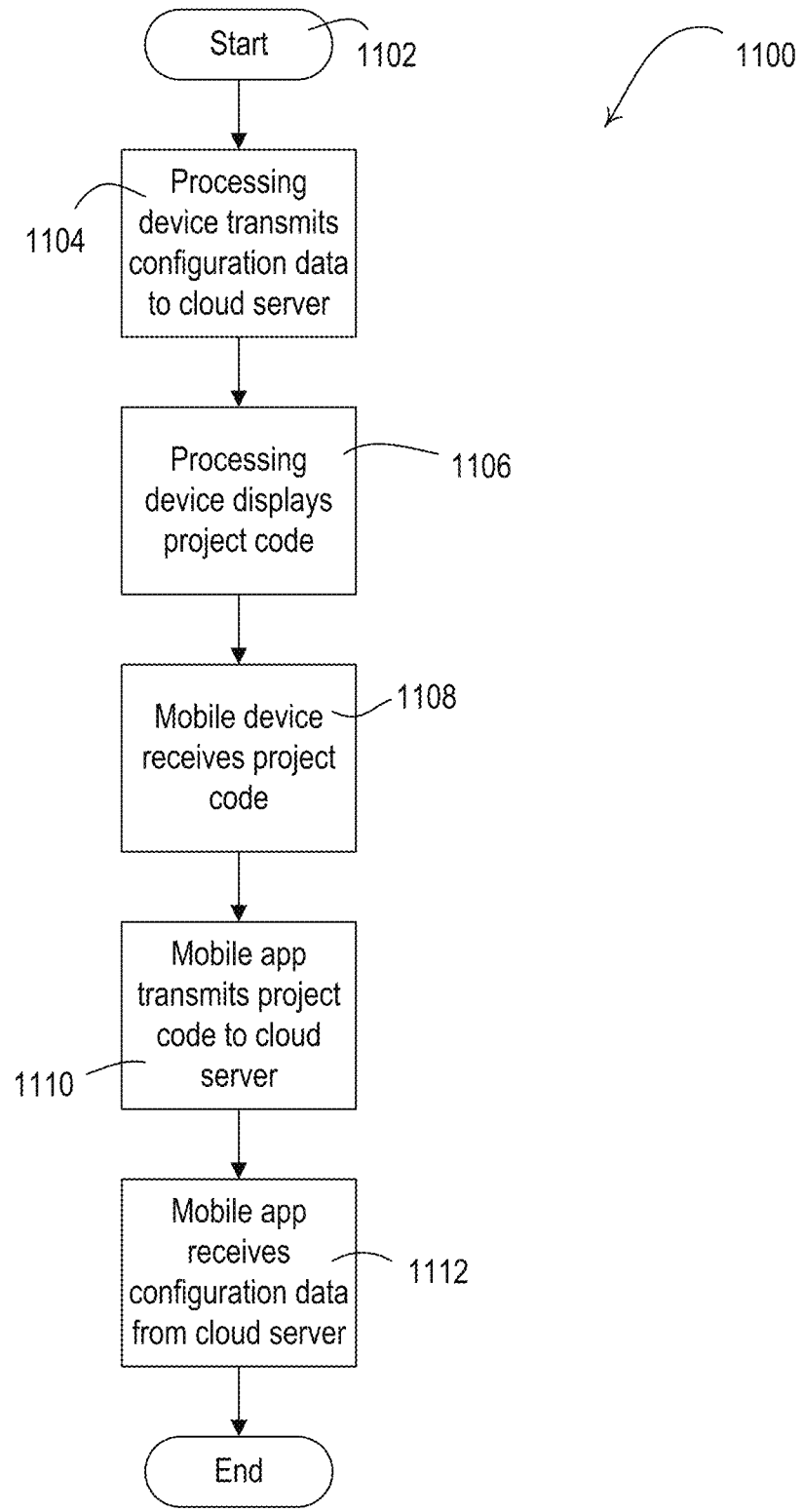
FIG. 11 is a flowchart depicting an example method for transferring configuration data of a load control system.

FIG. 11 is a flowchart depicting an example method 1100 for transferring configuration data of a load control system (e.g., the load control system 100 and/or the load control system 200). For example, the method 1100 may be a configuration data transfer procedure that may be executed as part of a commissioning procedure (e.g., as part of the method 400 shown in FIG. 4A). The method 1100 may be implemented by one or more devices. For example, the method 1100 may be implemented by a system controller (e.g., the system controller 140, 240, 340), a cloud server (e.g., the cloud server 170, 370), and/or a network device, such as a mobile device (e.g., the mobile device 150, 250, 350) and/or a processing device (e.g., such as the processing device 160, 360). The method 1100 may be implemented to transfer the configuration data (e.g., all or portions of a configuration database) from the processing device to the mobile device via the cloud server (e.g., as performed at 406 of the method 400). The method 1100 may begin at 1102, for example, when the configuration data is ready to be transferred (e.g., when the control devices of the control system are ready to be claimed and/or associated with configuration identifiers of the configuration data).

At 1104, the processing device may transmit the configuration data to the cloud server via the Internet (e.g., via the communication link 372 using IP and/or HTTP communications). At 1106, the processing device may display a project code (e.g., a code unique to the project of the load control system being commissioned). For example, the project code may comprise an alphanumeric sequence and/or a machine-readable code, such as a barcode and/or a quick response (QR) code. At 1108, the mobile device may receive the project code. For example, when the project code is an alphanumeric sequence, a user may enter the project code into a configuration application running on the mobile device at 1108. In addition, when the project code is a machine-readable code, the mobile device may scan the machine-readable code to determine the project code at 1108. At 1110, the mobile device may transmit the project code to the cloud server, which may transmit the configuration data to the mobile device. At 1112, the mobile device may receive configuration data from the cloud server, and the method 1100 may end.

Figure 12:
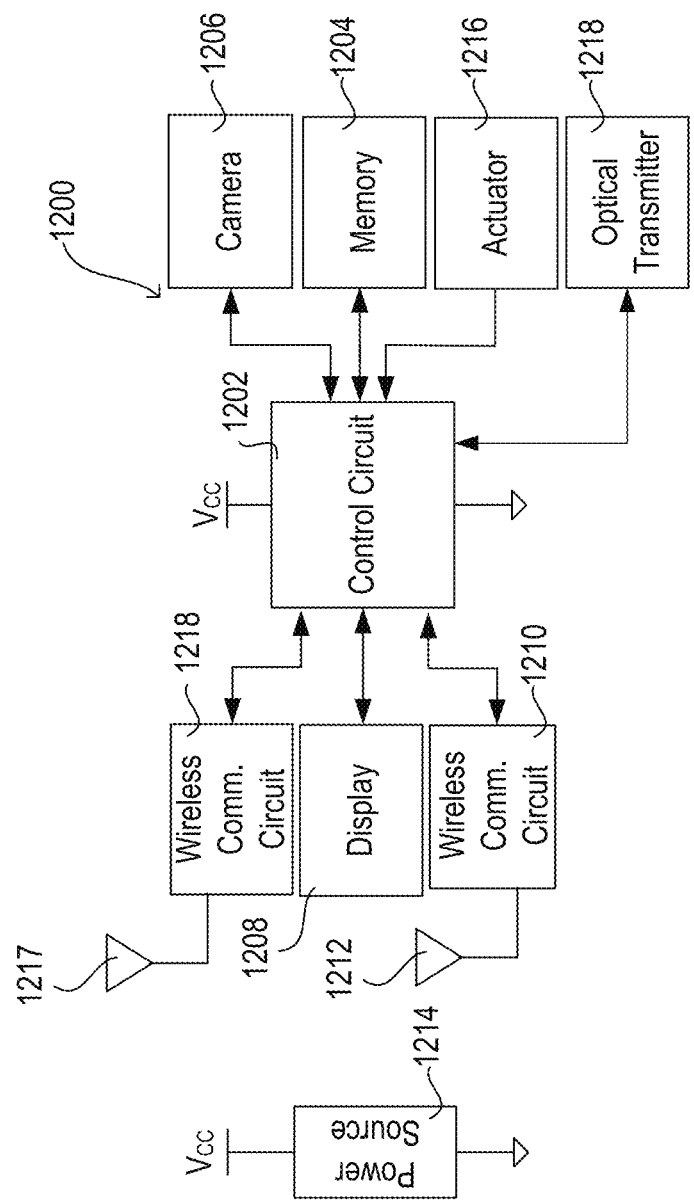
FIG. 12 is a block diagram illustrating an example network device as described herein.

FIG. 12 is a block diagram illustrating an example network device 1200 (e.g., a mobile device and/or a processing device) as described herein. The network device 1200 may include a control circuit 1202 for controlling the functionality of the network device 1200. The control circuit 1202 may include one or more general purpose processors, special purpose processors, conventional processors, digital signal processors (DSPs), microprocessors, integrated circuits, a programmable logic device (PLD), application specific integrated circuits (ASICs), and/or the like. The control circuit 1202 may perform signal coding, data processing, power control, image processing, input/output processing, and/or any other functionality that enables the network device 1200 to perform as described herein.

The control circuit 1202 may store information in and/or retrieve information from the memory 1204. The memory 1204 may include a non-removable memory and/or a removable memory. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory.

The network device 1200 may include a camera 1206 that may be in communication with the control circuit 1202. The camera may include a digital camera or other optical device capable of generating images or videos (e.g., image sequences) for being captured at the network device 1200 using visible light. The camera may include a light capable of flashing, modulating, or turning on/off in response to signals received from the control circuit.

The network device 1200 may include a wireless communication circuit 1210 for wirelessly transmitting and/or receiving information. For example, the wireless communications circuit 1210 may include an RF transceiver for transmitting and receiving RF communication signals via an antenna 1212, or other communications module capable of performing wireless communications. Wireless communications circuit 1210 may be in communication with the control circuit 1202 for communicating information to and/or from the control circuit 1202. For example, the wireless communication circuit 1210 may send information from the control circuit 1202 via network communication signals. The wireless communication circuit 1210 may send information to the control circuit 1202 that are received via network communication signals.

The network device 1200 may include a wireless communication circuit 1218 for wirelessly transmitting and/or receiving information. For example, the wireless communications circuit 1218 may include an RF transceiver for transmitting and receiving RF communication signals via an antenna 1217, or other communications module capable of performing wireless communications. Wireless communications circuit 1218 may be in communication with the control circuit 1202 for communicating information to and/or from the control circuit 1202. For example, the wireless communication circuit 1218 may send information from the control circuit 1202 via network communication signals. The wireless communication circuit 1218 may send information to the control circuit 1202 that are received via network communication signals. The wireless communication circuit 1218 may communicate via the same or a different network and/or protocol as the wireless communication circuit 1210.

For example, the wireless communication circuit 1218 may communicate via a short-range RF protocol (e.g., NFC, BLE, or another short-range RF protocol) and the wireless communication circuit 1210 may communicate via another RF network or protocol (e.g., a proprietary protocol, WIFI, cellular, etc.).

The control circuit 1202 may also be in communication with a display 1208. The display 1208 may provide information to a user in the form of a graphical and/or textual display. The control circuit 1202 may signal the display 1208, or portions thereof, to modulate and/or turn the display on and/or off to communicate information from the display 1208. The communication between the display 1208 and the control circuit 1202 may be a two-way communication, as the display 1208 may include a touch screen module capable of receiving information from a user and providing such information to the control circuit 1202.

The network device 1200 may include an actuator 1216. The control circuit 1202 may be responsive to the actuator 1216 for receiving a user input. For example, the control circuit 1202 may be operable to receive a button press from a user on the network device 1200 for making a selection or performing other functionality on the network device 1200.

The network device 1200 may include an optical transmitter 1218. The optical transmitter 1218 may be used to transmit an optical signal to one or more control devices (e.g., lighting control devices) as part of a claiming and/or joining procedure.

One or more of the modules within the network device 1200 may be powered by a power source 1214. The power source 1214 may include an AC power supply or DC power supply, for example. The power source 1214 may generate a DC supply voltage $V_{CC}$ for powering the modules within the network device 1200.

Figure 13:
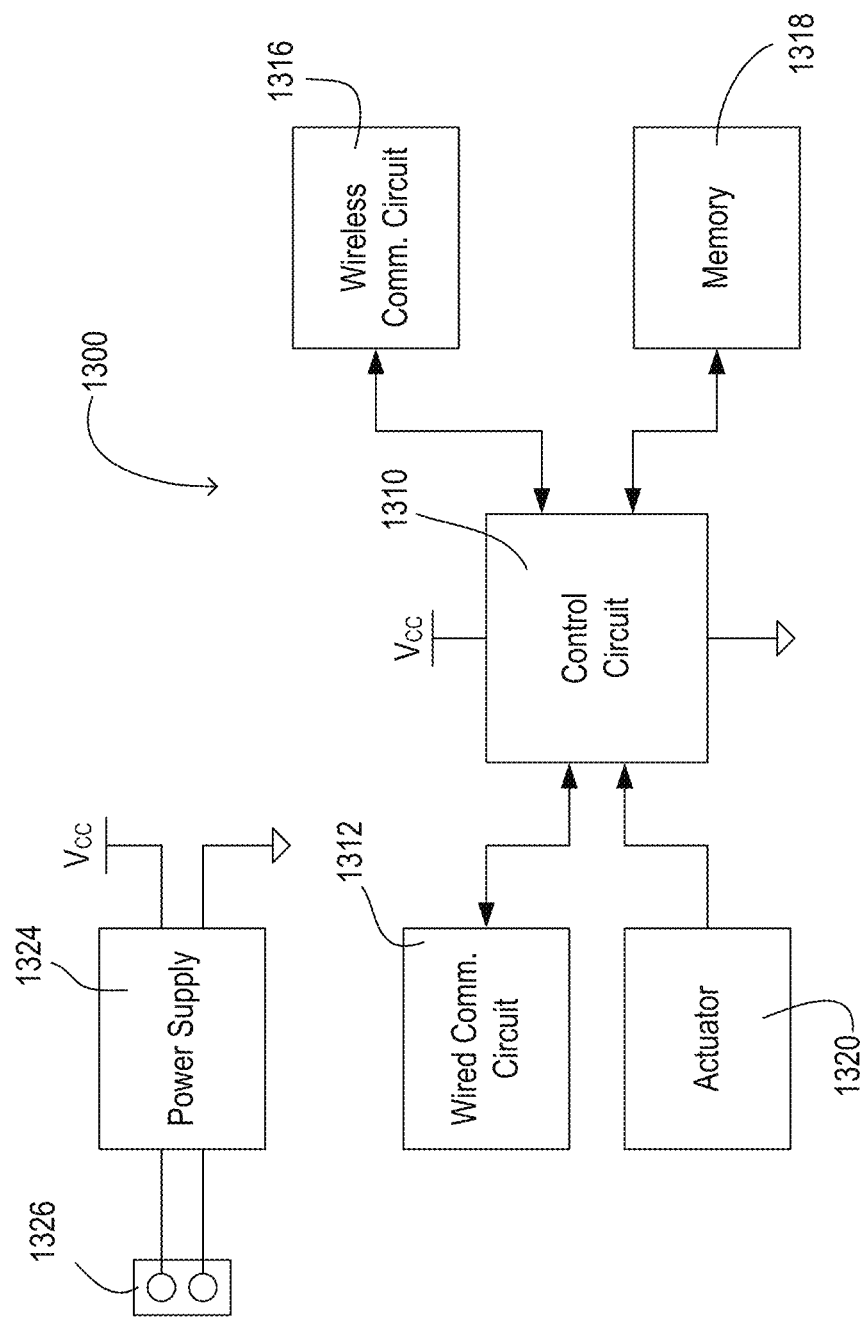
FIG. 13 is a block diagram of an example system controller.

FIG. 13 is a block diagram of an example system controller 1300. The system controller 1300 may comprise a control circuit 1310, which may include one or more of a processor (e.g., a microprocessor), a microcontroller, a programmable logic device (PLD), a field programmable gate array (FPGA), an application specific integrated circuit (ASIC), or any suitable processing device. The control circuit 1310 may perform signal coding, data processing, image processing, power control, input/output processing, and/or any other functionality that enables the system controller 1300 to perform as described herein. The system controller 1300 may comprise a wired communication circuit 1312 that may be coupled to, for example, an Ethernet jack. The wired communication circuit 1312 may be adapted to be connected to a wired digital communication link (e.g., an Ethernet communication link) for allowing the control circuit 1310 to communicate with network communication devices on a network. The wired communication circuit 1312 may be configured to be wirelessly connected to the network, e.g., using WI-FI technology to transmit and/or receive network communication signals.

The system controller 1310 may comprise a wireless communication circuit 1316, for example, including an RF transceiver coupled to an antenna for transmitting and/or receiving RF communication signals. The wireless communication circuit 1316 may communicate using a different network or protocol than the wired communication circuit 1312, such as a proprietary protocol (e.g., the ClearConnect® protocol), for example. The control circuit 1310 may be coupled to the wireless communication circuit 1316 for transmitting messages via the RF communication signals, for example, to control the load control devices in response to messages received via the wired communication circuit 1312. The control circuit 1310 may be configured to receive messages, for example, from the load control devices and/or other control-source devices.

The control circuit 1310 may be responsive to an actuator 1320 for receiving a user input. For example, the control circuit 1310 may be operable to associate the system controller 1300 with one or more devices of a load control system in response to actuations of the actuator 1320. The system controller 1300 may comprise additional actuators to which the control circuit 1310 may be responsive.

The control circuit 1310 may store information in and/or retrieve information from the memory 1318. The memory 1318 may include a non-removable memory and/or a removable memory for storing computer-readable media. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The control circuit 1310 may access the memory 1318 for executable instructions and/or other information that may be used by the system controller 1300. The control circuit 1310 may store the device identifiers of the devices to which the system controller 1300 is associated in the memory 1318. The control circuit 1310 may access instructions in the memory 1318 for transmitting instructions and/or performing other functions described herein.

The system controller 1300 may comprise a power supply 1324 for generating a DC supply voltage $V_{CC}$ for powering the control circuit 1310, the wired communication circuit 1312, the wireless communication circuit 1316, the memory 1318, and/or other circuitry of the system controller 1300. The power supply 1324 may be coupled to a power supply connector 1326 (e.g., a USB port) for receiving a supply voltage (e.g., a DC voltage) and/or for drawing current from an external power source.

Figure 14:
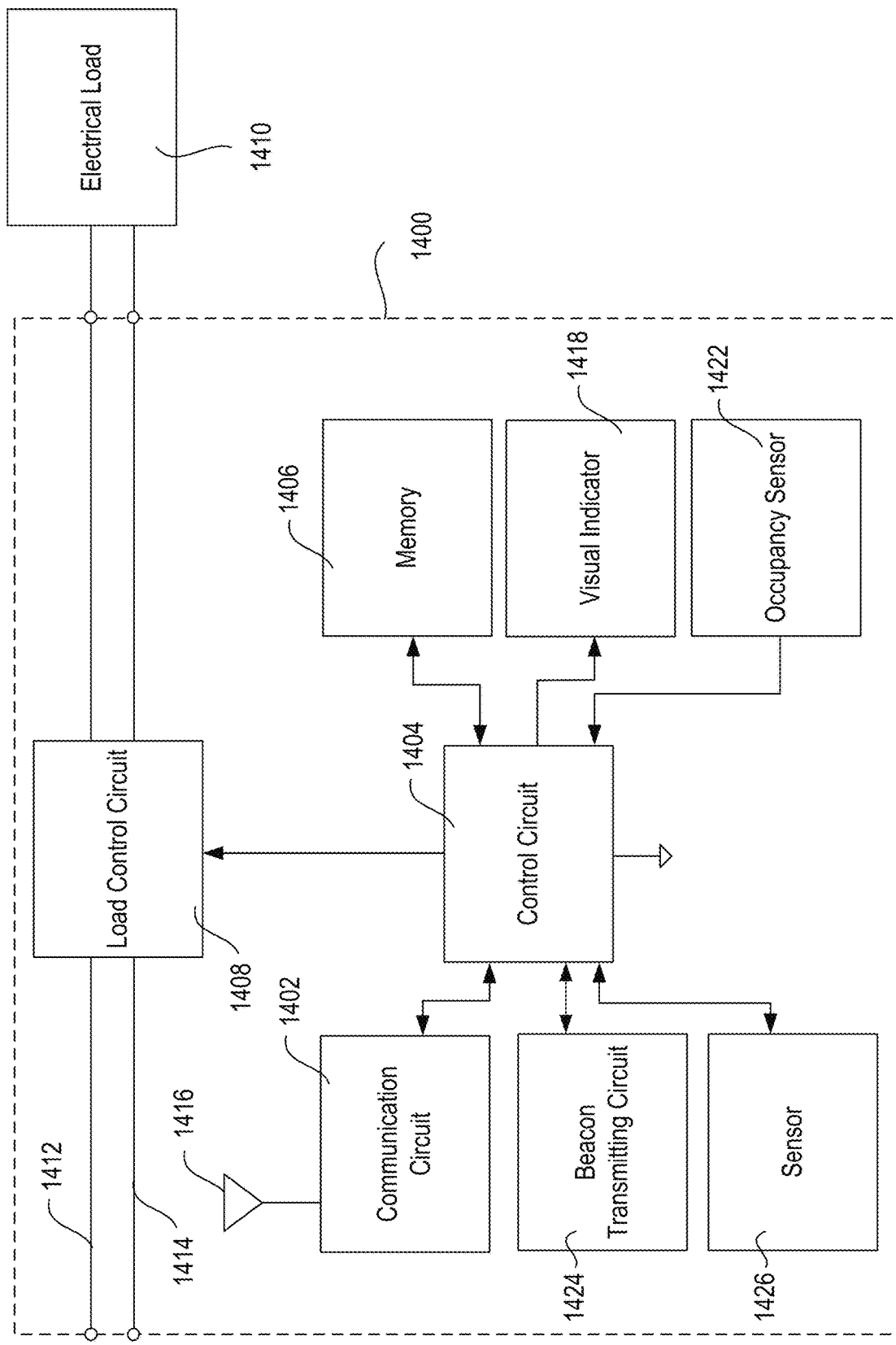
FIG. 14 is a block diagram illustrating an example load control device.

FIG. 14 is a block diagram illustrating an example load control device 1400. The load control device 1400 may be a control-target device, such as a lighting control device, for example. The load control device 1400 may be a dimmer switch, an electronic switch, an electronic ballast for lamps, an LED driver for LED light sources, or other load control device. The load control device 1400 may include a communication circuit 1402. The communication circuit 1402 may include an RF receiver, an RF transceiver, or other communication module capable of performing wired and/or wireless communications. The wireless communications may be performed via an antenna 1416.

The communication circuit 1402 may be in communication with a control circuit 1404. The control circuit 1404 may include one or more general purpose processors, special purpose processors, conventional processors, digital signal processors (DSPs), microprocessors, integrated circuits, a programmable logic device (PLD), application specific integrated circuits (ASICs), or the like. The control circuit 1404 may perform signal coding, data processing, power control, input/output processing, or any other functionality that enables the load control device 1400 to perform as described herein.

The control circuit 1404 may store information in and/or retrieve information from a memory 1406. For example, the memory 1406 may maintain a device database of associated device identifiers and/or executable instructions for performing as described herein. The memory 1406 may include a non-removable memory and/or a removable memory. The load control circuit 1408 may receive instructions from the control circuit 1404 and may control the electrical load 1410 based on the received instructions. The load control circuit 1408 may receive power via the hot connection 1412 and the neutral connection 1414 and may provide an amount of power to the electrical load 1410. The electrical load 1410 may include a lighting load or any other type of electrical load.

The control circuit 1404 may receive information from the occupancy sensor 1422. The information received from the occupancy sensor may include an indication of an occupancy condition or a vacancy condition. The occupancy sensor 1422 may include an infrared (IR) sensor, visible light sensor, or other sensor capable of detecting movement. The occupancy sensor may send an indication to the control circuit 1404 in response to detection of movement (e.g., a major motion event or a minor motion event).

The control circuit 1404 may communicate with beacon transmitting circuit 1424 (e.g., a short-range communication circuit) to transmit beacons. The beacon transmitting circuit 1424 may communicate beacons via RF communication signals, for example. The beacon transmitting circuit 1424 may be a one-way communication circuit or a two-way communication circuit capable of receiving information on the same network and/or protocol on which the beacons are transmitted. The information received at the beacon transmitting circuit 1424 may be provided to the control circuit 1404.

The control circuit 1404 may receive information from a visible light sensor 1426 (e.g., a camera). The visible light sensor 1426 may be used to receive an optical signal, for example from a network device, as part of a claiming and/or joining procedure.

The control circuit 1404 may illuminate a visual indicator 1418 to provide feedback to a user. For example, the control circuit 1404 may blink or strobe the visual indicator 1418 to indicate an occupancy condition identified by the occupancy sensor 1422, that a configuration mode has been entered, or provide other feedback from the load control device 1400. The control circuit 1404 may be operable to illuminate the visual indicator 1418 different colors. The visual indicator 1418 may be illuminated by, for example, one or more light-emitting diodes (LEDs). The load control device 1400 may comprise more than one visual indicator.

Figure 15:
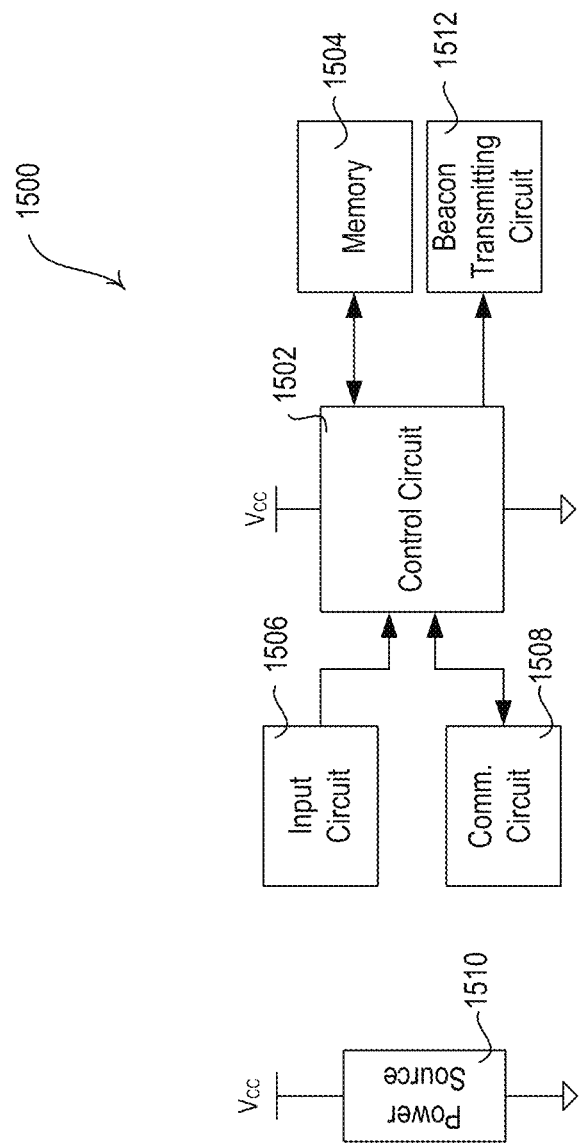
FIG. 15 is a block diagram illustrating an example control-source device.

FIG. 15 is a block diagram illustrating an example control-source device 1500 as described herein. The control-source device 1500 may be a remote-control device, an occupancy sensor, visible light sensor, and/or another control-source device. The control-source device 1500 may include a control circuit 1502 for controlling the functionality of the control-source device 1500. The control circuit 1502 may include one or more general purpose processors, special purpose processors, conventional processors, digital signal processors (DSPs), microprocessors, integrated circuits, a programmable logic device (PLD), application specific integrated circuits (ASICs), or the like. The control circuit 1502 may perform signal coding, data processing, power control, input/output processing, or any other functionality that enables the control-source device 1500 to perform as described herein.

The control circuit 1502 may store information in and/or retrieve information from the memory 1504. The memory 1504 may include a non-removable memory and/or a removable memory, as described herein.

The control-source device 1500 may include a communications circuit 1508 for transmitting and/or receiving information. The communications circuit 1508 may transmit and/or receive information via wired and/or wireless communications. The communications circuit 1508 may include a transmitter, an RF transceiver, or other circuit capable of performing wired and/or wireless communications. The communications circuit 1508 may be in communication with control circuit 1502 for transmitting and/or receiving information.

The control circuit 1502 may also be in communication with an input circuit 1506. The input circuit 1506 may include an actuator (e.g., one or more buttons) or a sensor circuit (e.g., an occupancy sensor circuit, camera or other visible light sensing circuit, etc.) for receiving input that may be sent to a device for controlling an electrical load. For example, the control-source device may receive input from the input circuit 1506 to put the control circuit 1502 in a configuration mode and/or communicate association messages from the control-source device. The control circuit 1502 may receive information from the input circuit 1506 (e.g. an indication that a button has been actuated or sensed information). Each of the modules within the control-source device 1500 may be powered by a power source 1510.

Although features and elements are described above in particular combinations, a feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), removable disks, and optical media such as CD-ROM disks, and digital versatile disks (DVDs).

What is claimed is:

1. A method for configuring lighting control devices of a load control system installed in a load control environment, the method comprising:
receiving beacons, each beacon comprising a unique identifier associated with one of the lighting control devices of the load control system, wherein the unique identifier is configured to identify the lighting control device in messages transmitted to control an amount of power provided to a lighting load;
determining a configuration identifier based on configuration data associated with the load control system, wherein the configuration identifier identifies one or more of a zone, an area, or a location of one or more lighting loads or fixtures comprising one or more lighting loads;
automatically selecting a first lighting control device to be assigned to the configuration identifier based on received signal strengths of the respective beacons of the lighting control devices;
causing the first lighting control device to provide a first feedback type in response to being automatically selected to be assigned to the configuration identifier;
automatically selecting a second lighting control device to be assigned to the configuration identifier in response to changes in one or more of the received signal strengths of the respective beacons of the lighting control devices;
causing the first lighting control device to stop providing the first feedback type and the second lighting control device to provide the first feedback type in response to automatically selecting the second lighting control device to be assigned to the configuration identifier;

associating the unique identifier of the second lighting control device with the configuration identifier; and causing the second lighting control device to provide a second feedback type in response to being assigned to the configuration identifier.

2. The method of claim 1, wherein causing the second lighting control device to provide the second feedback type comprises transmitting a second message to cause the second lighting control device to provide the second feedback type in response to being assigned to the configuration identifier.

3. The method of claim 1, further comprising:
determining received signal strengths of the beacons that exceed a discovery threshold; and
causing the lighting control devices that transmitted the beacons having received signals strengths that exceed the discovery threshold to provide a third feedback type.

4. The method of claim 1,
wherein automatically selecting a second lighting control device to be assigned to the configuration identifier further comprises unselecting the first lighting control device.

5. The method of claim 1, wherein a group of lighting control devices comprises the first lighting control device; and
wherein automatically selecting the second lighting control device to be assigned to the configuration identifier further comprises adding a previously unselected lighting control device to the group of lighting control devices to be assigned the configuration identifier.

6. The method of claim 1, wherein selecting the first lighting control device to be assigned to the configuration identifier based on signal strengths of the respective beacons further comprises:
determining the beacon that was received at the highest signal strength; and
selecting the lighting control device that transmitted the beacon that was received at the highest signal strength as the lighting control device to be assigned the configuration identifier.

7. The method of claim 1, wherein selecting the first lighting control device to be assigned to the configuration identifier based on signal strengths of the respective beacons further comprises:
determining received signal strengths of the beacons that exceed a discovery threshold; and
selecting the lighting control device that transmitted the beacons having received signals strengths that exceed the discovery threshold the lighting control devices to be assigned the configuration identifier.

8. The method of claim 1, further comprising:
receiving an input confirming the assignment of the configuration identifier to the second lighting control device;
wherein associating the unique identifier of the second lighting control device with the configuration identifier further comprises associating the unique identifier of the second lighting control device with the configuration identifier in response to receiving the input confirming the assignment.

9. The method of claim 1, wherein associating the unique identifier of the second lighting control device with the configuration identifier further comprises associating the unique identifier of the second lighting control device with the configuration identifier in response to being selected to be assigned to the configuration identifier.

10. The method of claim 1, further comprising:
receiving a project code identifier; and
accessing the configuration identifier from a project associated with the project code identifier.

11. The method of claim 10, wherein the configuration identifier is generated at a processing device via design software configured to generate a floorplan of a building, and wherein the configuration identifier identifies a location in the floorplan, and wherein the project identifier is received and the configuration identifier is accessed using a mobile device.

12. A load control system comprising:
a mobile device configured to transmit a first beacon; and
a plurality of lighting control devices configured to control an amount of power provided to respective lighting loads, wherein each lighting control device of the plurality of lighting control devices is configured to transmit a respective second beacon in response to the first beacon received from the mobile device, wherein each lighting control device of the plurality of the lighting control devices is configured to:
receive the first beacon from the mobile device; and
transmit the second beacon in response to receiving the first beacon from the mobile device, wherein the second beacon comprises a unique identifier associated with the lighting control device that is configured to identify the lighting control device in messages transmitted to control an amount of power provided to a lighting load;
wherein a first lighting control device of the plurality of the lighting control devices is configured to:
receive an indication that the first lighting control device has been automatically selected to be configured based on a signal strength of the second beacon transmitted by the first lighting control device as received by the mobile device;
provide a first feedback type in response to receiving the indication that the first lighting control device has been automatically selected to be configured;
receive an indication that the first lighting control device has been automatically deselected; and
stop providing the first feedback type in response to receiving the indication that the lighting control device has been automatically deselected; and
wherein a second lighting control device of the plurality of the lighting control devices is configured to:
receive an indication that the second lighting control device has been automatically selected to be configured based on a signal strength of the second beacon transmitted by the second lighting control device as received by the mobile device;
provide the first feedback type in response to receiving the indication that the second lighting control device has been automatically selected to be configured;
receive an indication that a unique identifier of the second lighting control device has been associated with a configuration identifier, wherein the configuration identifier identifies one or more of a fixture, a group, a zone, an area, and a location; and
provide a second feedback type in response to receiving the indication that the unique identifier of the second lighting control device has been associated with the configuration identifier.

13. The load control system of claim 12, wherein the mobile device is configured to select a lighting control device to be configured if the signal strength of the second beacon transmitted by the lighting control device is the highest signal strength of a plurality of beacons received from the plurality of lighting control devices.

14. The load control system of claim 12, wherein the first beacon transmitted by the mobile device comprises a signal strength threshold, and wherein each lighting control device of the plurality of the lighting control devices is further configured to:
   determine a signal strength at which the first beacon was received; and
   transmit the second beacon on a condition that the signal strength at which the first beacon was received is greater than or equal to the signal strength threshold.

15. The load control system of claim 12, wherein the first lighting control device and the second lighting control device are configured to provide the first feedback type by illuminating the respective lighting load a first predefined color.

16. The load control system of claim 15, wherein the second lighting control device is configured to provide the second feedback type by illuminating the respective lighting load a second predefined color.

17. The load control system of claim 16, wherein each lighting control device of the plurality of the lighting control devices is further configured to provide a third feedback type in response to receiving the first beacon from the mobile device.

18. The load control system of claim 17, wherein each lighting control device of the plurality of the lighting control devices is configured to provide the third feedback type by illuminating the respective lighting load a third predefined color.

19. A non-transitory computer readable medium having instructions stored thereon that, when executed by a control circuit, cause the control circuit to:
   receive, via a communication circuit, one or more beacons, each beacon comprising a unique identifier associated with a respective lighting control device, wherein the unique identifier is configured to identify the lighting control device in messages transmitted to control an amount of power provided to a lighting load;
   determine a configuration identifier based on configuration data associated with a load control system, wherein the configuration identifier identifies one or more of a zone, an area, or a location of one or more lighting loads or fixtures comprising one or more lighting loads;
   automatically select a first lighting control device to be assigned to the configuration identifier based on received signal strengths of the respective beacons of the lighting control devices;
   cause the first lighting control device to provide a first feedback type in response to being automatically selected to be assigned to the configuration identifier;
   automatically select a second lighting control device to be assigned to the configuration identifier in response to changes in one or more of the received signal strengths of the respective beacons of the lighting control devices;
   cause the first lighting control device to stop providing the first feedback type and the second lighting control device to provide the first feedback type in response to automatically selecting the second lighting control device to be assigned to the configuration identifier;
   associate the unique identifier of the second lighting control device with the configuration identifier; and
   cause the second lighting control device to provide a second feedback type in response to being assigned to the configuration identifier.

20. The non-transitory computer readable medium of claim 19, wherein causing the second lighting control device to provide the second feedback type comprises transmitting, via the communication circuit, a second message to cause the second lighting control device to provide the second feedback type in response to being assigned to the configuration identifier.

21. The non-transitory computer readable medium of claim 19, wherein the instructions, when executed by the control circuit, further cause the control circuit to:
   determine received signal strengths of the beacons that exceed a discovery threshold; and
   cause the lighting control devices that transmitted the beacons having received signals strengths that exceed the discovery threshold to provide a third feedback type.

22. The non-transitory computer readable medium of claim 19, wherein automatically selecting a second lighting control device to be assigned to the configuration identifier comprises unselecting the first lighting control device.

23. The non-transitory computer readable medium of claim 19, wherein a group of lighting control devices comprises the first lighting control device; and wherein automatically selecting the second lighting control device to be assigned to the configuration identifier comprises adding a previously unselected lighting control device to the group of lighting control devices to be assigned the configuration identifier.

24. The non-transitory computer readable medium of claim 19, wherein selecting the first lighting control device to be assigned to the configuration identifier based on signal strengths of the respective beacons further comprises:
   determining the beacon that was received at the highest signal strength; and
   selecting the lighting control device that transmitted the beacon that was received at the highest signal strength as the lighting control device to be assigned the configuration identifier.

25. The non-transitory computer readable medium of claim 19, wherein selecting the first lighting control device to be assigned to the configuration identifier based on signal strengths of the respective beacons further comprises:
   determining received signal strengths of the beacons that exceed a discovery threshold; and
   selecting the lighting control device that transmitted the beacons having received signals strengths that exceed the discovery threshold the lighting control devices to be assigned the configuration identifier.

26. The non-transitory computer readable medium of claim 19, wherein the instructions, when executed by the control circuit, further cause the control circuit to:
   receive an input confirming the assignment of the configuration identifier to the second lighting control device;
   wherein associating the unique identifier of the second lighting control device with the configuration identifier further comprises assigning the configuration identifier to the second lighting control device in response to receiving the input confirming the assignment.

27. The non-transitory computer readable medium of claim 19, wherein associating the unique identifier of the second lighting control device with the configuration identifier further comprises associating the unique identifier of the second lighting control device with the configuration identifier in response to being selected to be assigned to the configuration identifier.

28. The non-transitory computer readable medium of claim 19, wherein the instructions, when executed by the control circuit, further cause the control circuit to:
   receive a project code identifier; and
   access the configuration identifier from a project associated with the project code identifier.

29. The non-transitory computer readable medium of claim 28, wherein the configuration identifier is generated at a processing device via design software configured to generate a floorplan of a building, and wherein the configuration identifier identifies a location in the floorplan, and wherein the project identifier is received and the configuration identifier is accessed using a mobile device.

\* \* \* \* \*